US012587037B2

(12) United States Patent
Mohammadabadi et al.

(10) Patent No.: US 12,587,037 B2
(45) Date of Patent: Mar. 24, 2026

(54) PHOTOVOLTAIC POWER TRANSFER SYSTEM AND METHODS

(71) Applicant: Daanaa Resolution Inc., Vancouver (CA)

(72) Inventors: Soroush Dehghani Mohammadabadi, Vancouver (CA); Mohammadjavad Shariatzadeh, Vancouver (CA); Ehsan Hadizadeh Hafshejani, Vancouver (CA); Ehud Daon, Bowen Island (CA)

(73) Assignee: Daanaa Resolution Inc., Vancouver (CA)

( * ) Notice: Subject to any disclaimer, the term of this patent is extended or adjusted under 35 U.S.C. 154(b) by 0 days.

(21) Appl. No.: 18/419,274

(22) Filed: Jan. 22, 2024

(65) Prior Publication Data

US 2024/0162754 A1     May 16, 2024

Related U.S. Application Data

(63) Continuation of application No. 17/437,383, filed as application No. PCT/US2020/022068 on Mar. 11, 2020.

(Continued)

(51) Int. Cl.
*H02J 50/12*          (2016.01)
*H02J 50/00*          (2016.01)
(Continued)

(52) U.S. Cl.
CPC ............ *H02J 50/12* (2016.02); *H02J 50/005* (2020.01); *H02J 50/05* (2016.02); *H02J 50/402* (2020.01);
(Continued)

(58) Field of Classification Search
CPC .. H02J 50/10; H02J 50/12; H02J 50/05; H02J 2300/24; H02J 50/005
See application file for complete search history.

(56) References Cited

U.S. PATENT DOCUMENTS 10,128,660  B1 *  11/2018  Apte ....................... H02J 50/12
2010/0217553  A1     8/2010  Von Novak
(Continued)

FOREIGN PATENT DOCUMENTS

EP          3032698 A1     6/2006
EP          3939139 A1     1/2022
(Continued)

OTHER PUBLICATIONS

European Patent Office Extended European Search Report (EP 20 77 0333), corresponding to the subject matter of the present application. Date of Mailing; Dec. 5, 2022.
(Continued)

*Primary Examiner* — Rexford N Barnie
*Assistant Examiner* — Rasem Mourad
(74) *Attorney, Agent, or Firm* — Kevin R. Erdman; Brannon Sowers & Cracraft PC

(57)          ABSTRACT

The present invention involves a bimodal near-field resonant wireless system for transferring power from one or more photovoltaic cells to a power load. One or more transmission modules are in electrical communication with the one or more photovoltaic cells, converting power from photovoltaic cells into an oscillating electrical power signal having a variable oscillation frequency. Transmitter resonators are in electrical communication with transmission modules resonating at the variable oscillation frequency. Receiver resonators, resonating at the variable oscillation frequency and disposed to bimodally receive power from transmitter resonators simultaneously via capacitive coupling and magnetic (Continued)

induction according to an adjustable transfer mode ratio of capacitive to inductive power transfer. Receiver modules are in electrical communication with receiver resonators, each receiving power from receiver resonators and render power received from receiver resonators into a direct current voltage, and transmit the direct current voltage to the power load.

19 Claims, 42 Drawing Sheets

Related U.S. Application Data

(60) Provisional application No. 62/817,159, filed on Mar. 12, 2019, provisional application No. 62/934,309, filed on Nov. 12, 2019, provisional application No. 62/944,645, filed on Dec. 6, 2019, provisional application No. 62/956,479, filed on Jan. 2, 2020.

(51) Int. Cl.
| | |
|---|---|
| *H02J 50/05* | (2016.01) |
| *H02J 50/40* | (2016.01) |
| *H02J 50/60* | (2016.01) |
| *H02J 50/80* | (2016.01) |
| *H02J 50/90* | (2016.01) |
| *B60L 50/60* | (2019.01) |

(52) U.S. Cl.
CPC .............. *H02J 50/60* (2016.02); *H02J 50/80* (2016.02); *H02J 50/90* (2016.02); *B60L 50/60* (2019.02); *H02J 2300/24* (2020.01)

(56) References Cited

U.S. PATENT DOCUMENTS

| | | | | |
|---|---|---|---|---|
| 2011/0199045 | A1* | 8/2011 | Hui | H02M 3/3376 |
| | | | | 320/108 |
| 2011/0254377 | A1 | 10/2011 | Wildmer et al. | |
| 2011/0254503 | A1 | 10/2011 | Widmer | |
| 2011/0292697 | A1 | 12/2011 | Alexander | |
| 2012/0098350 | A1* | 4/2012 | Campanella | H04B 5/26 |
| | | | | 307/104 |
| 2013/0033118 | A1 | 2/2013 | Karalis | |
| 2013/0300205 | A1 | 11/2013 | Tzanidis et al. | |
| 2013/0300210 | A1 | 11/2013 | Hosotani | |
| 2014/0008995 | A1* | 1/2014 | Kanno | H01F 27/366 |
| | | | | 307/104 |
| 2014/0203657 | A1* | 7/2014 | Song | H02J 50/402 |
| | | | | 307/104 |
| 2014/0267797 | A1 | 9/2014 | Clarke et al. | |
| 2015/0073768 | A1 | 3/2015 | Kurs et al. | |
| 2015/0115733 | A1 | 4/2015 | Sealy | |
| 2015/0318896 | A1 | 11/2015 | Kerselaers | |
| 2015/0326028 | A1* | 11/2015 | Suzuki | H02J 50/12 |
| | | | | 307/104 |
| 2016/0261026 | A1 | 9/2016 | Han | |
| 2016/0352154 | A1 | 12/2016 | Matsui | |
| 2017/0040831 | A1 | 2/2017 | Desai | |
| 2017/0063098 | A1* | 3/2017 | Jeong | H02J 50/05 |
| 2017/0141584 | A1 | 5/2017 | Devaul | |
| 2017/0317532 | A1 | 11/2017 | Kanagawa | |
| 2017/0346343 | A1 | 11/2017 | Atasoy | |
| 2017/0373539 | A1 | 12/2017 | Von Novak, III | |
| 2018/0083489 | A1 | 3/2018 | Govindaraj | |
| 2018/0090974 | A1 | 3/2018 | Elkayam | |
| 2018/0101188 | A1 | 4/2018 | Kurs et al. | |
| 2018/0123398 | A1 | 5/2018 | Jha et al. | |
| 2018/0152056 | A1 | 5/2018 | Takahashi | |
| 2018/0159353 | A1 | 6/2018 | Pan | |
| 2019/0074726 | A1 | 3/2019 | Hosotani | |
| 2019/0288560 | A1 | 9/2019 | Baarman | |

FOREIGN PATENT DOCUMENTS

| | | | |
|---|---|---|---|
| EP | 4214818 | A1 | 7/2023 |
| JP | 2014103778 | A | 6/2014 |
| JP | 2011010159 | A | 9/2014 |
| JP | 2015002621 | A | 1/2015 |
| JP | 2016534698 | A | 11/2016 |
| JP | 2018207670 | A | 12/2018 |
| JP | 2020504442 | A | 2/2020 |
| WO | 2012101907 | A1 | 8/2012 |
| WO | 2013042224 | A1 | 3/2013 |
| WO | 2015023899 | A2 | 2/2015 |
| WO | 2018115990 | A1 | 6/2018 |
| WO | 2018115991 | A1 | 6/2018 |
| WO | 2020185877 | A1 | 9/2020 |
| WO | 2022058790 | A1 | 3/2022 |

OTHER PUBLICATIONS

Intellectual Proprty Office of Singapor, Singapore Search Report (11202109739W), corresponding to the subject matter of the present application. Date of Mailing; Jun. 7, 2023.

Intellectual Proprty Office of Singapor, Singapore Written Opinion (11202109739W), corresponding to the subject matter of the present application. Date of Mailing; Jun. 7, 2023.

Dehghani et al.: Adjustable Load With Tracking Loop to Improve RF Rectifier Efficiency Under Variable RF Input Power Conditions. IEEE Transactions on Microwave Theory and Techniques. 64(2):343-352 (2016).

PCT/IB2021/000627 International Search Report and Written Opinion dated Feb. 17, 2022.

PCT/US2020/022068 International Preliminary Report on Patentability dated Sep. 23, 2021.

PCT/US2020/022068 International Search Report and Written Opinion dated Jun. 22, 2020.

Canadian Intellectual Intellectual Property Office International Search Report (PCT/1B2023/000167), corresponding to the subject matter of the present application. Date of Mailing; Sep. 14, 2023.

Canadian Intellectual Intellectual Property Office Written Opinion of the International Search Report (PCT/1B2023/000167), corresponding to the subject matter of the present application. Date of Mailing; Sep. 14, 2023.

Japanese Patent Office, Japanese Office Action (2021-552247), corresponding to the subject matter of the present application. Date of Mailing; Dec. 27, 2023.

Taiwan Intellectual Property Office, Taiwanese Office Action (109108072), corresponding to the subject matter of the present application. Date of Mailing; Dec. 27, 2023.

Intellectual Property Corporation of Malaysia: Substantive Examination Examiner's Report (Patent Application No. PI2021005105), corresponding to the subject matter of the present application. Date of Mailing; Oct. 14, 2024.

Intellectual Property Corporation of Malaysia: Examiner's Search Report (Patent Application No. PI2021005105), corresponding to the subject matter of the present application. Date of Mailing; Oct. 14, 2024.

United States Patent and Trademark Office Non-Final Office Action (U.S. Appl. No. 17/437,383), corresponding to the subject matter of the present application. Date of Mailing; Jun. 20, 2024.

Intellectual Property Office of Sinapore: Notice for Eligibility of Grant (11202109739W), corresponding to the subject matter of the present application. Date of Mailing; Jul. 22, 2024.

Taiwan Intellectual Property Office: Notice for Eligibility of Grant (109108072), corresponding to the subject matter of the present application. Date of Mailing; Sep. 2, 2024.

Japan Patent Office: Notice for Eligibility of Grant (2021-552247), corresponding to the subject matter of the present application. Date of Mailing; Sep. 10, 2024.

United States Patent and Trademark Office Non-Final Office Action (U.S. Appl. No. 18/417,965), corresponding to the subject matter of the present application. Date of Mailing; Mar. 12, 2025.

(56)    References Cited

OTHER PUBLICATIONS

United States Patent and Trademark Office: Non-Final Office Action (U.S. Appl. No. 18/422,090), corresponding to the subject matter of the present application. Date of Mailing: Apr. 29, 2025.

United States Patent and Trademark Office: Final Office Action (U.S. Appl. No. 18/417,965), corresponding to the subject matter of the present application. Date of Mailing: Nov. 13, 2025.

United States Patent and Trademark Office: Final Office Action (U.S. Appl. No. 18/422,090), corresponding to the subject matter of the present application. Date of Mailing: Dec. 18, 2025.

* cited by examiner

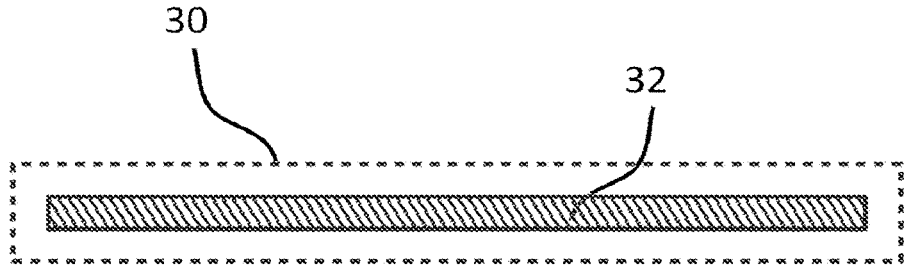
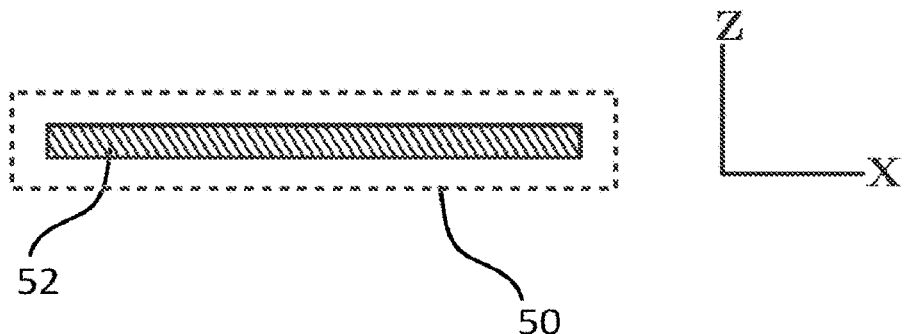
FIG. 4A

[1000]

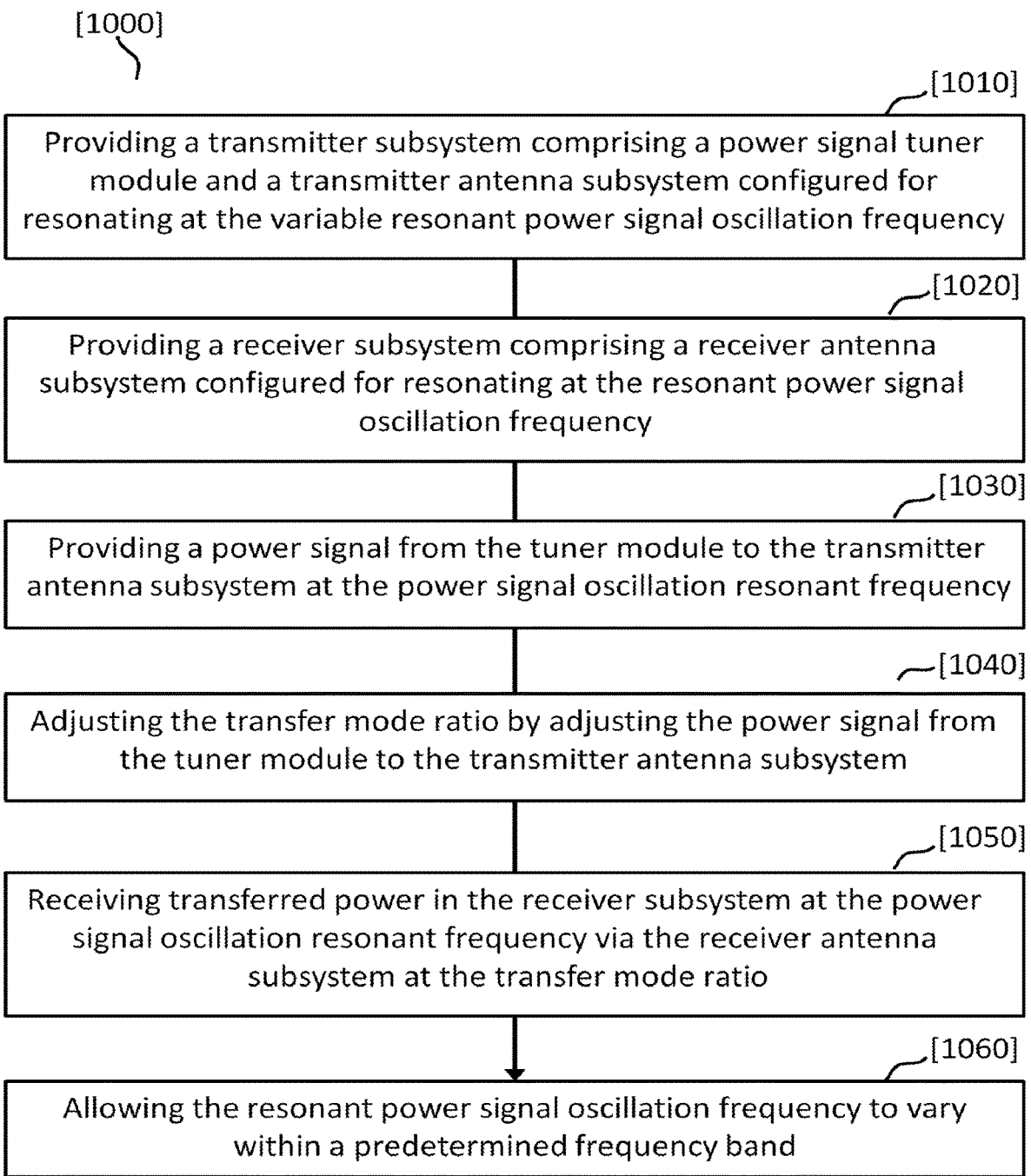

[1010]

Providing a transmitter subsystem comprising a power signal tuner module and a transmitter antenna subsystem configured for resonating at the variable resonant power signal oscillation frequency

[1020]

Providing a receiver subsystem comprising a receiver antenna subsystem configured for resonating at the resonant power signal oscillation frequency

[1030]

Providing a power signal from the tuner module to the transmitter antenna subsystem at the power signal oscillation resonant frequency

[1040]

Adjusting the transfer mode ratio by adjusting the power signal from the tuner module to the transmitter antenna subsystem

[1050]

Receiving transferred power in the receiver subsystem at the power signal oscillation resonant frequency via the receiver antenna subsystem at the transfer mode ratio

[1060]

Allowing the resonant power signal oscillation frequency to vary within a predetermined frequency band

FIG. 11

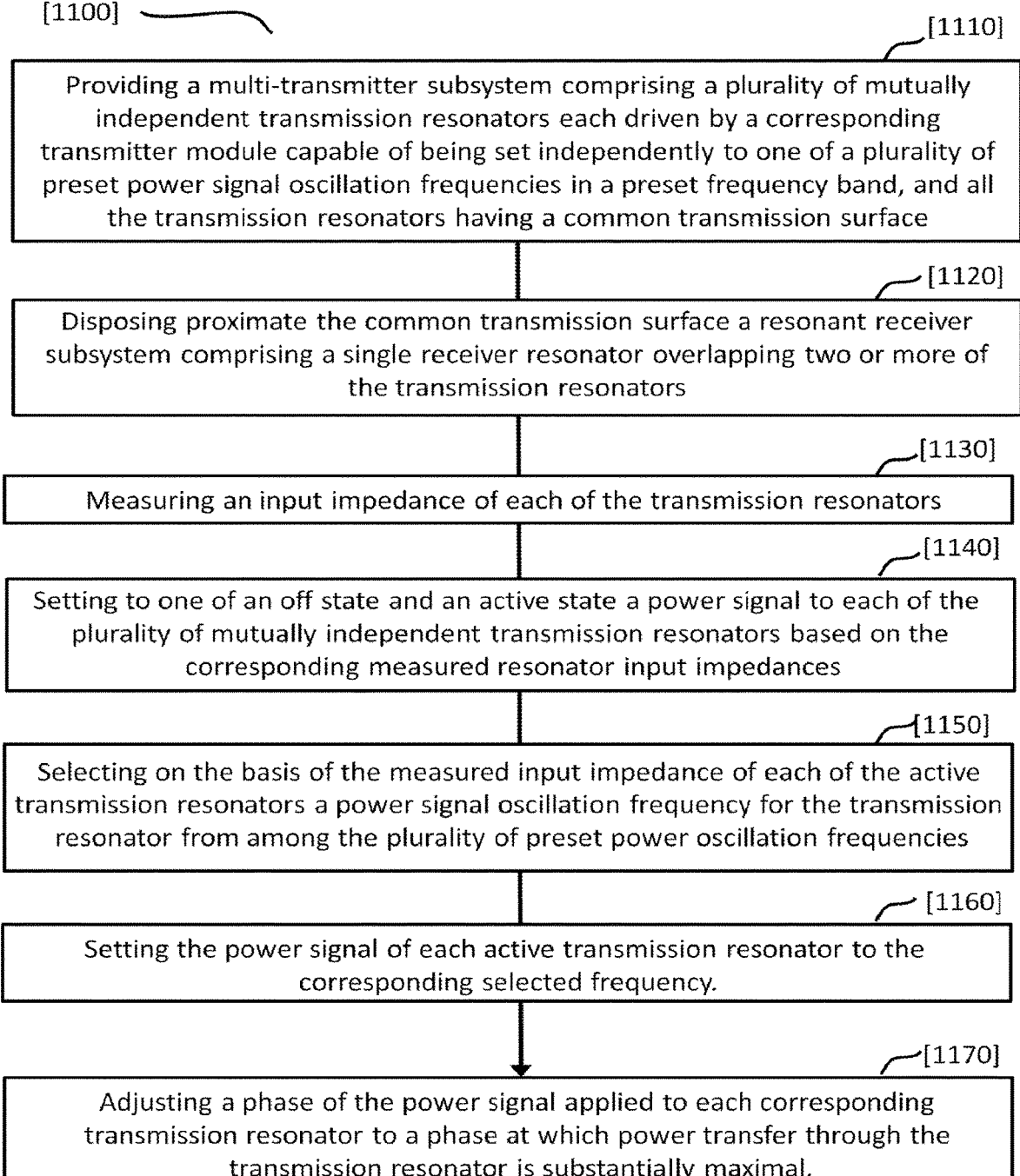

[1100]

[1110]
Providing a multi-transmitter subsystem comprising a plurality of mutually independent transmission resonators each driven by a corresponding transmitter module capable of being set independently to one of a plurality of preset power signal oscillation frequencies in a preset frequency band, and all the transmission resonators having a common transmission surface

[1120]
Disposing proximate the common transmission surface a resonant receiver subsystem comprising a single receiver resonator overlapping two or more of the transmission resonators

[1130]
Measuring an input impedance of each of the transmission resonators

[1140]
Setting to one of an off state and an active state a power signal to each of the plurality of mutually independent transmission resonators based on the corresponding measured resonator input impedances

[1150]
Selecting on the basis of the measured input impedance of each of the active transmission resonators a power signal oscillation frequency for the transmission resonator from among the plurality of preset power oscillation frequencies

[1160]
Setting the power signal of each active transmission resonator to the corresponding selected frequency.

[1170]
Adjusting a phase of the power signal applied to each corresponding transmission resonator to a phase at which power transfer through the transmission resonator is substantially maximal.

FIG. 15

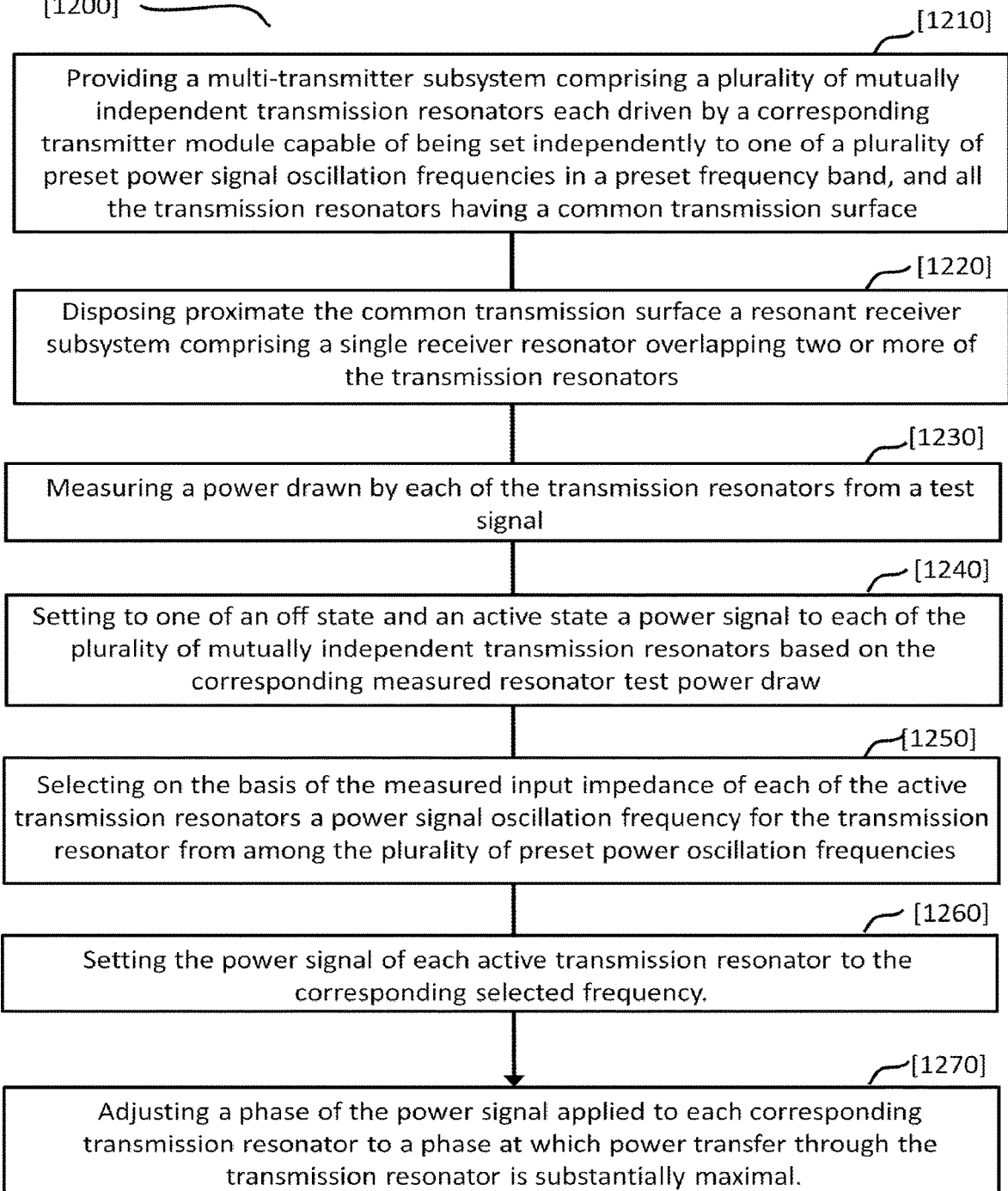

[1200]

[1210]

Providing a multi-transmitter subsystem comprising a plurality of mutually independent transmission resonators each driven by a corresponding transmitter module capable of being set independently to one of a plurality of preset power signal oscillation frequencies in a preset frequency band, and all the transmission resonators having a common transmission surface

[1220]

Disposing proximate the common transmission surface a resonant receiver subsystem comprising a single receiver resonator overlapping two or more of the transmission resonators

[1230]

Measuring a power drawn by each of the transmission resonators from a test signal

[1240]

Setting to one of an off state and an active state a power signal to each of the plurality of mutually independent transmission resonators based on the corresponding measured resonator test power draw

[1250]

Selecting on the basis of the measured input impedance of each of the active transmission resonators a power signal oscillation frequency for the transmission resonator from among the plurality of preset power oscillation frequencies

[1260]

Setting the power signal of each active transmission resonator to the corresponding selected frequency.

[1270]

Adjusting a phase of the power signal applied to each corresponding transmission resonator to a phase at which power transfer through the transmission resonator is substantially maximal.

FIG. 16

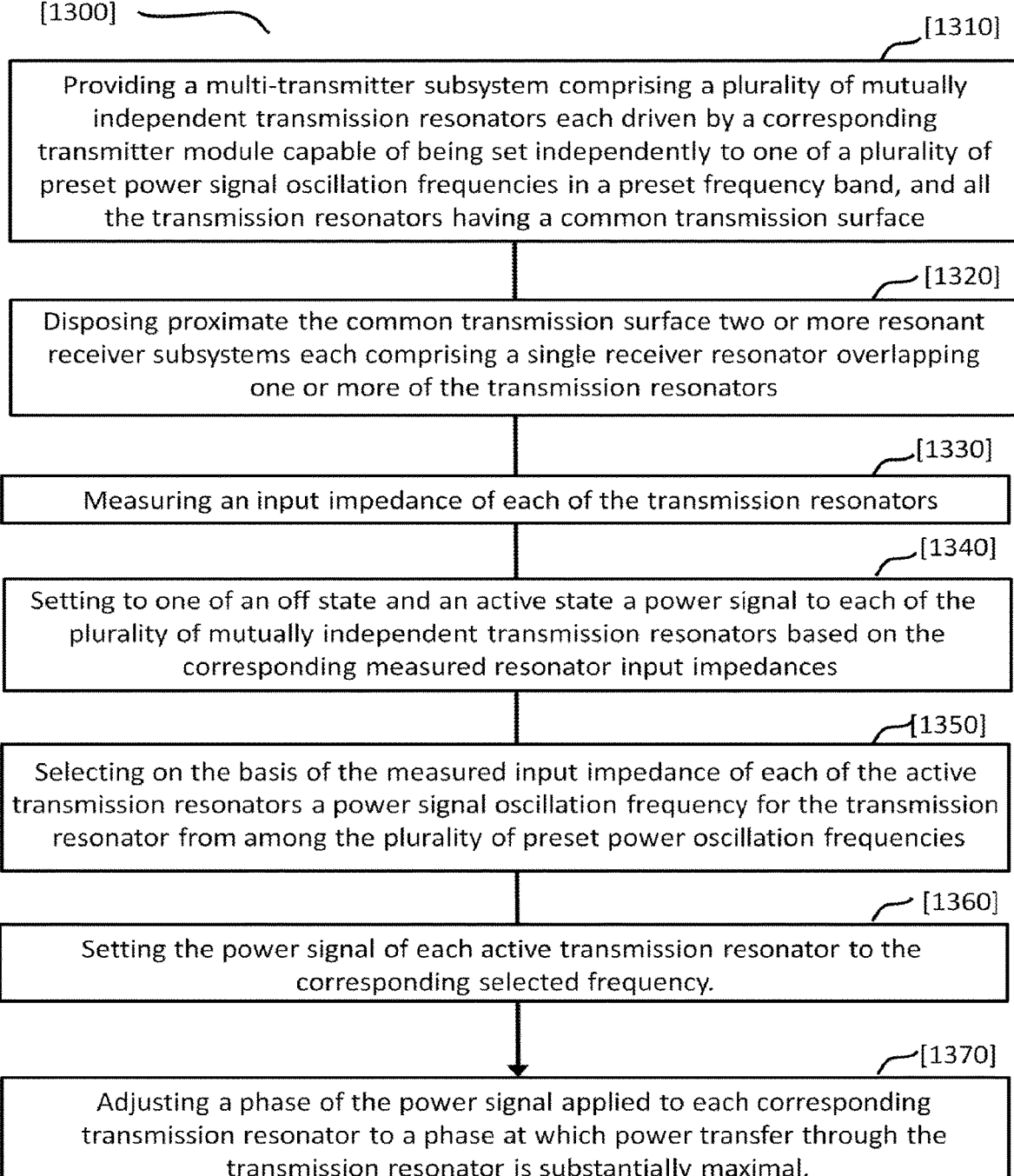

[1300]

[1310]
Providing a multi-transmitter subsystem comprising a plurality of mutually independent transmission resonators each driven by a corresponding transmitter module capable of being set independently to one of a plurality of preset power signal oscillation frequencies in a preset frequency band, and all the transmission resonators having a common transmission surface

[1320]
Disposing proximate the common transmission surface two or more resonant receiver subsystems each comprising a single receiver resonator overlapping one or more of the transmission resonators

[1330]
Measuring an input impedance of each of the transmission resonators

[1340]
Setting to one of an off state and an active state a power signal to each of the plurality of mutually independent transmission resonators based on the corresponding measured resonator input impedances

[1350]
Selecting on the basis of the measured input impedance of each of the active transmission resonators a power signal oscillation frequency for the transmission resonator from among the plurality of preset power oscillation frequencies

[1360]
Setting the power signal of each active transmission resonator to the corresponding selected frequency.

[1370]
Adjusting a phase of the power signal applied to each corresponding transmission resonator to a phase at which power transfer through the transmission resonator is substantially maximal.

FIG. 17

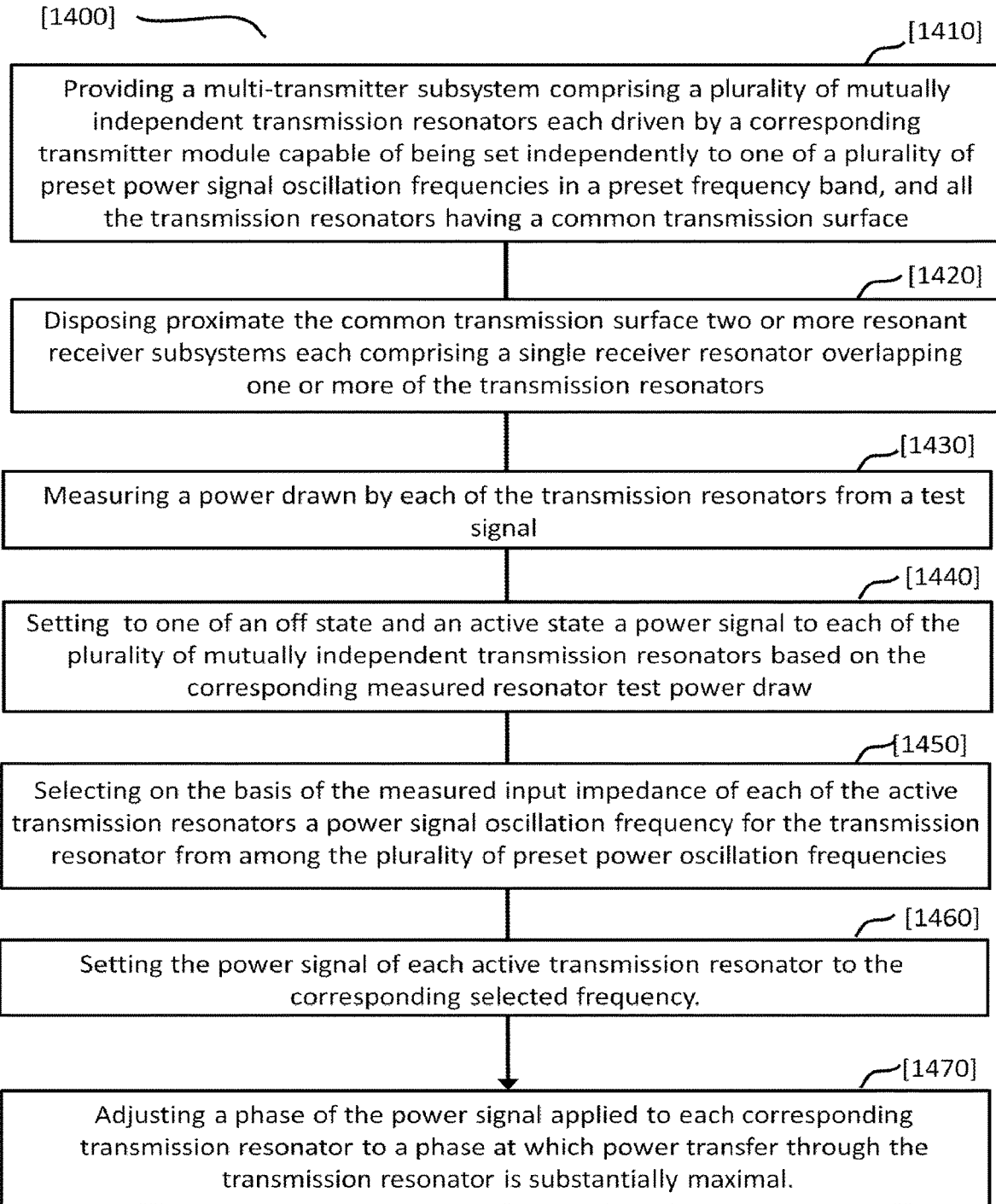

[1400]

[1410]
Providing a multi-transmitter subsystem comprising a plurality of mutually independent transmission resonators each driven by a corresponding transmitter module capable of being set independently to one of a plurality of preset power signal oscillation frequencies in a preset frequency band, and all the transmission resonators having a common transmission surface

[1420]
Disposing proximate the common transmission surface two or more resonant receiver subsystems each comprising a single receiver resonator overlapping one or more of the transmission resonators

[1430]
Measuring a power drawn by each of the transmission resonators from a test signal

[1440]
Setting to one of an off state and an active state a power signal to each of the plurality of mutually independent transmission resonators based on the corresponding measured resonator test power draw

[1450]
Selecting on the basis of the measured input impedance of each of the active transmission resonators a power signal oscillation frequency for the transmission resonator from among the plurality of preset power oscillation frequencies

[1460]
Setting the power signal of each active transmission resonator to the corresponding selected frequency.

[1470]
Adjusting a phase of the power signal applied to each corresponding transmission resonator to a phase at which power transfer through the transmission resonator is substantially maximal.

FIG. 18

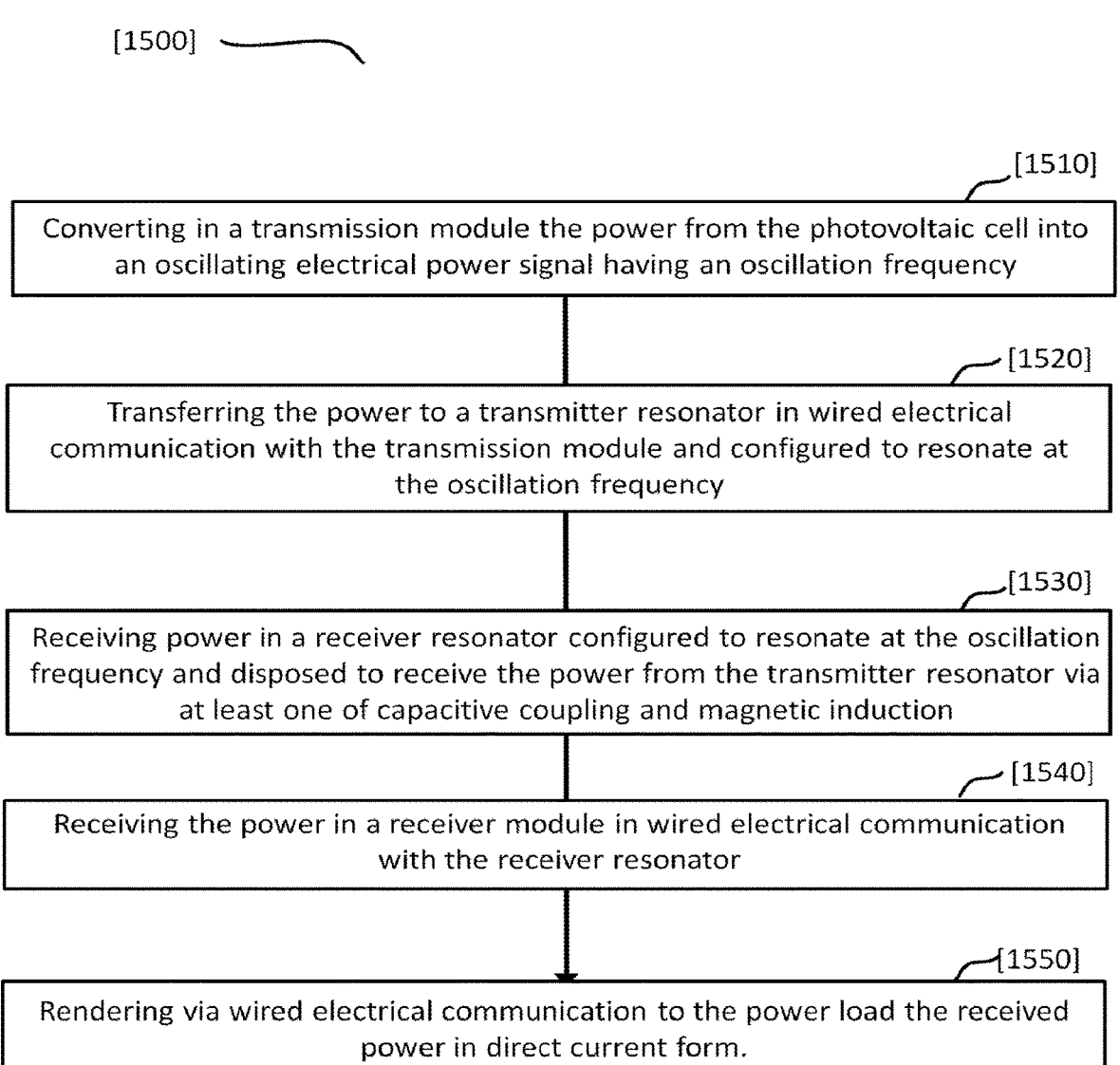

[1500]

[1510]

Converting in a transmission module the power from the photovoltaic cell into an oscillating electrical power signal having an oscillation frequency

[1520]

Transferring the power to a transmitter resonator in wired electrical communication with the transmission module and configured to resonate at the oscillation frequency

[1530]

Receiving power in a receiver resonator configured to resonate at the oscillation frequency and disposed to receive the power from the transmitter resonator via at least one of capacitive coupling and magnetic induction

[1540]

Receiving the power in a receiver module in wired electrical communication with the receiver resonator

[1550]

Rendering via wired electrical communication to the power load the received power in direct current form.

FIG. 23

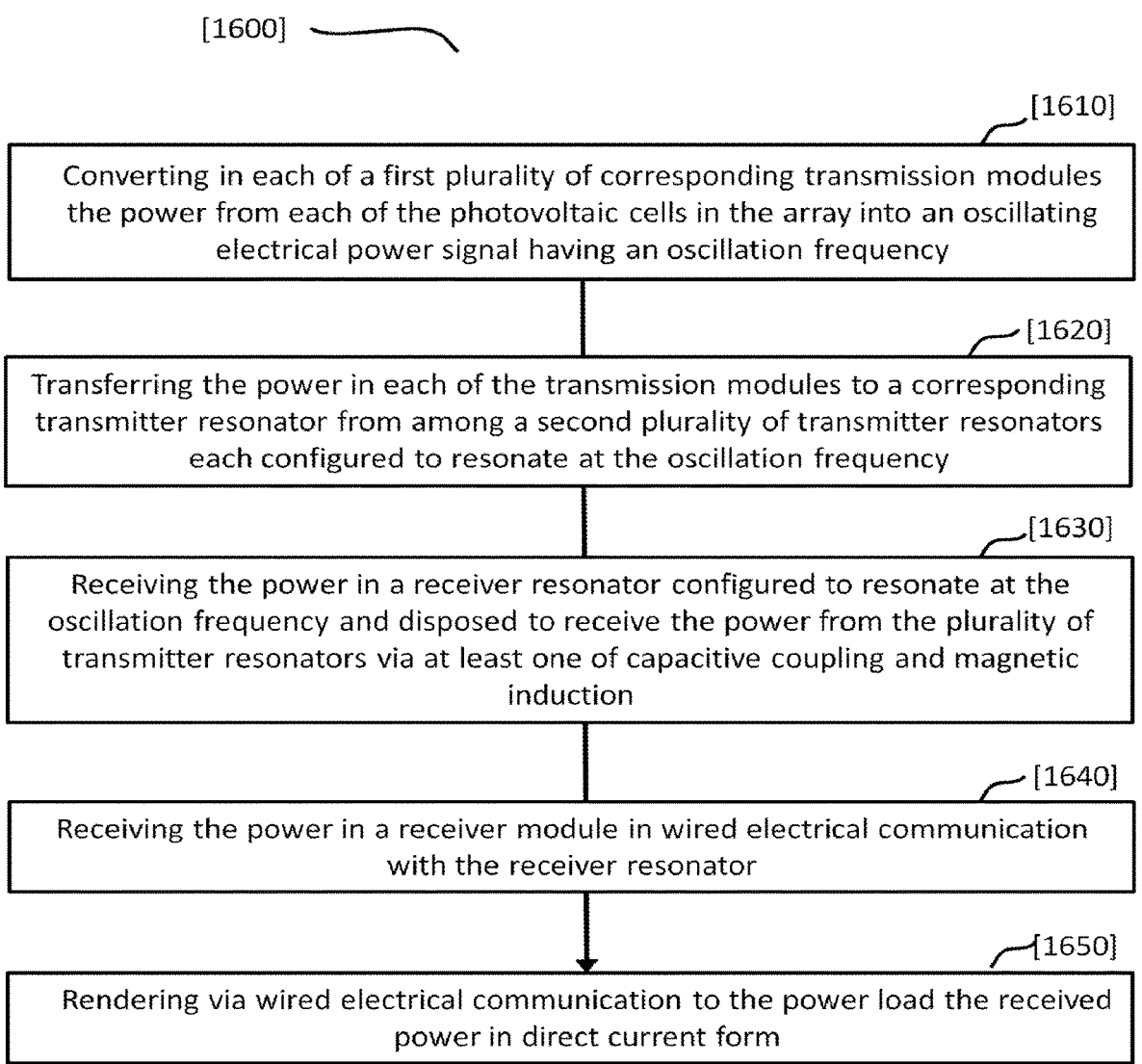

[1600]

[1610]

Converting in each of a first plurality of corresponding transmission modules the power from each of the photovoltaic cells in the array into an oscillating electrical power signal having an oscillation frequency

[1620]

Transferring the power in each of the transmission modules to a corresponding transmitter resonator from among a second plurality of transmitter resonators each configured to resonate at the oscillation frequency

[1630]

Receiving the power in a receiver resonator configured to resonate at the oscillation frequency and disposed to receive the power from the plurality of transmitter resonators via at least one of capacitive coupling and magnetic induction

[1640]

Receiving the power in a receiver module in wired electrical communication with the receiver resonator

[1650]

Rendering via wired electrical communication to the power load the received power in direct current form

FIG. 24

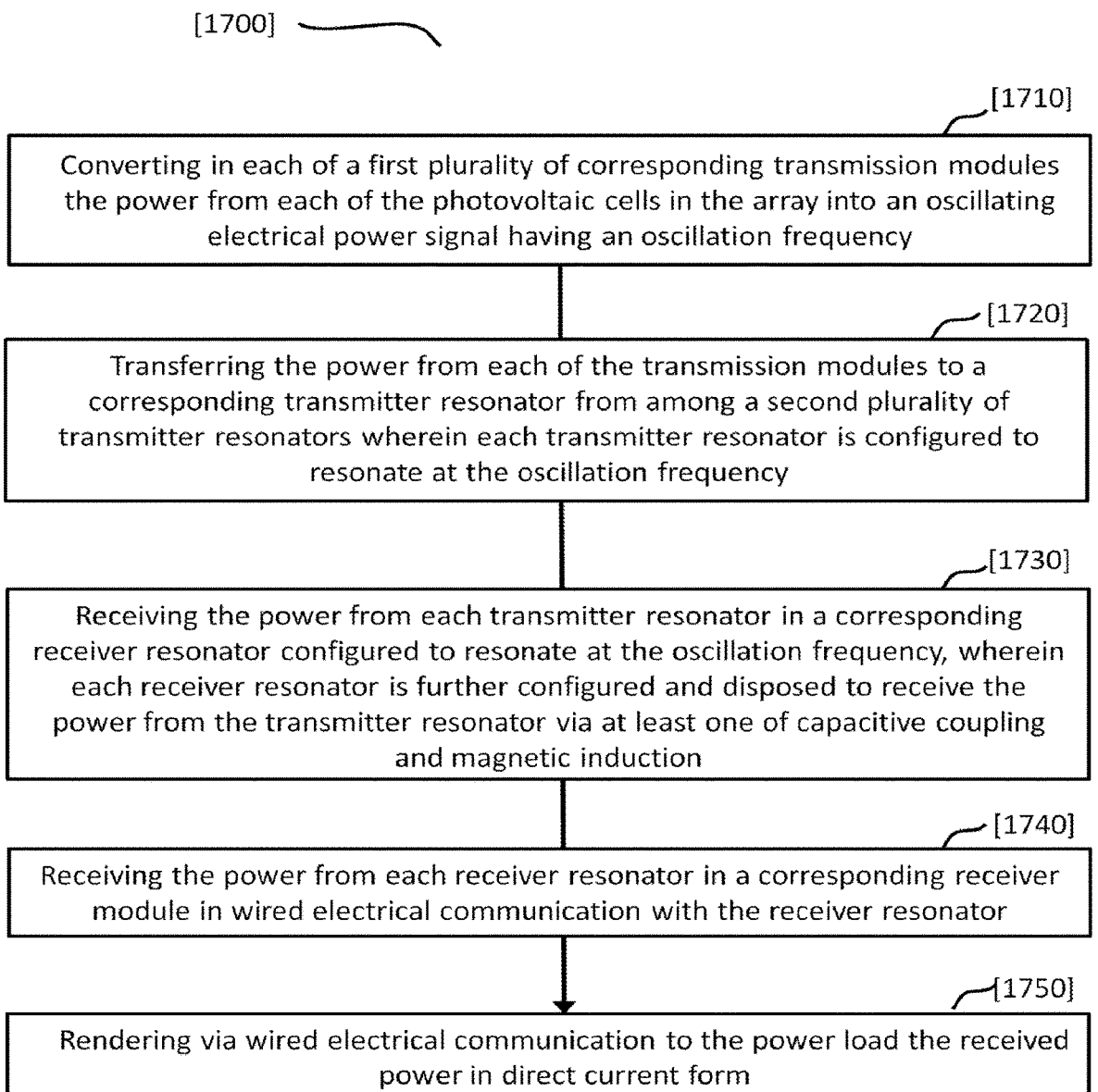

[1700]

[1710]

Converting in each of a first plurality of corresponding transmission modules the power from each of the photovoltaic cells in the array into an oscillating electrical power signal having an oscillation frequency

[1720]

Transferring the power from each of the transmission modules to a corresponding transmitter resonator from among a second plurality of transmitter resonators wherein each transmitter resonator is configured to resonate at the oscillation frequency

[1730]

Receiving the power from each transmitter resonator in a corresponding receiver resonator configured to resonate at the oscillation frequency, wherein each receiver resonator is further configured and disposed to receive the power from the transmitter resonator via at least one of capacitive coupling and magnetic induction

[1740]

Receiving the power from each receiver resonator in a corresponding receiver module in wired electrical communication with the receiver resonator

[1750]

Rendering via wired electrical communication to the power load the received power in direct current form

FIG. 25

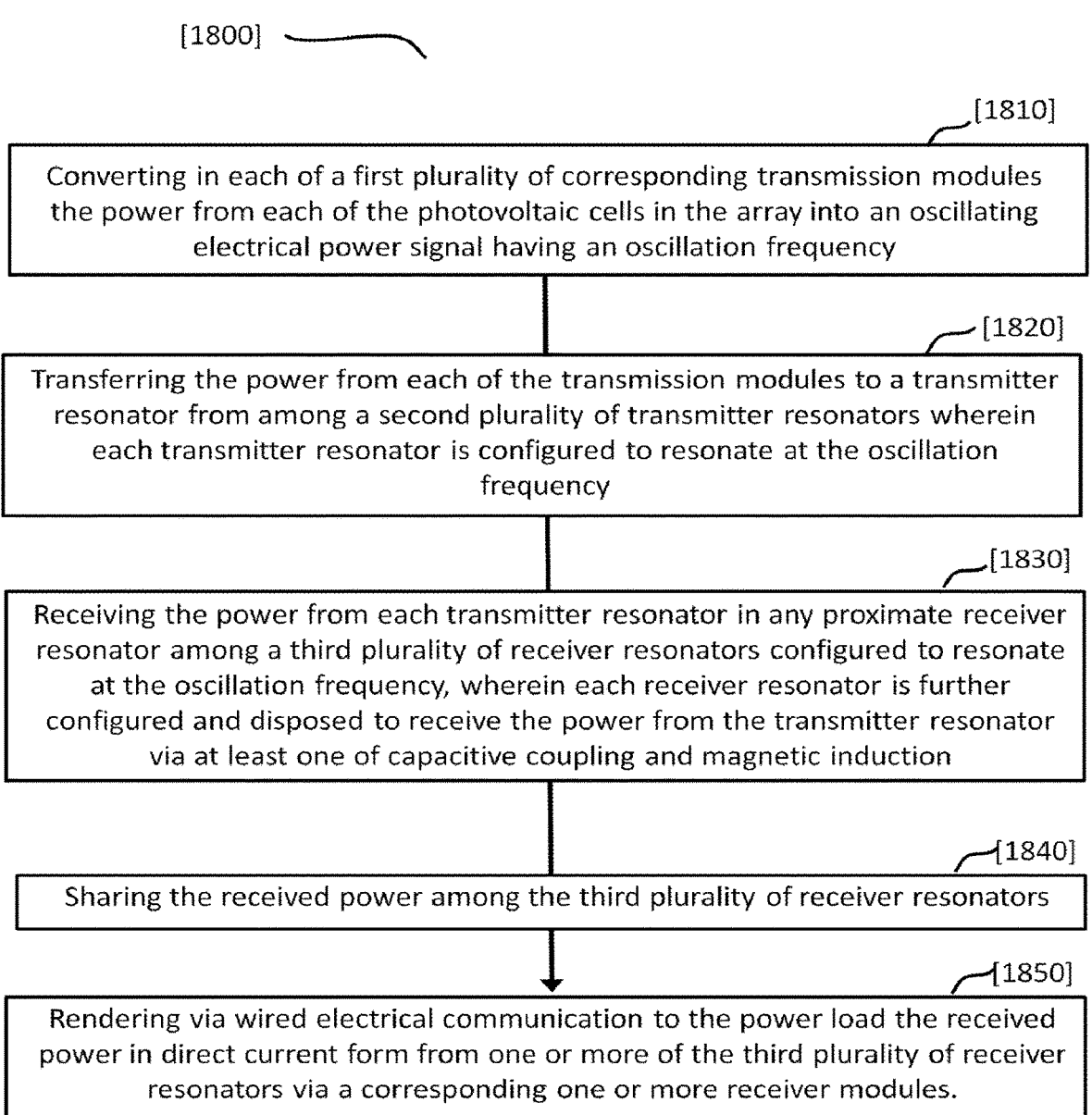

[1800]

[1810]

Converting in each of a first plurality of corresponding transmission modules the power from each of the photovoltaic cells in the array into an oscillating electrical power signal having an oscillation frequency

[1820]

Transferring the power from each of the transmission modules to a transmitter resonator from among a second plurality of transmitter resonators wherein each transmitter resonator is configured to resonate at the oscillation frequency

[1830]

Receiving the power from each transmitter resonator in any proximate receiver resonator among a third plurality of receiver resonators configured to resonate at the oscillation frequency, wherein each receiver resonator is further configured and disposed to receive the power from the transmitter resonator via at least one of capacitive coupling and magnetic induction

[1840]

Sharing the received power among the third plurality of receiver resonators

[1850]

Rendering via wired electrical communication to the power load the received power in direct current form from one or more of the third plurality of receiver resonators via a corresponding one or more receiver modules.

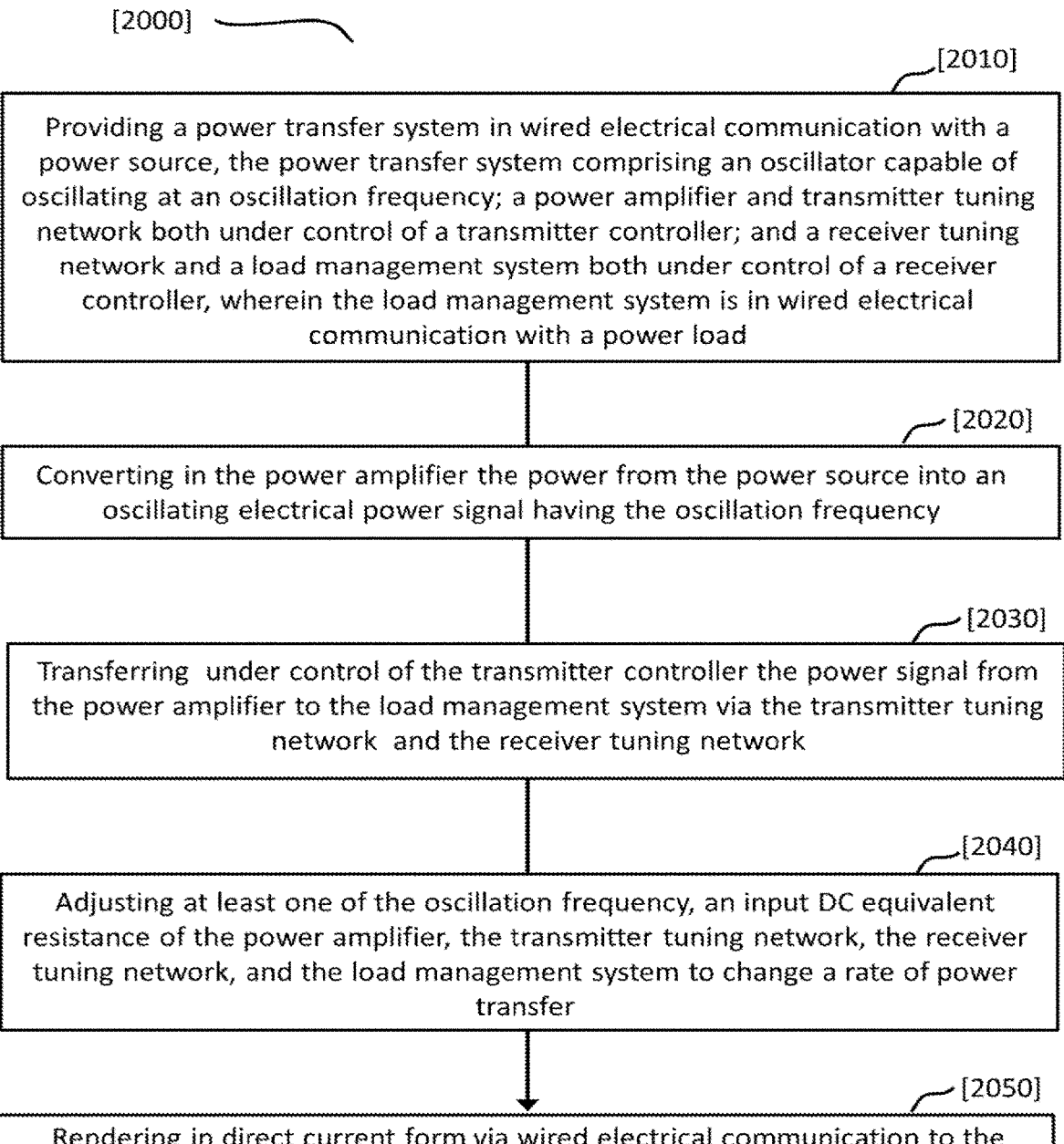

[2000]

[2010]
Providing a power transfer system in wired electrical communication with a power source, the power transfer system comprising an oscillator capable of oscillating at an oscillation frequency; a power amplifier and transmitter tuning network both under control of a transmitter controller; and a receiver tuning network and a load management system both under control of a receiver controller, wherein the load management system is in wired electrical communication with a power load

[2020]
Converting in the power amplifier the power from the power source into an oscillating electrical power signal having the oscillation frequency

[2030]
Transferring under control of the transmitter controller the power signal from the power amplifier to the load management system via the transmitter tuning network and the receiver tuning network

[2040]
Adjusting at least one of the oscillation frequency, an input DC equivalent resistance of the power amplifier, the transmitter tuning network, the receiver tuning network, and the load management system to change a rate of power transfer

[2050]
Rendering in direct current form via wired electrical communication to the power load the power received by the load management system.

FIG. 29

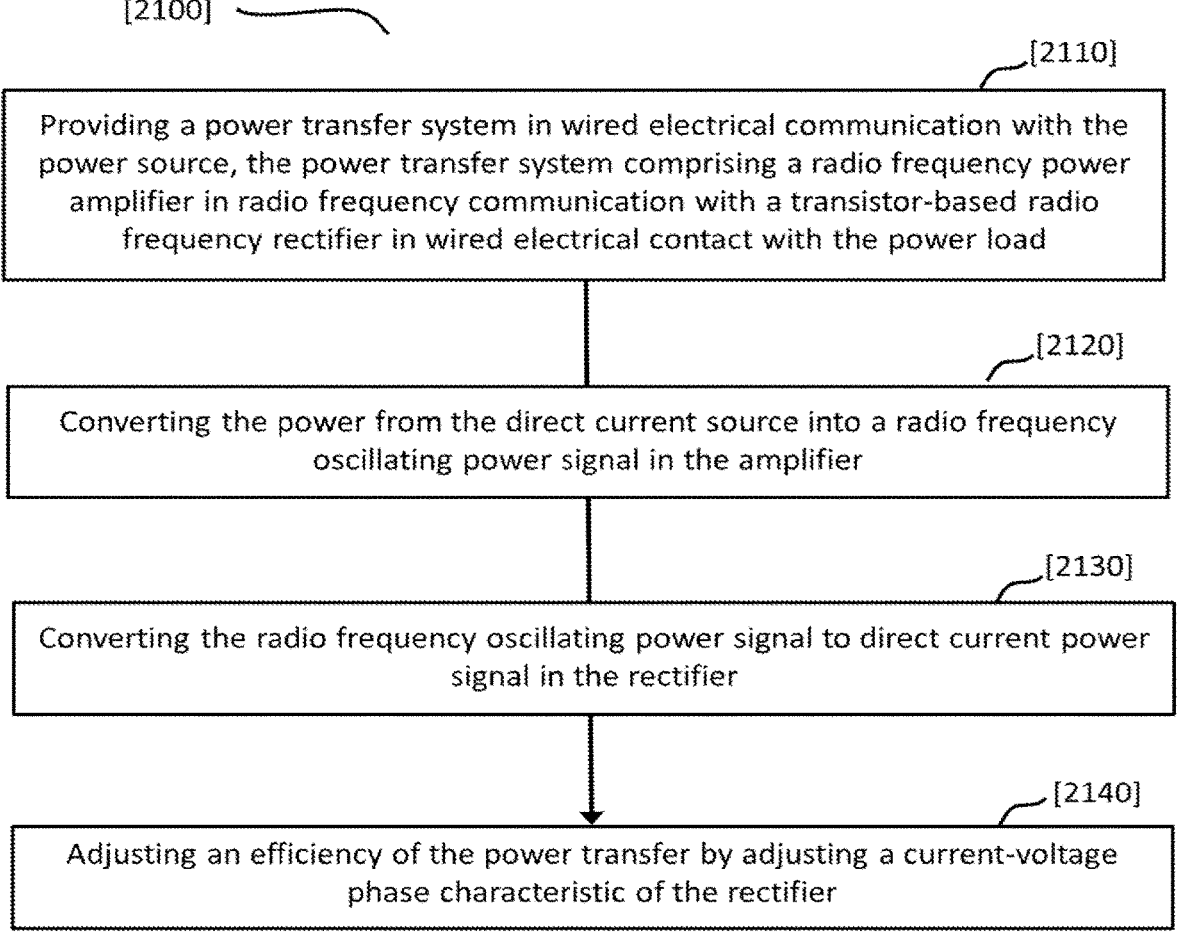

[2100]

[2110]

Providing a power transfer system in wired electrical communication with the power source, the power transfer system comprising a radio frequency power amplifier in radio frequency communication with a transistor-based radio frequency rectifier in wired electrical contact with the power load

[2120]

Converting the power from the direct current source into a radio frequency oscillating power signal in the amplifier

[2130]

Converting the radio frequency oscillating power signal to direct current power signal in the rectifier

[2140]

Adjusting an efficiency of the power transfer by adjusting a current-voltage phase characteristic of the rectifier

FIG. 30

PHOTOVOLTAIC POWER TRANSFER SYSTEM AND METHODS

CROSS-REFERENCE

This patent application is a continuation of U.S. patent application Ser. No. 17/437,383; which claims priority under 35 U.S.C. § 119(e) to U.S. Provisional Patent Application No. 62/817,159, filed Mar. 12, 2019; U.S. Provisional Patent Application No. 62/934,309, filed Nov. 12, 2019; U.S. Provisional Patent Application No. 62/944,645, filed Dec. 6, 2019; and U.S. Provisional Patent Application No. 62/956, 479, filed Jan. 2, 2020 each of which is incorporated herein by reference in their entirety.

FIELD OF THE INVENTION

The invention pertains to power transmitters, receivers and systems and methods of power transfer.

BACKGROUND

In inductive power transfer (IPT), power is typically transferred between coils of wire by a magnetic field. An alternating current (AC) is driven through a transmitter coil to create an oscillating magnetic field. The magnetic field passes through a receiving coil where it induces an alternating current in the receiving coil. The induced alternating current may either drive the load directly, or be rectified to direct current (DC), which is applied to drive the load. In order to achieve high efficiency, the transmitter and receiver coils must be very close together. For example, it is common for transmitter and receiver coils to be separated by only a fraction of the coil diameter (for example, within centimeters) and for the coils' axes to be closely aligned.

In some IPT systems, resonant inductive coupling is employed. Resonant inductive coupling may increase efficiency in IPT by using resonant circuits. Resonant inductive coupling may achieve higher efficiencies at greater distances than non-resonant inductive coupling. In resonant inductive coupling, power is transferred by magnetic fields between two resonant circuits, one in the transmitter and one in the receiver. The two circuits are tuned to resonate at the same resonant frequency.

In some IPT systems, magnetic fields can produce eddy-currents in nearby metals. This can cause significant temperature rise and fire hazard. Ferrite plates may be used to provide shielding and improve inductive coupling but may increase the cost of such systems.

Capacitive power transfer (CPT), makes use of electric fields for the transmission of power between two electrodes, such as metal plates. Commonly, four metal plates are used in a CPT system to form a capacitive coupler. Two plates are used as a power transmitter, and the other two plates act as a power receiver, resulting in at least two coupling capacitors to provide a power flow loop. An alternating voltage is applied by the transmitter to the transmitting plate. The oscillating electric field induces an alternating potential on the receiver plate, which causes an alternating current to flow in the load circuit. Resonance can also be used with capacitive coupling to extend the range of power transfer.

In a CPT system, eddy-current losses may be reduced and the plates used are low-cost and reduce the system cost. However, a problem with many systems is that high voltages may be imposed on the plates. These high voltages can generate strong electric fields, which result in significant field emission to the surrounding area.

There are also issues associated with the capacitive or inductive compensation networks in CPT and IPT systems. Currently, both CPT and IPT systems require minimal separation between receivers and transmitters. This typically requires large capacitors and inductors in the compensation networks on the primary and secondary sides. These large elements are difficult to produce, and their parasitic resistance can dramatically reduce the system efficiency. Additionally, these compensation elements are not directly involved in the power transfer process.

There remains a desire for wireless power transmitters and receivers with fewer components and/or reduced cost. There remains a desire for wireless power transmitters and receivers with reduced reliance on compensation networks. There remains a desire for wireless power transmitters and receivers with greater efficiency. There remains a desire for wireless power transmitters with more flexible requirements for alignment and spacing there between.

The field of power transfer as pertains to consumer products is becoming ever more important. In the automotive field, the electrical wire harness has become an important and costly subsystem of vehicles. The market for automotive wire harnesses is expected to exceed $77 billion US dollars in the present decade. In an age of focus on the gasoline mileage of internal combustion vehicles, carbon emissions of those vehicles, and electric vehicle range, the cost, weight, and power transfer efficiency of these harnesses have become items of major concern in the design of vehicles. Given that materials and components represent some 57% of automobile manufacturing costs, the concerns may be understood.

While battery technologies are steadily improving to provide higher energy density batteries, the consumer demand is simultaneously increasing for ever more ancillary user electronic devices and electrically driven systems integrated into the vehicle. This places ever greater demands on the batteries, the weight of the vehicle, the costs, and the efficiency of electrical power transfer. During the 1990s higher voltage battery systems were proposed for the automotive industry, partly in the hope of reducing wire harness weight.

There has been much effort to reduce the amount of costly copper employed in wire harnesses and there is a move towards the use of less expensive aluminum. This trend is also promoted by the hope of saving some 40 lbs of weight in a typical automobile. This trend toward aluminum has problems of its own, partly due to the 1.58 times higher resistivity of aluminum as compared with copper. Aluminum also suffers from a phenomenon known as creep that causes connections to loosen. Furthermore, the aluminum also oxidizes, necessitating precautions as regards connections. Some aspects of wire harnesses still require copper, and any connection between copper and aluminum introduces galvanic potential problems.

There is a clear need for an alternative approach to vehicle wire harnesses that reduces the expensive copper content, offers flexibility in respect of voltages, avoids the problems represented by aluminum, and reduces the weight.

At the same time, there is a need for power transfer technology efficiency to be improved to keep track with the rapidly advancing battery technology, in its turn spurred by developments in the field of electric vehicles.

These requirements are not limited to the automotive field and also pertain, for example, to the field of Solar energy power transfer and apply, with some modification, also to other consumer home equipment, such as computer and television displays. Power conditioning units to optimally extract power from sources with varying voltage are in extensive use today, but they generally suffer from a limited degree of control facilities. This in turn keeps the power transfer efficiency from being optimized.

The foregoing examples of the related art and limitations related thereto are intended to be illustrative and not exclusive. Other limitations of the related art will become apparent to those of skill in the art upon a reading of the specification and a study of the drawing.

SUMMARY

In a first aspect, a bimodal near-field resonant wireless electrical power transfer system is presented configured for simultaneous capacitive power transfer and inductive power transfer according to an adjustable transfer mode ratio at a resonant power signal oscillation frequency, the system comprising: a transmitter subsystem comprising a transmitter antenna subsystem and a power signal tuner module, the tuner module configured for adjusting the transfer mode ratio by adjusting a power signal provided by the tuner module to the transmitter antenna subsystem; and a receiver subsystem comprising a receiver antenna subsystem configured for receiving electrical power from the transmitter antenna subsystem at the transfer mode ratio.

A further aspect of the invention involves a bimodal near-field resonant wireless system for transferring power from one or more photovoltaic cells to a power load. One or more transmission modules are in electrical communication with the one or more photovoltaic cells, with each transmission module configured to convert the power from at least one of the one or more photovoltaic cells into an oscillating electrical power signal having a variable oscillation frequency. One or more transmitter resonators are in electrical communication with the one or more transmission modules, each transmitter resonator configured to resonate at the variable oscillation frequency. One or more receiver resonators are configured to resonate at the variable oscillation frequency and disposed to bimodally receive power from at least one of the one or more transmitter resonators simultaneously via capacitive coupling and magnetic induction according to an adjustable transfer mode ratio of the capacitive power transfer to the inductive power transfer at the variable oscillation frequency. One or more receiver modules are in electrical communication with the receiver resonator. Each receiver module is configured to receive power from the receiver resonators and render power received from the receiver resonators into a direct current voltage, and transmit the direct current voltage to the power load.

A method of the present invention involves bimodally transferring power from one or more photovoltaic cells to a power load. One or more transmission modules are provided in electrical communication with a corresponding one of the one or more photovoltaic cells. One or more transmitter resonators resonate at a variable oscillation frequency, each transmitter resonator being in electrical communication with a corresponding one of the one or more transmission modules. One or more receiver resonators resonate at the variable oscillation frequency while being in electrical communication with a corresponding receiver module. Conversion occurs in each transmission module power from the corresponding one of the one or more photovoltaic cells into an oscillating electrical power signal having the variable oscillation frequency. Bimodal power transfer then occurs from at least one of the one or more transmitter resonators to one or more of the receiver resonators via simultaneously capacitive coupling and magnetic induction according to an adjustable transfer mode ratio of the capacitive power transfer to the inductive power transfer at the variable oscillation frequency. The power received from the one or more receiver resonators is rendered into a direct current voltage whereby the direct current voltage may be supplied to the power load.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIGS. 4A, 4B, 4C and 4D depict side profile views of example resonators that may be used in various example embodiments or on their own or in combination with other disclosed elements.

FIG. 11 shows a flow chart of a near-field resonant wireless method for transferring power bimodally according to an adjustable transfer mode ratio at a resonant power signal oscillation frequency according to one example embodiment.

FIG. 15 shows a flow chart for a wireless near-field method for transferring power at a variable resonant power signal oscillation frequency from a multi-transmitter sub-system to a single resonant receiver subsystem.

FIG. 16 shows a flow chart for another wireless near-field method for transferring power at a variable resonant power signal oscillation frequency from a multi-transmitter subsystem to a single resonant receiver subsystem.

FIG. 17 shows a flow chart for a wireless near-field method for transferring power at a variable resonant power signal oscillation frequency from a multi-transmitter subsystem to a more than one resonant receiver subsystem.

FIG. 18 shows a flow chart for another wireless near-field method for transferring power at a variable resonant power signal oscillation frequency from a multi-transmitter subsystem to a more than one resonant receiver subsystem.

FIG. 23 shows a drawing of a flow chart for a method of wirelessly transferring electrical power from a photovoltaic solar cell to an electrical power load.

FIG. 24 shows a drawing of a flow chart for another method of wirelessly transferring electrical power from a photovoltaic solar cell array to an electrical power load.

FIG. 25 shows a drawing of a flow chart for another method of wirelessly transferring electrical power from a photovoltaic solar cell array to an electrical power load.

FIG. 26 shows a drawing of a flow chart for another method of wirelessly transferring electrical power from a photovoltaic solar cell array to an electrical power load.

FIG. 29 shows a flow chart for a method of transferring power from a direct current source to a power load.

FIG. 30 shows a flow chart for a further method of transferring power from a direct current source to a power load.

DETAILED DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

One aspect of the invention provides a wireless power transfer system comprising a transmitter (also referred to as a primary side) and a receiver (also referred to as a secondary side). Another aspect of the invention provides wireless power transmitters that may be employed as part of other wireless power transfer systems. Another aspect of the invention provides wireless power receivers that may be employed as part of other wireless power transfer systems. A transmitter according to some embodiments of the invention may comprise a resonator configured to transmit power by inductive power transfer and/or by capacitive power transfer. Similarly, a receiver according to some embodiments of the invention may comprise a resonator configured to receive power by inductive power transfer and/or by capacitive power transfer.

Figure 1:
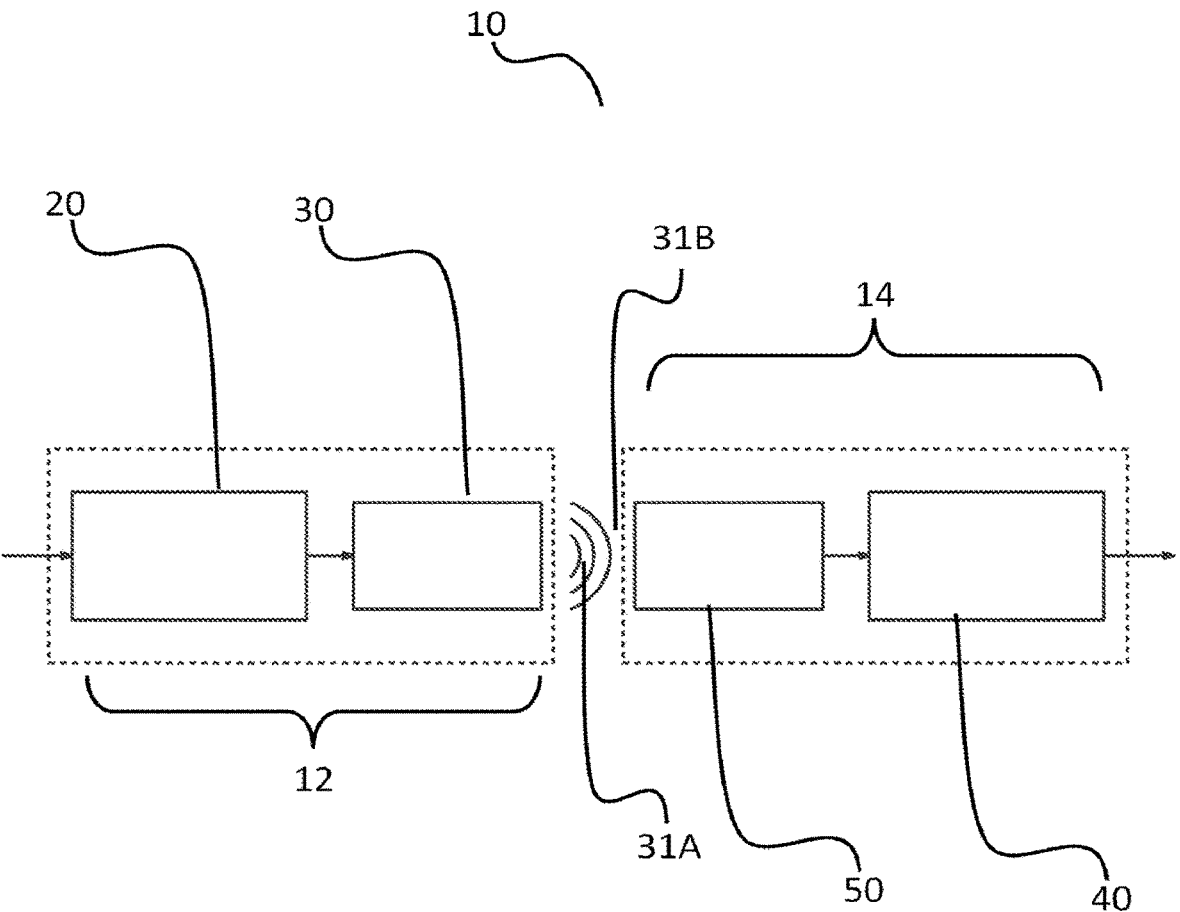
FIG. 1 is a schematic diagram of a wireless power transfer system according to one example embodiment.

FIG. 1 is a simplified schematic diagram of a wireless power transfer (WPT) system 10 comprising a primary side 12 and a secondary side 14. Primary side 12 may also be referred to as a transmitter and secondary side 14 may also be referred to as a receiver. Primary side 12 comprises a transmitter module 20 and a transmitter resonator 30 and secondary side 14 comprises a receiver module 40 and a receiver resonator 50.

Transmitter module 20 receives, as input, power comprising, for example, direct current (DC) power. Although not depicted, transmitter module 20 may comprise, for example, an inverter, a transmitter compensation network and/or other components as are described further herein. Transmitter module 20 delivers, as output, power comprising, for example, alternating current (AC) power to transmitter resonator 30.

Transmitter resonator 30 receives, as input, power from transmitter module 20 and may output a magnetic field 31A (for example, a time-varying magnetic field) and/or an electric field 31B (for example, a time-varying electric field). In some embodiments, transmitter resonator 30 outputs magnetic field 31A for the purpose of IPT. In some embodiments, transmitter resonator 30 outputs electric field 31B for the purpose of CPT. In some embodiments, resonator 30 simultaneously outputs magnetic field 31A and electric field 31B for the purpose of simultaneous transfer of power through CPT and IPT. In some embodiments, resonator 30 can switch between outputting electric field 31B for the purpose of CPT, outputting magnetic field 31A for the purpose of IPT and simultaneously outputting magnetic field 31A and electric field 31B for the purpose of simultaneous transfer of power through CPT and IPT.

In the presence of magnetic field 31A, a current may be induced in receiver resonator 50 for the purpose of IPT. In the presence of electric field 31B, an alternating potential may be induced on receiver resonator 50 (or one or more antennas thereof).

When a current is induced in receiver resonator 50 by magnetic field 31A, such current may be outputted to receiver module 40 Similarly, when an alternating potential is induced on receiver resonator 50 by electric field 31B, a current may be caused to flow into receiver module 40 by receiver resonator 50.

Receiver module 40 may receive, as input, from receiver resonator 50 power (for example, AC power) and may output power (for example, DC power) to a load. A load may be a charge for an electric storage device such as a battery or supercapacitor. By way of non-limiting example, the load may comprise or be an element of an electric bicycle (also referred to as an e-bicycle or e-bike) such as an e-bicycle that is part of a bike-share fleet, an automobile, a boat, etc. Although not depicted, receiver module 40 may comprise, for example, a rectifier, a receiver compensation network and/or other components as are discussed further herein.

WPT system 10 may be configured to adjust a ratio of power transferred from transmitter module 20 to receiver module 40 via CPT to power transferred by transmitter module 20 to receiver module 40 via IPT (the "transfer mode ratio"), for various reasons. For example, the transfer mode ratio may be adjusted to increase a proportion of power delivered by CPT when distance between transmitter resonator 30 and receiver resonator 50 increases; to increase a proportion of power delivered by IPT when a living being (for example, a human or an animal) is within proximity of WPT system 10; to increase a proportion of power delivered by CPT when an object (for example, a metal object) is within proximity of WPT system 10; to increase a proportion of power delivered by CPT when alignment between transmitter resonator 30 and receiver resonator 50 worsens; and/or to do any combination of the foregoing.

In some embodiments, the transfer mode ratio may be adjusted according to a maximum power point tracking technique such as, but not limited to, "observe and perturb" as is sometimes employed for wind turbines and solar panels (see, for example, S. Dehghani, S. Abbasian and T. Johnson, *"Adjustable Load With Tracking Loop to Improve RF Rectifier Efficiency Under Variable RF Input Power Conditions,"* in IEEE Transactions on Microwave Theory and Techniques, vol. 64, no. 2, pp. 343-352, Feb. 2016.). In some embodiments, the transfer mode ratio may be adjusted according to a machine learned algorithm. For example, in some embodiments, if WPT system 10 determines that a WPT efficiency is undesirably low, WPT system 10 may increase a proportion of power delivered by CPT (or IPT). If the WPT efficiency is negatively impacted by increasing reliance on CPT (or IPT), then WPT system 10 may decrease the reliance on CPT (or IPT). This process may be repeated iteratively until a desirable/maximum WPT efficiency is attained.

Each of transmitter resonator 30 and receiver resonator 50 may comprise a plurality of antennas 80 arranged in various configurations.

Figure 2A:
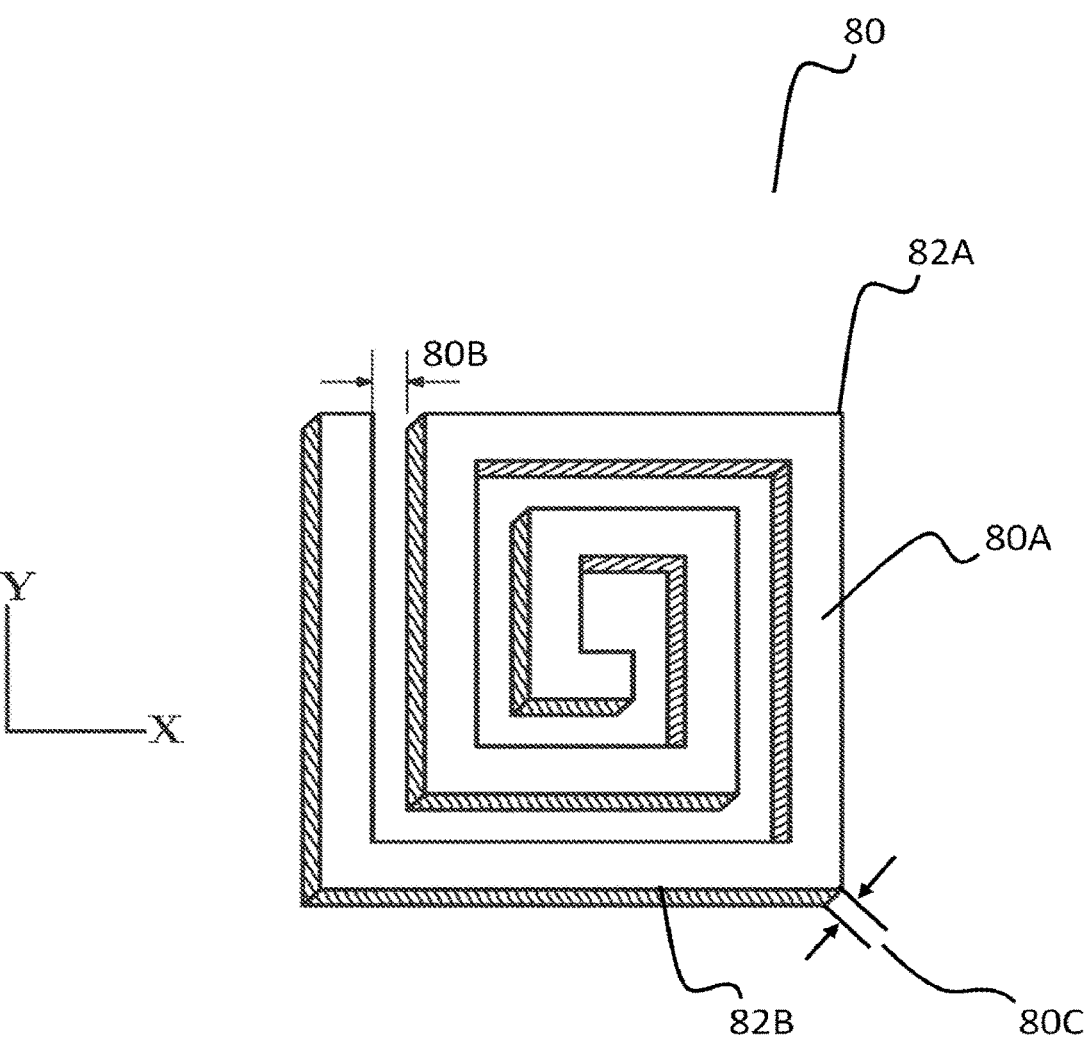
FIGS. 2A, 2B and 2C depict antennas that may be used in various example embodiments or on their own or in combination with other disclosed elements.
Figure 2B:
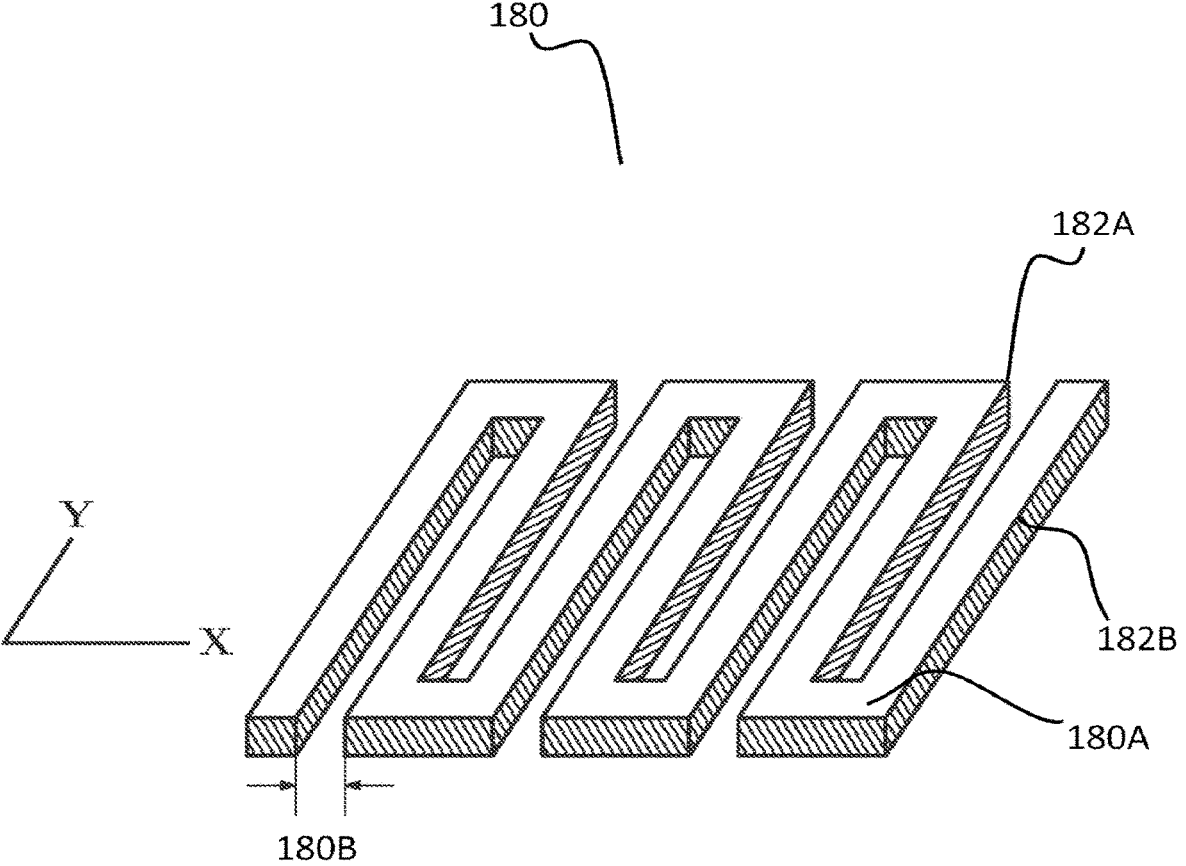
Figure 2C:
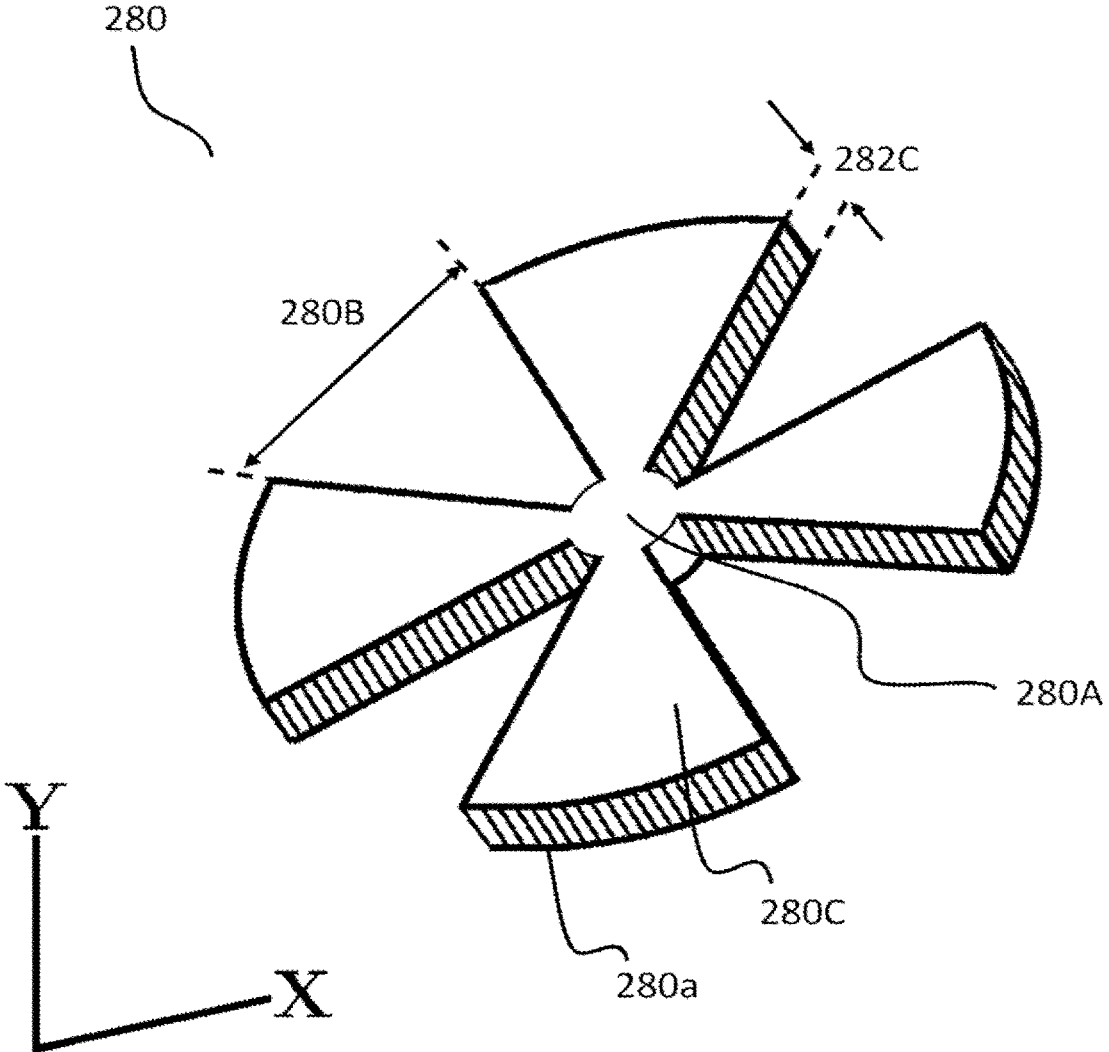

Antenna 80 may comprise any suitable antenna having a high self-inductance and a high self-capacitance that is capable of creating both magnetic field 31A and electric field 31B (separately and/or simultaneously) for the purpose of CPT and IPT. FIGS. 2A, 2B and 2C depict non-limiting examples of antennas 80, 180, 280. For the purposes herein, a "high self-inductance" is a self-inductance that is sufficiently great to allow the antenna to generate a magnetic field suitable for the purposes of IPT. Similarly, for the purposes herein "high self-capacitance" is a self-capacitance that is sufficiently great to allow the antenna to generate an electric field suitable for the purposes of CPT.

FIG. 2A depicts an antenna 80 according to one embodiment of the invention. Antenna 80 may comprise any suitable conductive material. For example, antenna 80 may comprise copper, gold, silver, aluminum, other suitable material, or a combination thereof. As can be seen from FIG. 2A, antenna 80 comprises an elongated element 80A having a rectangular (for example, square) cross-section that has been bent or formed in the shape of a generally planar rectangular (in the XY plane) coil such that adjacent wrappings of elongated element 80A are spaced apart by a gap 80B. While gap 80B is depicted as being generally constant along the length of elongated element 80, this is not mandatory.

To increase self-inductance of antenna 80, the size of gap 80B may be reduced. To increase self-capacitance of antenna 80, the number of bends (for example, bend 82A) of elongated element 80A may be increased, the number of corners and edges (for example, edge 82B) of elongated element 80A may be increased, the length of elongated element 80A may be increased and/or the thickness 80C of elongated element 80A may be increased.

FIG. 2B depicts another non-limiting example of an antenna 180 according to another embodiment of the invention. Antenna 180 is substantially like first antenna 80 except that instead of being bent or formed in the shape of a generally planar rectangular coil, elongated element 180A is bent or formed in the shape of a generally planar zig-zag shape having square corners, as depicted in FIG. 2B. Like antenna 80, adjacent zigs or zags of elongated element 180A are spaced apart by a gap 180B. While gap 180B is depicted as being generally constant along the length of elongated element 180, this is not mandatory.

To increase self-inductance of antenna 180, the size of gap 180B may be reduced. To increase self-capacitance of antenna 180, the number of bends (for example, bend 182A) of elongated element 180A may be increased, the number of corners and edges (for example, edge 182B) of elongated element 180A may be increased and/or the thickness 180C of elongated element 180A may be increased.

FIG. 2C depicts another non-limiting example of antenna 280 according to another embodiment of the invention. Antenna 280 is substantially like first antenna 80 except that instead of being bent or formed in the shape of a generally planar rectangular coil, elongated element 280A is bent or formed in a generally planar circular shape (in the XY plane) with a hub element 280A from which sector elements 280C extend radially outwardly. Adjacent sector elements 280C are spaced apart from one another by gaps 280B.

To increase self-inductance of antenna 280, the size of gaps 280B may be reduced. To increase self-capacitance of antenna 280, the number of sectors 280C may be increased, the number of corners and edges (for example, edge 282A) of hub 280A and/or sectors 280C may be increased and/or the thickness 280C of elongated hub 280A and/or sectors 280C may be increased.

While FIGS. 2A, 2B and 2C depict exemplary non-limiting embodiments of antennas 80, 180, 280, it should be understood that many other shapes and configurations of suitable antennas 80 may be employed in the resonators described herein. Non-limiting examples of changes that could be made to the depicted antennas include changing the cross-sectional shape of the elongated elements 80A, 180A to be other than rectangular (for example, triangular, circular, hexagonal, etc.), changing 90° bends 82A, 182A to be non-90° or to be rounded, changing the XY plane shapes of first transmitter antennas 80 to be other than rectangular or circular, using non-repeating patterns of bends and corners, etc.

Figure 3A:
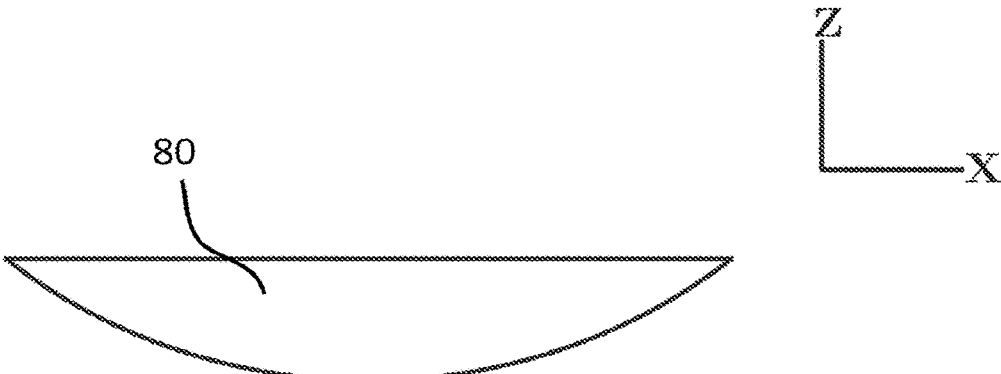
FIGS. 3A and 3B depict side profile views of antennas that may be used in various example embodiments or on their own or in combination with other disclosed elements.
Figure 3B:
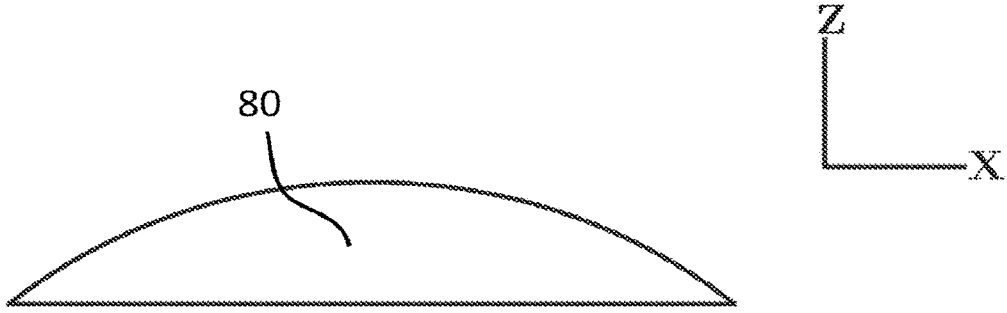

While antennas 80, 180, 280 are described and depicted herein as being relatively flat or planar (for example, not varying substantially in thickness in the Z direction), this is not mandatory. In some embodiments, antenna 80, 180, 280 may have a conical concave or conical convex shape as depicted in FIGS. 3A and 3B. For example, antennas herein could have a conical helix shape (not depicted). In some embodiments, antenna 80 could have a rectangular conical helix shape such that the inner windings of antenna 80 are spaced apart in the Z direction from the outer windings of antenna 80. Such conical shapes may allow a resonator to be used for a broader range of resonant frequencies. In other embodiments, a thickness in the Z direction of first transmitter antenna may vary in other ways.

Antennas 80, 180, 280 may be, for example, arranged in configurations similar to those of plates in a CPT WPT system. For example, in a two antenna WPT system according to one embodiment of the invention, transmitter resonator 30 may comprise a first transmitter antenna 32 arranged parallel to a first receiver antenna 52 of receiver resonator 50 as shown in FIG. 4A. For the purpose of CPT, the mutual capacitance between the two antennas 32, 52 provides a path for the current to flow forward to the receiver side, and a conductive path (for example, ground) would allow the current to flow back to the transmitter side. For the purpose of IPT, by driving a current through first transmitter antenna 32, a magnetic field 31A is generated that may induce a current in first receiver antenna 52. For the purpose of CPT, a voltage may be applied to first transmitter antenna 32 to create a potential difference between first transmitter antenna 32 and first receiver antenna 52 thereby creating an electric field 31B.

First transmitter antenna 32 may comprise any suitable antenna having a high self-inductance and a high self-capacitance that is capable of creating both magnetic field 31A and electric field 31B (separately and/or simultaneously). For example, first transmitter antenna may comprise one of antennas 80, 180, 280 or any other antenna described herein.

First receiver antenna 52 may comprise any suitable antenna having a high self-inductance and a high self-capacitance that is capable of having a current induced therein by magnetic field 31A and of having a potential difference thereon due to electric field 31B (separately and/or simultaneously). In some embodiments, first receiver antenna 52 may be substantially similar to first transmitter antenna 32 (for example, first receiver antenna 52 may have the same characteristics of any of the antennas described or depicted herein or otherwise). In some embodiments, antennas 32, 52 may be different from one another (for example, first transmitter antenna 32 may comprise antenna 80 while first receiver antenna 52 may comprise antenna 180).

In some embodiments, an XY planar area of first transmitter antenna 32 is smaller than an XY planar area of first receiver antenna 52 to improve coupling between first transmitter antenna 32 and first receiver antenna 52.

Figure 4B:
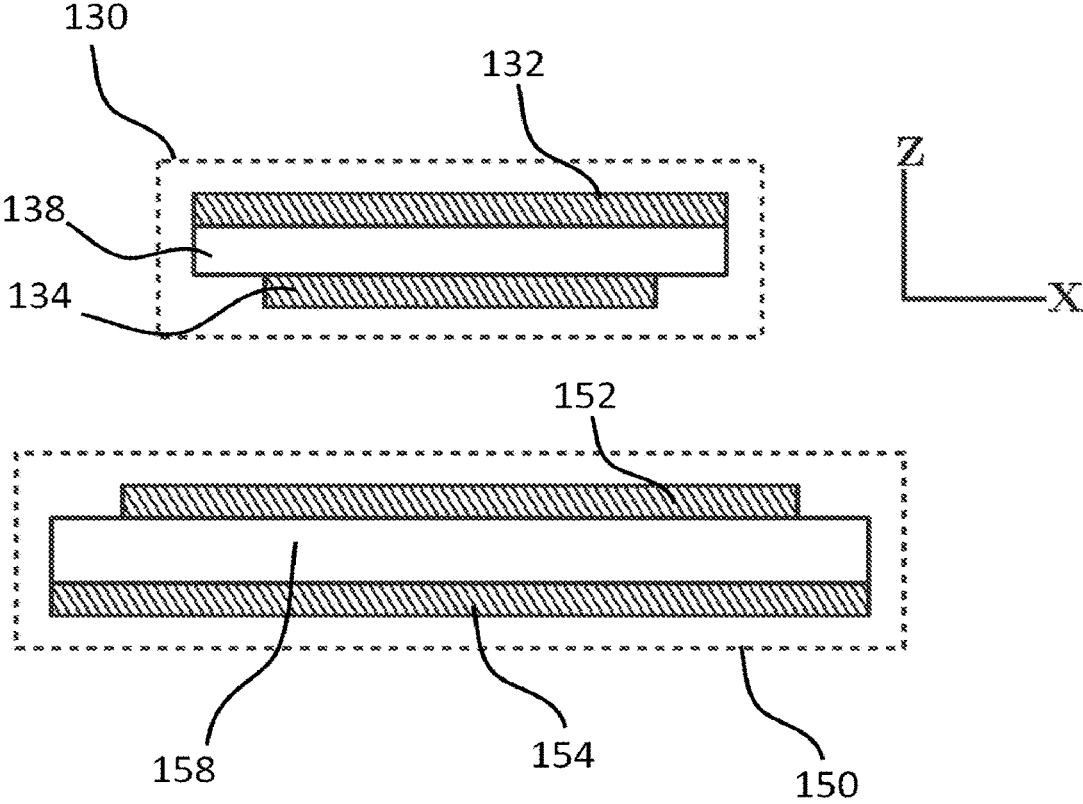

FIG. 4B depicts another example of a configuration of antennas 80, 180, 280. In particular, FIG. 4B depicts a four antenna stacked (or four antenna vertical) WPT system. Each of transmitter resonator 130 and receiver resonator 150 comprises two antennas. Together, one antenna of transmitter resonator 30 and one antenna of receiver resonator 150 provide a forward path for power and together the other antenna of transmitter resonator 130 and the other antenna of receiver resonator 150 provide a return path for power.

For the purpose of IPT, by driving a current through antennas 132, 134 of the transmitter, a magnetic field is generated that may induce a current in first and second receiver antennas 152, 154. For the purpose of CPT, a potential difference may be applied between first and second antennas 132, 134 to generate an electric field (31B shown in FIG. 1) to induce a potential across first and second receiver antennas 152, 154.

As depicted in FIG. 4B, transmitter resonator 130 comprises a first transmitter antenna 132 and a second transmitter antenna 134 separated in the Z direction by a spacer 138.

First transmitter antenna 132 may comprise any suitable antenna having a high self-inductance and a high self-capacitance that is capable of creating both magnetic field 31A and electric field 31B (separately and/or simultaneously). For example, first transmitter antenna may comprise one of antennas 80, 180, 280 or any other antenna described herein.

Spacer 138 may comprise any suitable material. For example, spacer 138 may comprise air, a dielectric material, ferrite or some combination thereof. Spacer 138 may have a permittivity constant chosen to change electric field 31A and/or it may have a permeability constant chosen to change magnetic field 31B. Spacer 138 may comprise a high permittivity material to increase the capacitance of transmitter resonator 130. The thickness and planar area of spacer 138 may be dependent on the thickness and/or planar area of first and second transmitter antennas 132, 134. In some embodiments, electrical isolation may be desirable and a low permittivity material may be employed for spacer 138 (for example, for shielding).

Second transmitter antenna 134 may comprise any suitable antenna having a high self-inductance and a high self-capacitance that is capable of creating both magnetic field 31A and electric field 31B (separately and/or simultaneously). In some embodiments, second transmitter antenna 134 may be substantially similar to first transmitter antenna 132 (for example, second transmitter antenna 134 may have the same characteristics of any of the antennas described or depicted herein or otherwise). In some embodiments, first and second transmitter antennas 132, 134 and first and second receiver antennas 152, 154 may be different from one another (for example, first and second transmitter antennas 132, 134 may be like antenna 80 while first and second receiver antennas 152, 154 may be like antenna 180).

In some embodiments the XY planar area of second transmitter antenna 134 may be a different size than the XY planar area of first transmitter antenna 132. In some embodiments the XY planar area of second transmitter antenna 134 may be smaller than the XY planar area of first transmitter antenna 132 to ensure coupling between each pair of antennas. In some embodiments the XY planar area of second transmitter antenna 134 may be larger than the XY planar area of first transmitter antenna 132.

Figure 5:
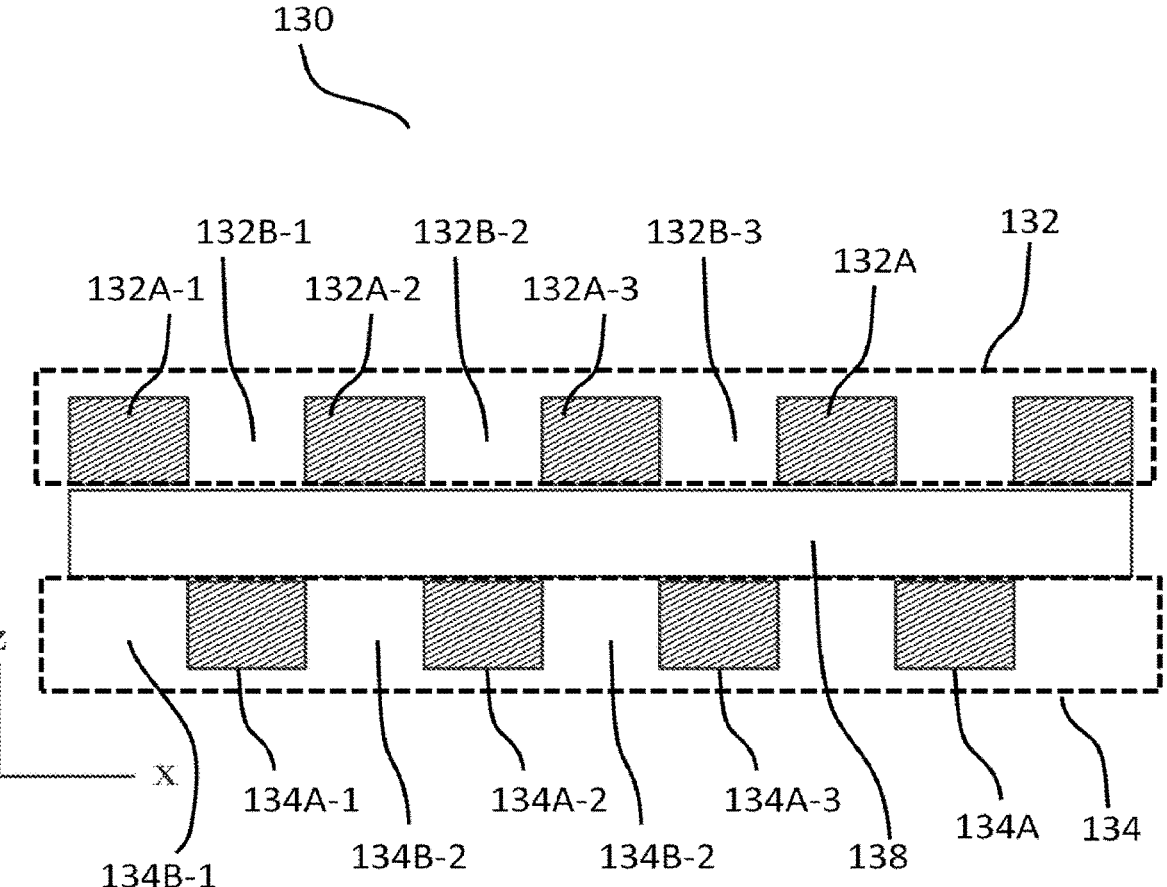
FIG. 5 depicts a cross-section of an example resonator that may be used in various example embodiments or on its own or in combination with other disclosed elements.

In some embodiments, second transmitter antenna 134 is substantially complementary to first antenna 132 in size and/or shape such that first transmitter antenna 132 does not substantially overlap in the Z direction with second transmitter antenna 134. FIG. 5 depicts a schematic representation of an XZ plane cross-section of a portion of a transmitter resonator 130 where first transmitter antenna 132 and second transmitter antenna 134 are each substantially shaped like first transmitter antenna 180 in FIG. 2B. As can be seen, portions 132A-1, 132A-2, 132A-3 of elongated element 132A of first transmitter antenna 132 overlap in the Z direction with gaps 134B-1, 134B-2, 134B-3 of second transmitter antenna 134 (for example, a line oriented in the Z direction that passes through portion 132A-1 of elongated element 132A of first antenna 132 passes through gap 134B-1 of second antenna 134) and portions 134A-1, 134A-2, 134A-3 of elongated element 134A of second transmitter antenna 134 overlap in the Z direction with gaps 132B-1, 132B-2, 132B-3 of first transmitter antenna 132 (for example, a line oriented in the Z direction that passes through portion 134A-1 of elongated element 134A of second antenna 134 passes through gap 132B-1 of second antenna 134). The complementary shapes of first transmitter antenna 132 and second antenna 134 may reduce parasitic energy loss experienced by transmitter resonator 130. In some embodiments, first and second transmitter antennas 132, 134 may not be completely complementary but may have one or more complementary portions.

Receiver resonator 150 comprises a first receiver antenna 152 and a second receiver antenna 154 separated in the Z direction by a spacer 158. First receiver antenna 152 may be substantially similar to any of antennas 80, 180, 280 or otherwise described herein. Second receiver antenna 154 may also be substantially similar to any of antennas 80, 180, 280 or otherwise described herein. Like first and second transmitter antennas 132, 134, first and second receiver antennas 152, 154 may be complementary (or partially complementary) in size and/or shape.

In some embodiments, an XY planar area of first and second receiver antennas 152, 154 is different from an XY planar area of first and second transmitter antennas as depicted in FIG. 4B in order to adjust the self-inductance or self-capacitance of receiver resonator 150. For example, in some embodiments, an XY planar area of first and second receiver antennas 152, 154 is greater than an XY planar area of first and second transmitter antennas 132, 134 as depicted in FIG. 2A. Such XY planar area differential may improve the ability of receiver resonator 150 to capture more of magnetic field 31A and/or electric field 31B.

Spacer 158 may comprise any suitable spacer. Spacer 158 may comprise the same or similar materials to spacer 138 or different materials from spacer 138. As compared to spacer 158, spacer 138 may have a smaller Z direction dimension to achieve a desired self-capacitance and/or self-inductance. This may effectively change coupling coefficient of the link between primary side 12 and secondary side 14 and the impedance of primary side 12. Different compensation networks may be employed in both primary and secondary sides 12, 14 to accommodate such coupling coefficient and impedance changes.

Figure 4C:
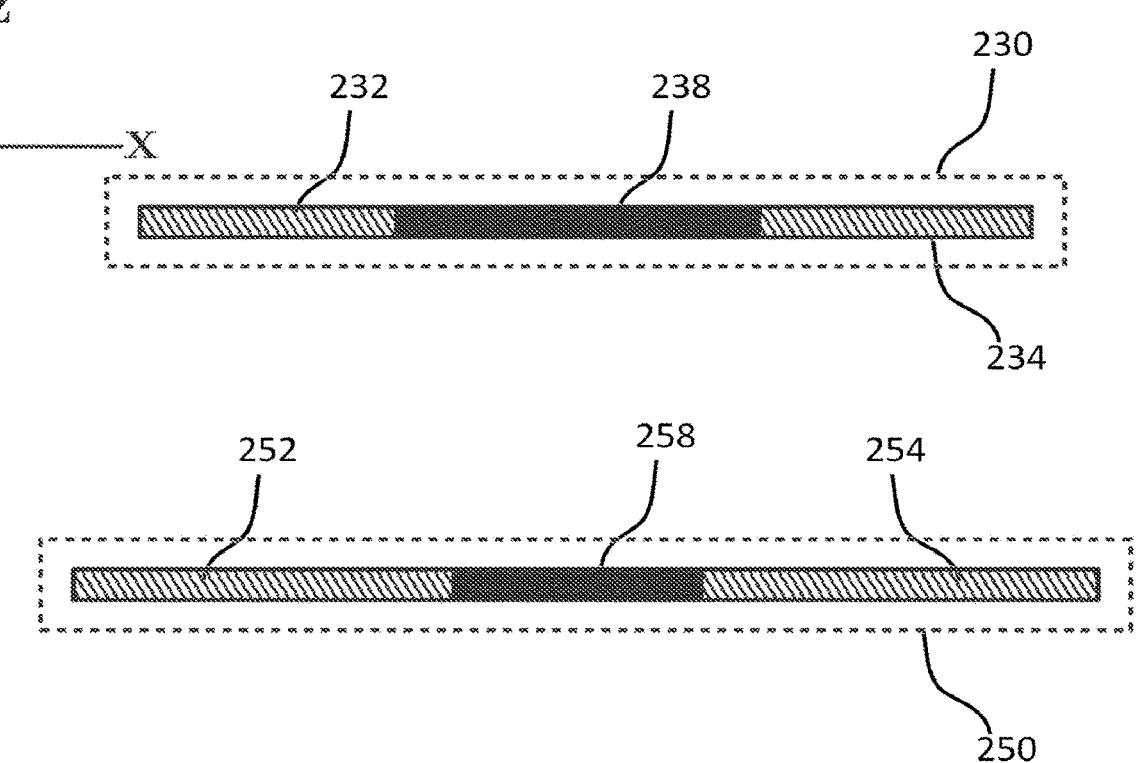

As compared to the four antenna parallel structure depicted in FIG. 4C, the FIG. 4B stacked configuration is much more compact in the XY plane. In addition, since all the antennas can be center aligned, this configuration is robust to angular misalignment. Specifically, when the antennas are in circular shape, angular rotation has no influence on the coupling capacitances. However, as compared to the four-antenna parallel structure depicted in FIG. 4C, the mutual conductance of the FIG. 4B stacked configuration may be lower due to increased cross-coupling capacitances.

FIG. 4C depicts another example of a configuration of antennas 80, 180, 280. In particular, FIG. 4C depicts a four antenna parallel (or four antenna horizontal) WPT system. Each of transmitter resonator 230 and receiver resonator 250 comprises two antennas. Together, one antenna of transmitter resonator 230 and one antenna of receiver resonator 250 provide a forward path for power and together the other antenna of transmitter resonator 230 and the other antenna of receiver resonator 250 provide return path for power.

For the purpose of IPT, by driving a current through antennas 232, 234 of the transmitter, a magnetic field is generated that may induce current in first and second receiver antennas 252, 254. For the purpose of CPT, a potential difference may be created between first and second antennas 232, 234 to generate an electric field 31B to induce a potential across first and second receiver antennas 252, 254.

As compared to transmitter and receiver resonators 130, 150, shown in FIG. 4B, transmitter and receiver resonators 230, 250, having a horizontal arrangement of antennas, may be desirable in applications where there is a limitation on the Z direction dimension of the resonators.

Transmitter resonator 230 comprises a first transmitter antenna 232 and a second transmitter antenna 234 separated in the X direction by a spacer 238. By separating first and second transmitter antennas 232, 234 in the X direction, parasitic energy loss may be reduced. First and second transmitter antennas 232, 234 may be substantially similar to first and second transmitter antennas 132,134 and spacer 238 may be substantially similar to spacer 138. Like transmitter resonator 130, first transmitter antenna 232 may have a greater XY plane area than that of second transmitter antenna 234 to improve the forward path for power transfer.

Spacer 238 may comprise any suitable material. For example, spacer 238 may comprise air, a dielectric material, ferrite or a combination thereof. Spacer 238 may have a permittivity constant chosen to change electric field 31A and/or it may have a permeability constant chosen to change magnetic field 31B. Spacer 238 may comprise a high permittivity material to increase the capacitance of transmitter resonator 230. The thickness and planar area of spacer 238 may be dependent on the thickness and/or planar area of first and second transmitter antennas 232, 234. In some embodiments, electrical isolation may be desirable, and a low permittivity material may be employed for spacer 238 (for example, for shielding).

Receiver resonator 250 comprises a first receiver antenna 252 and a second receiver antenna 254 separated in the X direction by a spacer 258. By separating first and second receiver antennas 252, 254 in the X direction, parasitic energy loss may be reduced. First and second receiver antennas 252, 254 may be substantially similar to first and second receiver antennas 152, 154 and spacer 258 may be substantially similar to spacer 138. Like receiver resonator 150, first receiver antenna 252 may have a greater XY plane area than that of second receiver antenna 254.

Spacer 258 may comprise any suitable spacer. Spacer 258 may comprise the same or similar materials to spacer 238 or different materials from spacer 238. As compared to spacer 258, spacer 238 may have a smaller Z direction dimension to achieve a desired self-capacitance and/or self-inductance. This may effectively change coupling coefficient of the link between primary side 12 and secondary side 14 and the impedance of primary side 12. Different compensation networks may be employed in both primary and secondary sides 12, 14 to accommodate such coupling coefficient and impedance changes.

In some embodiments, the XY plane area of spacer 258 may be different from the XY plane area of spacer 238 in order to vary the self-inductance or self-capacitance of transmitter resonator 230 or receiver resonator 250. For example, as compared to spacer 258, spacer 238 may have a smaller XY plane area as depicted.

Figure 4D:
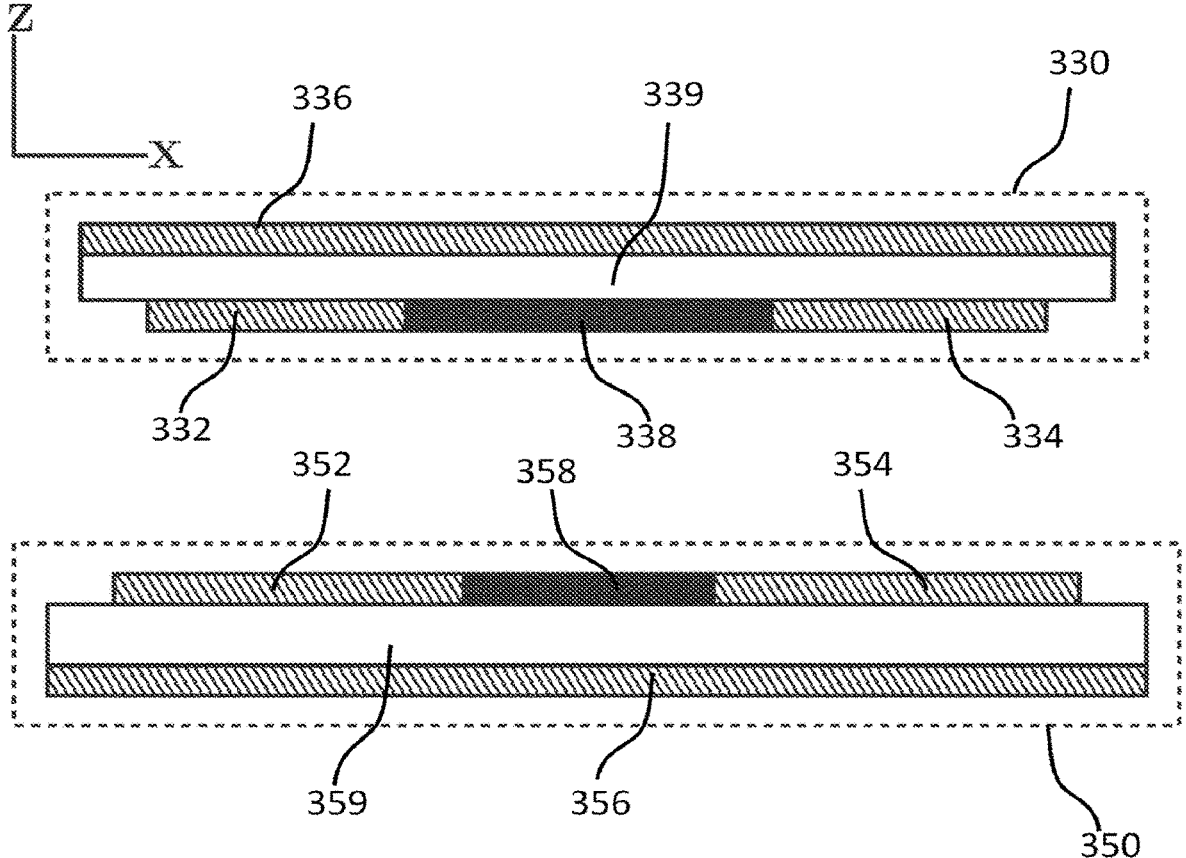

FIG. 4D depicts another example of a configuration of antennas 80, 180, 280. In particular, FIG. 4D depicts a six antenna WPT system which combines the stacked configuration of FIG. 4B and the parallel configuration of FIG. 4C. Each of transmitter resonator 130 and receiver resonator 150 comprises three antennas. Together, one antenna of first and second transmitter antennas 332, 334 and one of first and second receiver antennas 352, 354 provide a forward path for power and together the other of first and second transmitter antennas 332, 334 and the other of first and second receiver antennas 352, 354 provide a return path for power. Third transmitter and receiver antennas 336, 356 work as auxiliary antennas to increase the equivalent self-capacitance and serve as electric field shielding. In some embodiments, third transmitter and receiver antennas 336, 356 are passive (for example, a potential difference is not applied between third transmitter and receiver antennas 336, 356 and/or current is not driven through third transmitter and receiver antennas 336, 356). For the purpose of IPT, by driving a current through one or more of antennas 332, 334, 336 of the transmitter, a magnetic field is generated that may induce a current in first receiver antennas 352, 354, 356. For the purpose of CPT, a voltage may be applied to first transmitter antenna 332, second transmitter antenna 334 and/or third transmitter antenna 336 to create a potential difference between any of first, second and third transmitter antennas 332, 334, 336 thereby creating an electric field 31B.

Transmitter resonator 330 comprises a first transmitter antenna 332 and a second transmitter antenna 334 separated in the X direction by a spacer 338 and a third transmitter antenna 336 separated from first and second transmitter antennas and spacer 338 by a second spacer 339. Third transmitter antenna 336 may provide electric field shielding to reduce undesirable escape of electric fields from transmitter resonator 330. Third transmitter antenna 336 may contain a ferrite sheet or surface to provide magnetic field shielding to reduce undesirable escape of magnetic fields from transmitter resonator 330. Shielding or shaping of electric or magnetic fields may also be possible by changing the spacer 339.

First and second and third transmitter antennas 332, 334, 336 may be substantially similar to any of first and second transmitter antennas 132, 134. Spacers 338, 339 may be substantially similar to spacer 138 Like transmitter resonator 130, first transmitter antenna 332 may have a greater XY plane area than that of second transmitter antenna 334. Third transmitter antenna 336 may have a greater XY plane area than either of first and second transmitter antennas 334, 332.

Spacers 338, 339 may comprise any suitable material. For example, spacers 338, 339 may comprise air, a dielectric material, ferrite or a combination thereof. Spacers 338, 339 may have a permittivity constant chosen to change electric field 31A and/or it may have a permeability constant chosen to change magnetic field 31B. Spacers 338, 339 may comprise a high permittivity material to increase the capacitance of transmitter resonator 230. The thickness and planar area of spacers 338, 339 may be dependent on the thickness and/or planar area of First and second and third transmitter antennas 332, 334, 336. In some embodiments, electrical isolation may be desirable, and a low permittivity material may be employed for spacers 338, 339 (for example, for shielding).

Receiver resonator 350 comprises a first receiver antenna 352 and a second receiver antenna 354 separated in the X direction by a spacer 358 and a third receiver antenna 356 separated from first and second receiver antennas and spacer 358 by a second spacer 359. Third receiver antenna 356 may provide electric field shielding to reduce undesirable escape of electric fields from receiver resonator 350. Third receiver antenna 356 may contain a ferrite sheet or surface to provide magnetic field shielding to reduce undesirable escape of magnetic fields from transmitter. Shielding or shaping of electric or magnetic fields may also be possible by changing the spacer 359. First and second and third receiver antennas 352, 354, 356 may be substantially similar to any of first and second receiver antennas 152, 154. Spacers 358, 359 may be substantially similar to spacer 158 Like receiver resonator 150, first receiver antenna 352 may have a greater XY plane area than that of second receiver antenna 354. Third receiver antenna 356 may have a greater XY plane area than either of first and second receiver antennas 354, 352.

Spacers 358, 359 may comprise any suitable spacer. Spacers 358, 359 may comprise the same or similar materials to spacers 338, 339 or different materials from spacers 338, 339. As compared to spacers 358, 359, spacers 338, 339 may have a smaller Z direction dimension to achieve a desired self-capacitance and/or self-inductance. This may effectively change coupling coefficient of the link between primary side 12 and secondary side 14 and the impedance of primary side 12. Different compensation networks may be employed in both primary and secondary sides 12, 14 to accommodate such coupling coefficient and impedance changes.

In some embodiments, the XY plane area of spacer 358 may be different from the XY plane area of spacer 338 in order to vary the self-inductance or self-capacitance of transmitter resonator 330 or receiver resonator 350. For example, as compared to spacer 358, spacer 338 may have a smaller X direction dimension. In some embodiments, the Z direction dimension of spacer 359 may be different from the Z direction dimension of spacer 339 in order to vary the self-inductance or self-capacitance of transmitter resonator 330 or receiver resonator 350. For example, as compared to spacer 359, spacer 339 may have a smaller Z direction dimension. This may effectively change coupling coefficient of the link between primary side 12 and secondary side 14 and the impedance of primary side 12. Different compensation networks may be employed in both primary and secondary sides 12, 14 to accommodate such coupling coefficient and impedance changes.

In some embodiments, magnetic shielding may be provided around one or more of transmitter resonator 30 and receiver resonator 50. For example, ferrite may be employed as magnetic shielding and to reduce undesirable eddy currents in nearby metallic objects. Ferrite (or another suitable material) may also be employed to isolate transmitter resonator 30 and/or receiver resonator 50 from surrounding metal objects and may therefore serve to increase the self-inductance of the antennas and/or mutual inductance of the resonators.

Figure 6:
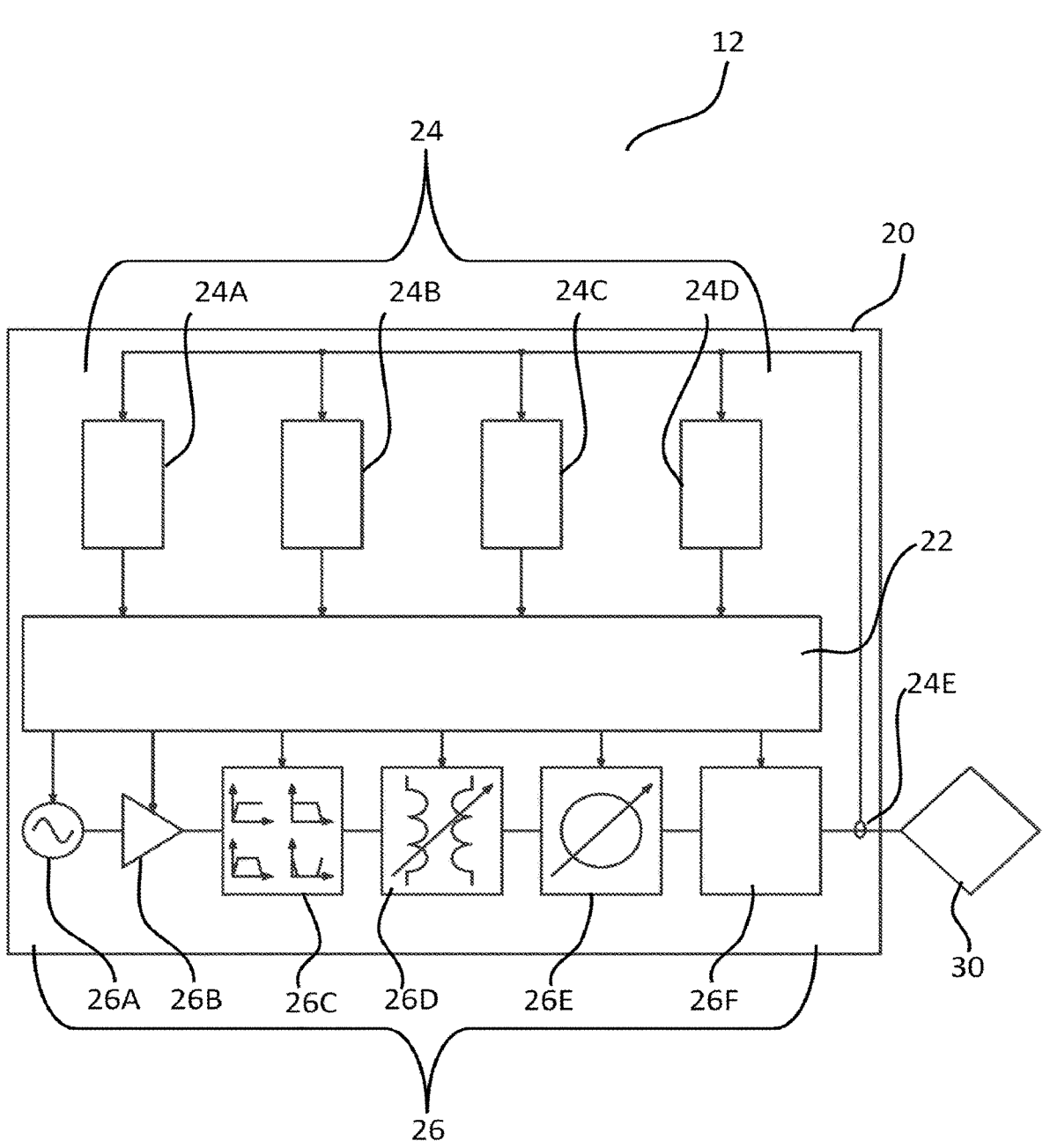
FIG. 6 is a schematic depiction of a primary side of a wireless power transfer system according to one example embodiment.

FIG. 6 depicts a schematic diagram of a primary side 12 comprising a transmitter module 20 and transmitter resonator 30 according to one embodiment of the invention. Transmitter resonator 30 can comprise any of transmitter resonators 30, 130, 230, 330 or otherwise described herein.

Transmitter module 20 comprises a controller 22. Controller 22 is configured to receive various inputs from sensors 24 (for example, load detector 24A, transmitter power sensor 24B, surrounding object detector 24C and/or distance detector 24D) and output control signals to various components 26 (for example, oscillator 26A, power amplifier 26B, filter network 26C, matching network 26D, compensation network 26E and V/I tuner 26F).

Load detector 24A is configured to detect the presence of a load 70 (shown in FIG. 7) connected to secondary side 14. Load 70 may be, for example, a battery of an electric vehicle such as an e-bicycle or an electric car, or any other suitable item that requires a power input. Load detector 24A may be implemented with a physical sensor (for example without limitation, an optical sensor, a pressure sensor, an infrared sensor, or a proximity sensor.) and suitable software or firmware. For example, in some embodiments, power (for example, current and voltage) is measured at, for example, point 24E to determine power being drawn by transmitter resonator 30 (for example, as measured by transmitter power sensor 24B). If the amount of power that is being drawn by transmitter resonator 30 increases above a baseline, load detector 24A may signal to controller 22 that a load 70 is present.

In other embodiments, load detector 24A may be configured to measure the input impedance of transmitter resonator 30 experienced at point 24E by transmitter module 20. The presence of a resonant load proximate to transmitter resonator 30, including for example secondary side 14 configured to drive load 70, will change the input impedance of transmitter resonator 30. This change in impedance, as provided by load detector 24A to controller 22, may be used by transmitter controller 22 to determine whether or not a co-operative receiver is present proximate transmitter resonator 30. The impedance changes induced in transmitter resonator 30 by different receivers are so distinct and so characteristic, that it is possible for the controller 22 to not only detect the presence or absence of a receiver proximate to transmitter resonator 30, but to also identify the kind of receiver, including, for example without limitation, different models of mobile phones or digital tablets.

Transmitter power sensor 24B may measure the power (for example, measure the current and voltage) at point 24E to determine how much power is being drawn by transmitter resonator 30. Such information may be used, for example, by load detector 24A or to determine whether there is desirably efficient coupling between transmitter resonator 30 and receiver resonator 50.

Surrounding object detector (SOD) 24C is configured to determine if an object (for example, a living being such as a human or an animal or an inanimate object such as a piece of metal or otherwise) is proximate to transmitter resonator 30. SOD 24C may be implemented with a physical sensor (for example without limitation, an optical sensor, a pressure sensor, an infrared sensor, a proximity sensor, RADAR, or LIDAR.) or by way of suitable software or firmware. For example, if the power being drawn by transmitter resonator 30 (as measured by transmitter power sensor 24B) drops during IPT, software of SOD may determine that a piece of metal (or any electrical conductor) is proximate to transmitter resonator 30 or receiver resonator 50 and SOD may provide a signal to controller 22 indicating such presence. In some embodiments, controller 22 may cause transmitter module 20 to increase a proportion of power delivered by CPT if a metal object is detected proximate to transmitter resonator 30 or receiver resonator 50. In the absence of a living being as detected by SOD 24C, controller 22 may be configured to increase the power feed to transmitter resonator 30 (for example, higher than a regulated level in the presence of living beings) or in the proximity of a living being as detected by SOD 24C, controller 22 may be configured to decrease the power feed to transmitter resonator 30 to below a regulated level.

Distance detector 24D is configured to determine a distance between transmitter resonator 30 and receiver resonator 50. Distance detector 24D may be implemented with a physical sensor (for example without limitation, an optical sensor, an ultrasonic sensor, an infrared sensor, a proximity sensor, RADAR, or LIDAR.) or by suitable software or firmware. For example, distance detector 24D may be configured to determine the distance between transmitter resonator 30 and receiver resonator 50 based on changes in transmission power as measured by transmitter power sensor 24B.

In an embodiment, one or more temperature sensors may monitor temperatures at the transmitter resonator 30 or receiver resonator 50. If the temperature exceeds a predetermined limit the controller 22 may cause transmitter module 20 to decrease the proportion of power delivered by IPT, decrease overall power feed to the transmitter resonator 30, or shut off the power supply to transmitter resonator 30 to prevent a fire hazard or thermal runaway.

Oscillator 26A may be configured to control the frequency band, and/or bandwidth, and/or duty cycle (phase) (for example 5% to 50%) of the current being delivered to transmitter resonator 30 in response to a signal of controller 22.

Power amplifier 26B may be employed to convert DC power to AC power. Power amplifier 26B may be employed to adjust the power provided to transmitter resonator 30 in response to a signal of controller 22. In particular, controller 22 may send a signal to power amplifier 26B to adjust reflection coefficients of the power amplifier 26B. In some embodiments, controller 22 may send a signal to power amplifier 26B to turn off (or sleep) when load detector 24A does not detect a load or to turn on when load detector 24A does detect a load.

Figure 8:
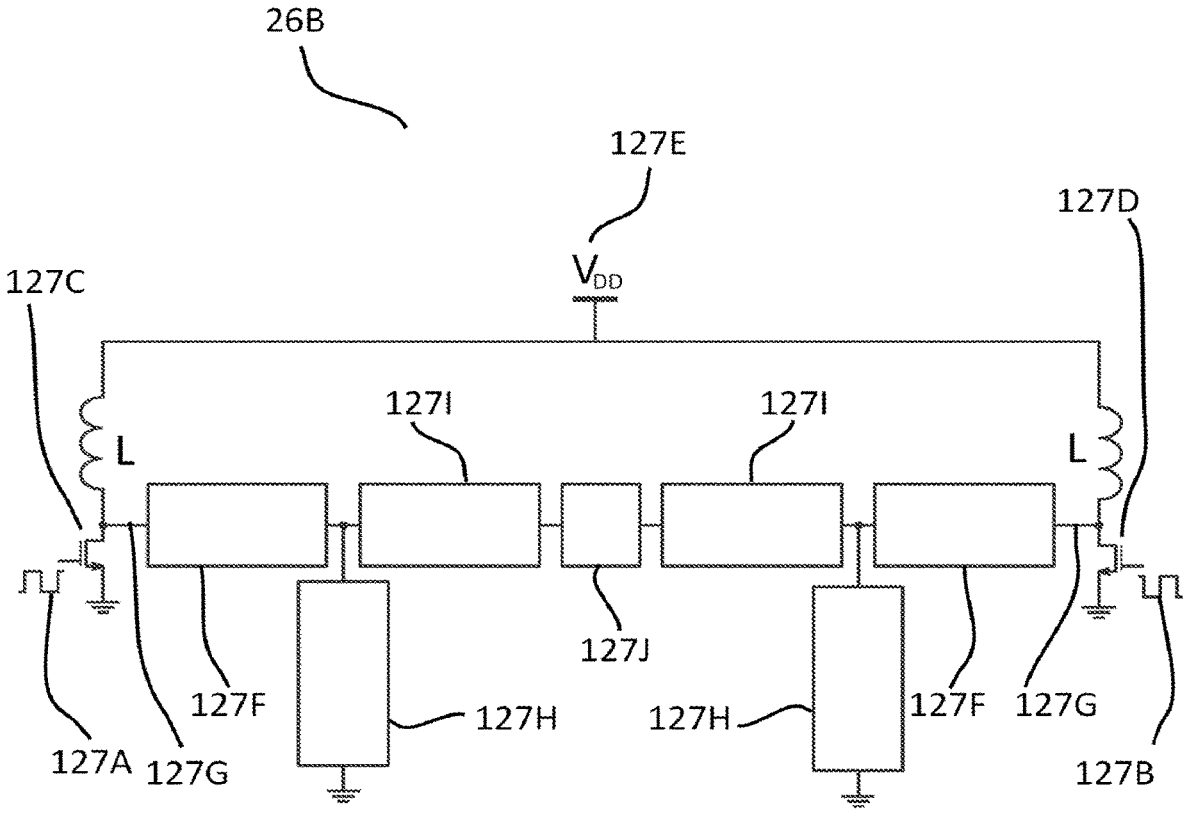
FIG. 8 is a schematic depiction of an exemplary power amplifier that may be used in various example embodiments or on its own or in combination with other disclosed elements.

Power amplifier 26B may comprise a switching power amplifier (in single-ended mode or a differential configuration) that can be configured to receive a square (sine) wave from oscillator 26A and generate a sine wave of the specific frequency desired to drive the transmitter resonator 30. FIG. 8 is a schematic diagram of an exemplary power amplifier 26B that can be used in transmitter 30. Power amplifier 26B may be a differential class F amplifier. Power amplifier 26B has three inputs, namely: two input signals 127A, 127B that drive the active devices (transistors) 127C, 127D with the frequency set at resonant frequency and DC voltage 127E that is used to control the output power and operation region of the active devices.

Different load terminations are used to improve the performance (for example output power, power conversion efficiency) and reduce the unnecessary harmonics level. In particular, 3rd harmonic terminations 127F are located in series branches to shape the voltage waveforms at the drain nodes 127G. 2nd harmonic terminations 127H are located in parallel branches to shape the voltage waveform at the drain nodes 127G. 1st harmonic terminations 127I are located in series branches to shape the voltage waveform at the drain nodes 127G. The effect of 3rd harmonic terminations may be considered in 2nd and 1st harmonic terminations 127H, 127I. The effect of 2nd harmonic terminations may be considered in 1st harmonic terminations 127I. For the differential configuration of power amplifier 26B, the AC load 127J (that receives the output power) is placed in series. A charging rate AC load 127J may be a function of transmitter resonator 30, receive resonator 50 and/or their alignment and position. Power amplifier 26B may be configured to generate sufficient power to transmitter resonator 30 such that the E-field, or H-field, or any combination of E-field and H-field can be generated by transmitter resonator 30 and captured by receiver resonator 50.

Filter network 26C may adjust the frequency responses such as the bandwidth, cut-off frequency, 3 dB frequency, gain provided to transmitter resonator 30 in response to a signal of controller 22. Filter network may be configured to adjust the shape of the waveform of the power in transmitter module 20 to increase the efficiency of transmitter module 20.

Matching network 26D may be configured to adjust impedance to match the output of power amplifier 26B to transmitter resonator 30.

Compensation network 26E may be provided to drive transmitter resonator 30 at a desired resonant frequency (for example, the resonant frequency of receiver resonator) to thereby increase the mutual flux, reduce heat generation and improve power transfer efficiency. Compensation network 26E may comprise one or more capacitors for increasing capacitance and one or more inductors for increasing inductance. Compensation network 26E may be configured to increase capacitance (and/or decrease inductance) and increase inductance (and/or decrease capacitance) as desired. When the transfer mode ratio is 100% CPT, compensation network 26E may function in a similar manner to any known CPT compensation network (for example, compensation network 26E may function to increase inductance) Similarly, when the transfer mode ratio is 100% IPT, compensation network 26E may function in a similar manner to any known IPT compensation network (for example, compensation network 26E may function to increase capacitance). However, when the transfer mode is part CPT and part IPT, less compensation may be required since the capacitance of transmitter resonator 30 will naturally provide compensation for the inductance of transmitter resonator 30 and the inductance of transmitter resonator 30 will naturally provide compensation for the capacitance of transmitter resonator 30. For example, at approximately 50% IPT and 50% CPT (for example, transfer mode ratio equal to one), compensation network may not be needed at all or the use of compensation network may be substantially limited thereby increasing the efficiency of WPT system 10.

As another example, between approximately 40-60% IPT and 40-60% CPT, compensation network may not be needed at all or the use of compensation network may be substantially limited thereby increasing the efficiency of WPT system 10. For this reason, compensation network 26E may comprise fewer or small inductors and/or capacitors as compared to CPT WPT systems and/or pure IPT WPT systems which require significant compensation. In some embodiments, if the capacitance of transmitter resonator 30 is sufficiently low, additional compensation by way of compensation network 26E may be provided Similarly, if the inductance of transmitter resonator 30 is sufficiently low, additional compensation may be provided by way of compensation network 26E. Controller 22 may signal to compensation network 26E how much and what type of compensation is required based on, for example, the transfer mode ratio, a distance between transmitter resonator 30 and receiver resonator 50, the amount of power being drawn by transmitter resonator 30, the power transmission efficiency, etc.

In some embodiments, a magnitude of the compensation (for example, increase in capacitance or increase in inductance) by compensation network 26E is proportional to the absolute value of the difference between the transfer mode ratio and one. For example, if the transfer mode ratio is greater than one, compensation network 26E may function to increase inductance and as the transfer mode ratio increases by more above one, the amount of increase of inductance may increase. Similarly, if the transfer mode ratio is less than one, compensation network 26E may function to increase capacitance and as the transfer mode ratio decreases by more below one, the increase of capacitance may increase.

Figure 10:
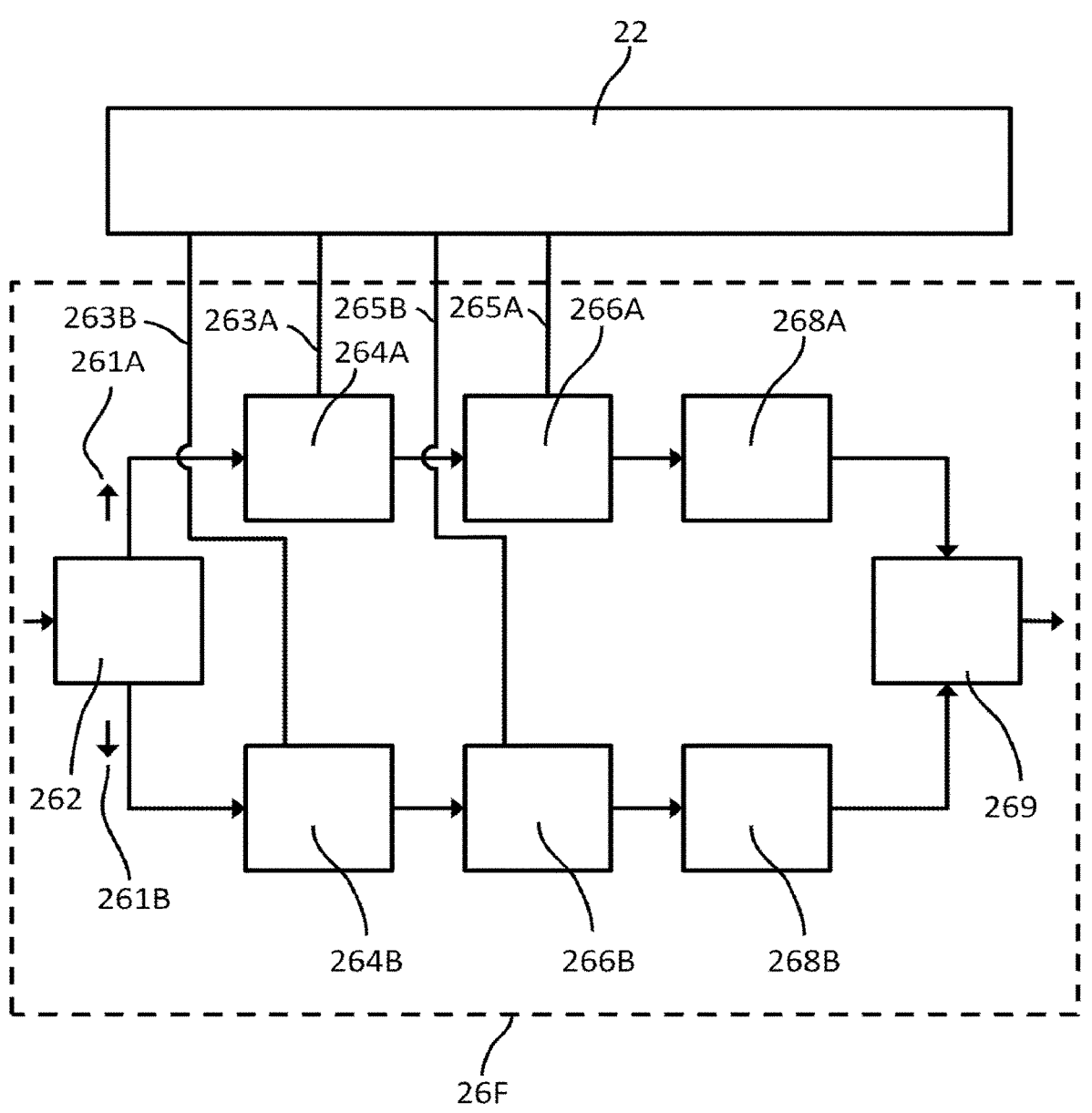
FIG. 10 shows a more detailed schematic depiction of a V/I tuner as per FIG. 6 used to adjust a power signal to a transmitter resonator according to one example.

An embodiment of V/I tuner 26F is shown in more detail in FIG. 10. The input signal of V/I tuner 26F received from matching network 26E (in FIG. 6) is split by a splitter 262 in order to have two mutually asymmetrical paths 261A and 261B for the input signal. First phase shifter 264A and second phase shifter 264B create a phase difference between the input voltage and the input current of transmitter resonator 30 (in FIG. 6). First phase shifter 264A is controlled by controller 22 (in FIG. 6) via first phase splitter control line 263A and second phase shifter 264B is controlled by controller 22 (See FIG. 6) via second phase splitter control line 263B. First and second active switches 266A and 266B receive the signals from first and second phase shifters 264A and 264B, respectively, and are controlled by controller 22 via first and second active switch control line 265A and 265B respectively. First and second active switches 266A and 266B serve to adjust the imaginary parts of the signals received from first and second phase shifters 264A and 264B respectively. Passive signal shaping networks 268A and 268B receive the adjusted signals from first and second active switches 266A and 266B respectively. Passive signal shaping networks 268A and 268B serve to fine tune the signals received from first and second active switches 266A and 266B respectively and, in particular, serve to reduce any harmonics in those signals before passing them to combiner 269. The signals provided along the two mutually asymmetric paths 261A and 261B are combined by combiner 269 and provided to transmitter resonator 30. In other embodiments first and second phase shifters 264A and 264B may be combined as one phase shifter that receives the input signal to V/I tuner 26F and the combined phase shifter may have two separate outputs serving active switches 266A and 266B.

V/I tuner 26F adjusts the transfer mode ratio by adjusting the phase difference between the input current and the input voltage to transmitter resonator 30 in response to signals from controller 22. The real part of the impedance seen by transmitter module 20 is adjusted by means of a phase shifters 264A and 264B, and its imaginary part can be adjusted by switches 266A and 266B. For example, a 90 degree phase shift for every 3 millisecond out of every 10 milliseconds, can lead to 30% of magnetic power transfer and 70% of electric power transfer.

V/I tuner 26F may be configured to adjust the current through each transmitter antenna (for example, first and second transmitter antennas 32, 132, 232, 332, 134, 234, 334 or third transmitter antenna 336) and the potential applied to each transmitter antenna (for example, first and second transmitter antennas 32, 132, 232, 332, 134, 234, 334 or third transmitter antenna 336).

If current is caused to pass through both of first and second transmitter antennas 132, 134, they will each generate magnetic field 31A for the purpose of IPT. If the current delivered to second transmitter antenna 134 is reduced as compared the current delivered to first transmitter antenna 132, a potential difference will be generated between first and second transmitter antennas 132, 134 and an electric field 31B is generated for the purpose of CPT. To modulate between CPT and IPT, the current delivered to second antenna 134 may be modulated (for example, when less current is allowed to pass through second antenna 134, then less IPT will occur and when more current is allowed to pass through second antenna, more CPT will occur). For example, when it is desired to transfer power via IPT, I/V tuner 26F may be configured to act as a short circuit connecting the first and second transmitter antennas together to thereby create a series LC resonator that allows current to flow therein. Conversely, when it is desired to transfer power by CPT, I/V tuner 26F may be configured to act as an open circuit that dumps current, thereby generating a potential difference between first and second transmitter antennas. I/V tuner 26F may thereby be configured to control whether first and second transmitter antennas 132, 134 are effectively connected in series or in parallel.

Alternatively, when first and second transmitter antennas 132, 134 are connected in parallel, first and second transmitter antennas 132, 134 may be floated to cause an electric field 31B to be generated for the purpose of CPT with substantially no magnetic field 31A generated. To change the transfer mode ratio (for example, to modulate between CPT and IPT), I/V tuner 26F may be configured (by means of a multiplexer, or the like, of I/V tuner 26F) to alternate between (1) floating first and second transmitter antennas 132, 134 to cause CPT and (2) driving current through first and second transmitter antennas 132, 134 to cause IPT. The alternation may be implemented in milliseconds or at frequencies between 10 Hz and 10 kHz. With more time allocated to floating first and second transmitter antennas 132, 134, the transfer mode ratio will be biased toward more CPT and with more time allocated to driving current through first and second transmitter antennas 132, 134, the transfer mode will be biased toward more IPT.

In some embodiments, elements 26 may be discrete elements in transmitter module 20 while in other embodiments, one or more of elements 26 may be part of an integrated circuit design.

Figure 7:
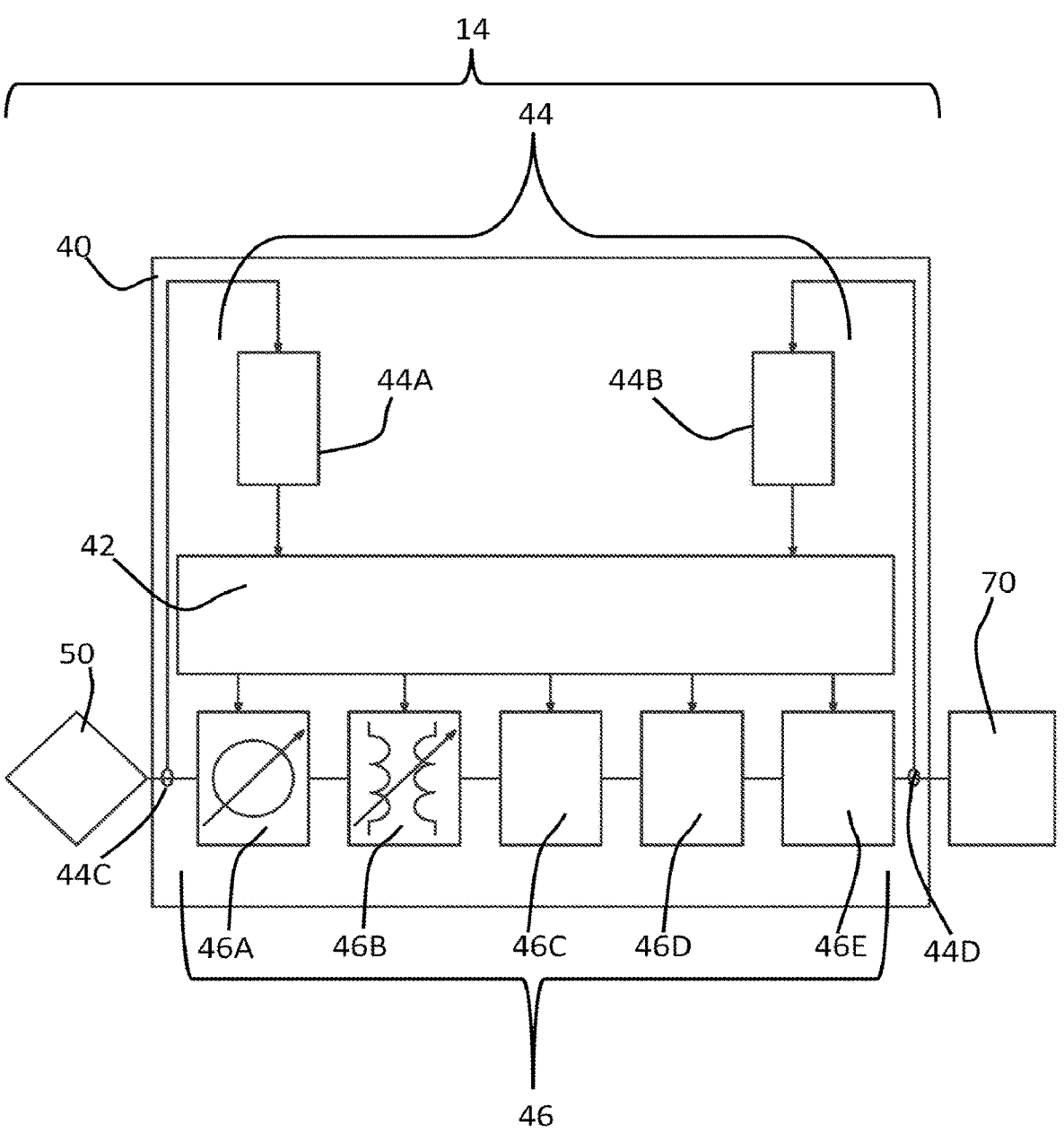
FIG. 7 is a schematic depiction of a secondary side of a wireless power transfer system according to one example embodiment.

FIG. 7 is a schematic depiction of a load 70 and secondary side 14 (as shown in FIG. 1) comprising a receiver resonator 50 and receiver module 40 according to one embodiment of the invention.

Receiver resonator 50 can comprise any of receiver resonators 50, 150, 250, 350 or otherwise described herein. Receiver resonator 50 may be configured to capture power with the frequency set by an oscillating signal in transmitter module 20 such as, for example without limitation between 1 MHz and 1 GHz. In some embodiments, the frequency set by the oscillating signal in transmitter module 20 is about 1 MHz to about 100 MHz, about 1 MHz to about 200 MHz, about 1 MHz to about 300 MHz, about 1 MHz to about 400 MHz, about 1 MHz to about 500 MHz, about 1 MHz to about 600 MHz, about 1 MHz to about 700 MHz, about 1 MHz to about 800 MHz, about 1 MHz to about 900 MHz, about 1 MHz to about 1 GHz, about 100 MHz to about 200 MHz, about 100 MHz to about 300 MHz, about 100 MHz to about 400 MHz, about 100 MHz to about 500 MHz, about 100 MHz to about 600 MHz, about 100 MHz to about 700 MHz, about 100 MHz to about 800 MHz, about 100 MHz to about 900 MHz, about 100 MHz to about 1 GHz, about 200 MHz to about 300 MHz, about 200 MHz to about 400 MHz, about 200 MHz to about 500 MHz, about 200 MHz to about 600 MHz, about 200 MHz to about 700 MHz, about 200 MHz to about 800 MHz, about 200 MHz to about 900 MHz, about 200 MHz to about 1 GHz, about 300 MHz to about 400 MHz, about 300 MHz to about 500 MHz, about 300 MHz to about 600 MHz, about 300 MHz to about 700 MHz, about 300 MHz to about 800 MHz, about 300 MHz to about 900 MHz, about 300 MHz to about 1 GHz, about 400 MHz to about 500 MHz, about 400 MHz to about 600 MHz, about 400 MHz to about 700 MHz, about 400 MHz to about 800 MHz, about 400 MHz to about 900 MHz, about 400 MHz to about 1 GHz, about 500 MHz to about 600 MHz, about 500 MHz to about 700 MHz, about 500 MHz to about 800 MHz, about 500 MHz to about 900 MHz, about 500 MHz to about 1 GHz, about 600 MHz to about 700 MHz, about 600 MHz to about 800 MHz, about 600 MHz to about 900 MHz, about 600 MHz to about 1 GHz, about 700 MHz to about 800 MHz, about 700 MHz to about 900 MHz, about 700 MHz to about 1 GHz, about 800 MHz to about 900 MHz, about 800 MHz to about 1 GHz, or about 900 MHz to about 1 GHz. In some embodiments, the frequency set by the oscillating signal in transmitter module 20 is about 1 MHz, about 100 MHz, about 200 MHz, about 300 MHz, about 400 MHz, about 500 MHz, about 600 MHz, about 700 MHz, about 800 MHz, about 900 MHz, or about 1 GHz. In some embodiments, the frequency set by the oscillating signal in transmitter module 20 is at least about 1 MHz, about 100 MHz, about 200 MHz, about 300 MHz, about 400 MHz, about 500 MHz, about 600 MHz, about 700 MHz, about 800 MHz, or about 900 MHz In some embodiments, the frequency set by the oscillating signal in transmitter module 20 is at most about 100 MHz, about 200 MHz, about 300 MHz, about 400 MHz, about 500 MHz, about 600 MHz, about 700 MHz, about 800 MHz, about 900 MHz, or about 1 GHz.

For some applications, frequencies in the Industrial, Scientific and Medical (ISM) frequency bands may be preferred. For the purposes of the present disclosure, the ISM bands are to be understood as being 6.765 MHz to 6.795 MHz; 13.553 MHz to 13.567 MHz; 26.957 MHz to 27.283 MHz; 40.66 MHz to 40.70 MHz; 83.996 MHz to 84.004 MHz; 167.992 MHz to 168.008 MHz; 433.05 MHz to 434.79 MHz; and 886 MHz to 906 MHz For other applications, frequencies in officially reserved application bands may be preferred, for example without limitation, Police Communication or Military bands. Receiver resonator 50 may be configured to capture power from magnetic field 31A or electric field 31B or any combination of these two fields at that frequency.

Receiver module 40 comprises a controller 42. Controller 42 is configured to receive various inputs from sensors 44 (for example, receiver power sensor 44A and load detector 44B) and output control signals to the various elements 46 (for example, compensation network 46A, matching network 46B, rectifier 46D, filter 46C, and load manager 46E).

Receiver power sensor 44A may measure the power (for example, measure the current and voltage) at point 44C to determine how much power is being received by receiver resonator 50.

Load detector 44B is configured to detect the presence of load 70. Load detector 44B may be implemented with a physical sensor (for example without limitation, an optical sensor, a pressure sensor, an infrared sensor, or a proximity sensor.) or by way of suitable software or firmware. For example, in some embodiments, current and voltage is measured by load detector 44B at, for example, point 44D to determine power being received by load 50. If the amount of power that is being measured at point 44D increases above a baseline, load detector 44B may signal to controller 42 that a load 70 is present.

Compensation network 46A may be configured to maintain a desired resonant frequency of receiver resonator 50 in response to a signal from controller 42 to thereby improve the efficiency of power transfer from transmitter resonator 30 to receiver resonator 50. Compensation network 46A may be and may function substantially like compensation network 26E of transmitter module 20.

Matching network 26D may be configured to adjust an input impedance of rectifier 46D to match a desirable impedance of resonator 30 to achieve maximum power transfer.

Rectifier 46D may be configured to convert AC power received by receiver antenna 50 to DC power to provide to load 70.

Filter 46C may be configured to shape the waveform of power output from rectifier 46D according to a signal from controller 42 in order to improve the overall power efficiency of receiver module 40.

Load manager 46E may be configured to provide suitable voltage and current for load 70 and/or to extract the maximum power from rectifier 46D by adjusting its input impedance (for example, the output impedance of rectifier 46D).

In some embodiments, load manager 46E or another component may be configured to communicate (wirelessly or wired) with external devices (for example, load 70) to provide appropriate information for data analysis. Such information may include, for example without limitation, presence of load 70, a charge level of load 70, a charging rate of load 70, status of load 70, a present voltage, capacity, and/or remaining time to charge load 70. Load manager 46E may employ such information (or relay such information to controller 42 or controller 22) to adjust, for example, the transfer mode ratio to achieve optimal energy transfer between primary side 12 and secondary side 14. Load manager 46E may also provide such information to a user via a display. Such a display may be built into one or more of primary side 12 and secondary side 14 or may be accessible via software on a mobile device such as, for example, an app on a mobile phone or tablet that is in wireless (or wired) communication with load manager 46E or controller 22 or controller 42.

In some embodiments, components 46 are discrete elements in receiver module 40 while in other embodiments, one or more of components 46 are part of an integrated circuit design.

In some embodiments, a primary side 12 may comprise a plurality of transmitter resonators 30 and/or a secondary side 14 may comprise a plurality of receiver resonators 50. In such embodiments, each of the transmitter resonators 30 and/or receiver resonators 50 may be controlled in a similar manner In other embodiments, each of the transmitter resonators 30 and/or receiver resonators 50 may be controlled individually. For example, in some embodiments, primary side 12 may rely more heavily on transmitter resonators 30 that are experiencing less interference (for example, due to a nearby metal object), that are not near a living being or that are transferring power more efficiently and/or similarly, secondary side 14 may rely more heavily on receiver resonators 50 that are experiencing less interference (for example, due to a nearby metal object), that are not near a living being or that are receiving power more efficiently. Such control may be provided or facilitated by, for example, transmitter module 20 and receiver module 40 and/or communication therebetween.

In some embodiments, primary side 12 may communicate with secondary side 14 (for example, controller 22 may communicate with controller 42) to share, for example, presence of load 70, a charge level of load 70, power transfer efficiency, a charging rate of load 70, status of load 70, a present voltage, capacity, remaining time to charge load 70, etc. In some embodiments, such information may be transferred at a different frequency than the frequency of the power transfer between primary side 12 and secondary side 14 link In some embodiments, the frequency of the power transfer between primary side 12 and secondary side 14 may be modulated (for example, the amplitude may be modulated) to allow communication between primary side 12 and secondary side 14. For example, primary side 12 and secondary side 14 may communicate via Bluetooth (for example, 2.4 GHz) or a signal frequency similar to that of GPS (for example, 10 GHz). In some embodiments, there may be an additional unit that may collect data separately and transfer data back and forth between primary side 12 and/or secondary side 14. For example, WiFi may be employed to upload data from primary side 12 and/or secondary side 14 to an online portal (for example, a website or mobile application associated with primary side 12 and/or secondary side 14).

In some embodiments, it may be desirable to transfer power between two receivers 40 (for example, peer-to-peer power transfer). For example, if a first e-bicycle with a first receiver has a dead or low battery and a second e-bicycle with a second receiver and a charged (or at least partially charged battery) is nearby, it could be desirable to transfer power from the second e-bicycle to the first e-bicycle (for example, if no transmitter was nearby). To allow for such a transfer of power between receivers, a phase shifter could be integrated into rectifier 46D, thereby allowing a receiver to also function as a transmitter.

Figure 9:
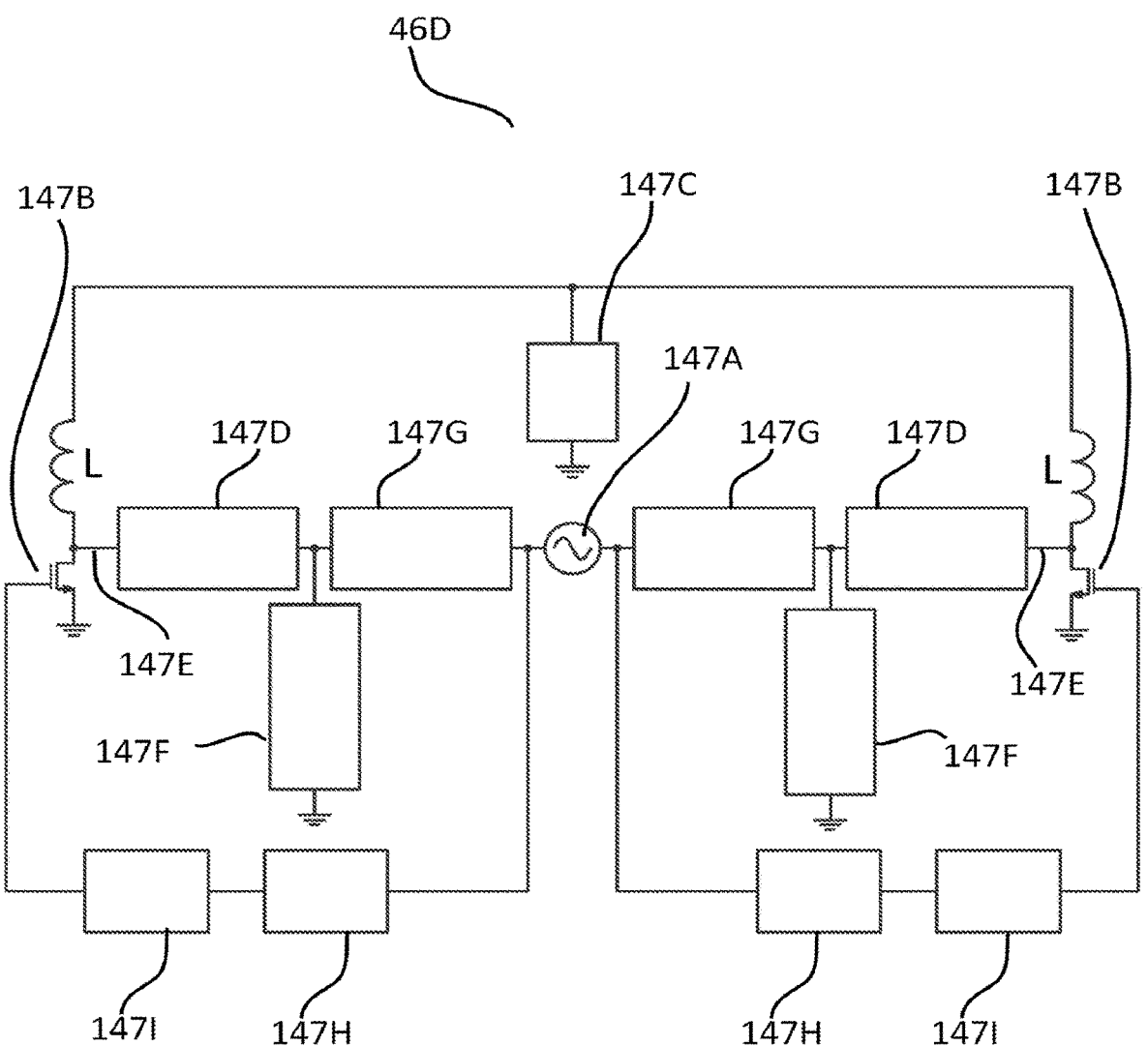
FIG. 9 is a schematic depiction of an exemplary self-synchronous rectifier that may be used in various example embodiments or on its own or in combination with other disclosed elements.

FIG. 9 is a schematic depiction of a rectifier 46D having an integrated phase shifter. In some embodiments, rectifier 46D comprises a discrete phase shifter.

Rectifier 46D may be a switching self-synchronous rectifier (in single-ended mode or a differential configuration) that can be configured to receive a sine wave (for example, AC power) from receiver resonator 50 at a specific resonant frequency. Rectifier 46D may be a differential class F self-synchronous rectifier. Rectifier 46D may capture sufficient power from the receiver resonator 50 such that E-field, or H-field, or any combination of E-field and H-field can be captured by receiver resonator 50.

Rectifier 46D has an input 147A (for example, AC power) that drives the active devices 147B (for example, transistors) with the frequency set at resonant frequency and has the output 147D (for example, DC voltage) across the DC load (that is used to control the output power, input impedance and operation region of the active devices). In this design, different load terminations are used to improve the performance (for example, output power and power conversion efficiency). 3rd harmonic terminations 147D are located in series branches to shape the voltage waveforms at the drain nodes 147E. 2nd harmonic terminations 147F are located in parallel branches to shape the voltage waveform at the drain nodes 147E. 1st harmonic terminations 147G are located in series branches to shape the voltage waveform at the drain nodes 147E. The effect of 3rd harmonic terminations may be considered in 2nd and 1st harmonic terminations. The effect of 2nd harmonic terminations may be considered in 1st harmonic terminations.

For the differential configuration, AC source 147A is placed in series. AC source 147A can be a function of a power received by receiver resonator 50 and the alignment and position of receiver resonator 50 relative to transmitter resonator 30. DC load 147C may be a single-ended load.

Rectifier 46D may comprise two phase shifters 147H in the differential configuration (but only one phase shifter in a single-ended configuration). Phase shifters 147H adjust the appropriate phase difference between the AC source and gate signal of transistors 147B. The phase difference between gate signals and AC source 147A can change the self-synchronous rectifier's performance (for example, power conversion efficiency and operation region of transistors). It also can change the input impedance of self-synchronous rectifier 46D and/or the optimum DC load 147C of rectifier 46D.

Rectifier 46D may comprise two level shifters 147I in the differential configuration (but only one level shifter in a single-ended configuration). Level shifters 147I may adjust the appropriate amplitude for gate signal of transistors 147B. The amplitude level at gate signals can change the self-synchronous rectifier's performance (for example, power conversion efficiency and operation region of transistors).

WPT system 10, the transmitters and/or the receivers described herein may be integrated into various applications such as, but not limited to, electric vehicles, electric boats, electric planes, electric trucks, e-bicycles, electric scooters, electric skateboards, etc. One exemplary non-limiting application is a bike-sharing fleet where various docking stations are provided that integrate one or more transmitters (for example, primary sides 12) and e-bicycles which comprise receivers (for example, secondary sides 14) and batteries (as loads 70) may be charged at the docking stations.

In some applications, primary side 12 or secondary side 14 may be configured to transfer power with other systems not described herein and can adjust the transfer mode ratio from CPT to IPT to provide compatibility with other CPT systems and/or IPT systems even if they were not specifically designed to work with the power transfer systems described herein.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

In a first aspect, each of the system(s) described above and depicted in FIGS. 1-10 forms a bimodal near-field resonant wireless electrical power transfer system 10 configured for simultaneous capacitive power transfer and inductive power transfer according to an adjustable transfer mode ratio at a variable resonant power signal oscillation frequency, the system 10 comprising: a transmitter subsystem 12 comprising a transmitter antenna subsystem 32, 132, 232, 332, 134, 234, 334, 336 and a power signal tuner module 26F, the tuner module 26F configured for adjusting the transfer mode ratio by adjusting a power signal provided by the tuner module 26F to the transmitter antenna subsystem 32, 132, 232, 332, 134, 234, 334, 336; and a receiver subsystem 14 comprising a receiver antenna subsystem 52, 152, 252, 352, 154, 254, 354, 356 configured for receiving electrical power from the transmitter antenna subsystem 32, 132, 232, 332, 134, 234, 334, 336 at the transfer mode ratio.

The tuner module 26F may be configured for adjusting the power signal by adjusting a phase difference between the current and the voltage of the power signal provided to the transmitter antenna subsystem 32, 132, 232, 332, 134, 234, 334, 336. The transmitter subsystem 12 may further comprise a controller 22 and at least one sensor 24, wherein the controller 22 is configured for receiving sensor information from the at least one sensor 24 and for automatically providing a tuning instruction to the tuner module 26F based on the sensor information; and the tuner module 26F is configured to adjust according to the tuning instruction the phase difference between the current and the voltage of the power signal provided to the transmitter antenna subsystem 32, 132, 232, 332, 134, 234, 334, 336.

System 10 resonates at a resonant frequency that is free to vary within a predetermined band, based on the degree of coupling between transmitter subsystem 12 and receiver subsystem 14. The predetermined band may be, for example without limitation, an officially designated and reserved Industrial, Scientific and Medical (ISM) band or a band dedicated for a particular user. The quality factor (Q) of system 10 may be decreased to a degree that allows the power signal oscillation frequency to vary within opposing limits of the predetermined frequency band. A decreased value of Q allows the system 10 to employ any of a number of different resonant frequencies within the predetermined frequency band during the process of power transfer. The coupling between transmitter subsystem 12 and receiver subsystem 14 and the associated absorption of power by the resonant receiver subsystem 14 ensures that little electromagnetic radiation is emitted into the far-field domain when system 10 is in operation. The arrangement as described herein with reference to FIGS. 1-10, along with the immediately foregoing frequency aspects, render system 10 a bimodal near-field resonant wireless electrical power transfer system. It is to be noted that in wireless power transfer system 10 power is transferred from the primary subsystem to the secondary subsystem via capacitive or inductive coupling or both, and not to any substantial degree via electromagnetic radiation.

In a further aspect, described with reference to the foregoing drawings and the flow chart in FIG. 11, a near-field wireless method [1000] is provided for of transferring power bimodaly according to an adjustable transfer mode ratio at a variable resonant power signal oscillation frequency, the method comprising providing [1010] a transmitter subsystem 12 comprising a power signal tuner module 26F and a transmitter antenna subsystem 32, 132, 232, 332, 134, 234, 334, 336 configured for resonating at the resonant power signal oscillation frequency; providing [1020] a receiver subsystem 14 comprising a receiver antenna subsystem 52, 152, 252, 352, 154, 254, 354, 356 configured for resonating at the resonant power signal oscillation frequency; providing [1030] a power signal from the tuner module 26F to the transmitter antenna subsystem 32, 132, 232, 332, 134, 234, 334, 336 at the power signal oscillation resonant frequency; adjusting [1040] the transfer mode ratio by adjusting the power signal from the tuner module 26F to the transmitter antenna subsystem 32, 132, 232, 332, 134, 234, 334, 336; and receiving [1050] transferred power in the receiver subsystem 14 at the power signal oscillation resonant frequency via the receiver antenna subsystem 52, 152, 252, 352, 154, 254, 354, 356 at the transfer mode ratio. The adjusting [1040] the transfer mode ratio may comprise adjusting a phase difference between the current and the voltage of the power signal provided to the transmitter antenna subsystem 32, 132, 232, 332, 134, 234, 334, 336.

The providing [1010] a transmitter subsystem 12 may further comprise providing a controller 22 and at least one sensor 24 and adjusting the phase difference between the current and the voltage may be done by the tuner module 26F via a command of the controller 22 based on sensor information received by the controller 22 from the at least one sensor 24. The command of the controller 22 may be automatically issued to the tuner module 26F upon receipt by the controller 22 of the sensor information; and the tuner module 26F may automatically execute the command from the controller 22 to change the phase difference.

The method [1000] may further comprise allowing [1060] the resonant power signal oscillation frequency to vary within a predetermined frequency band. The predetermined frequency band may be an Industrial, Scientific and Medical (ISM) frequency band. Providing [1010] a transmitter subsystem may comprise providing a transmitter subsystem detuned to a degree that allows the resonant power signal oscillation frequency to vary within opposing limits of the predetermined frequency band.

Figure 12:
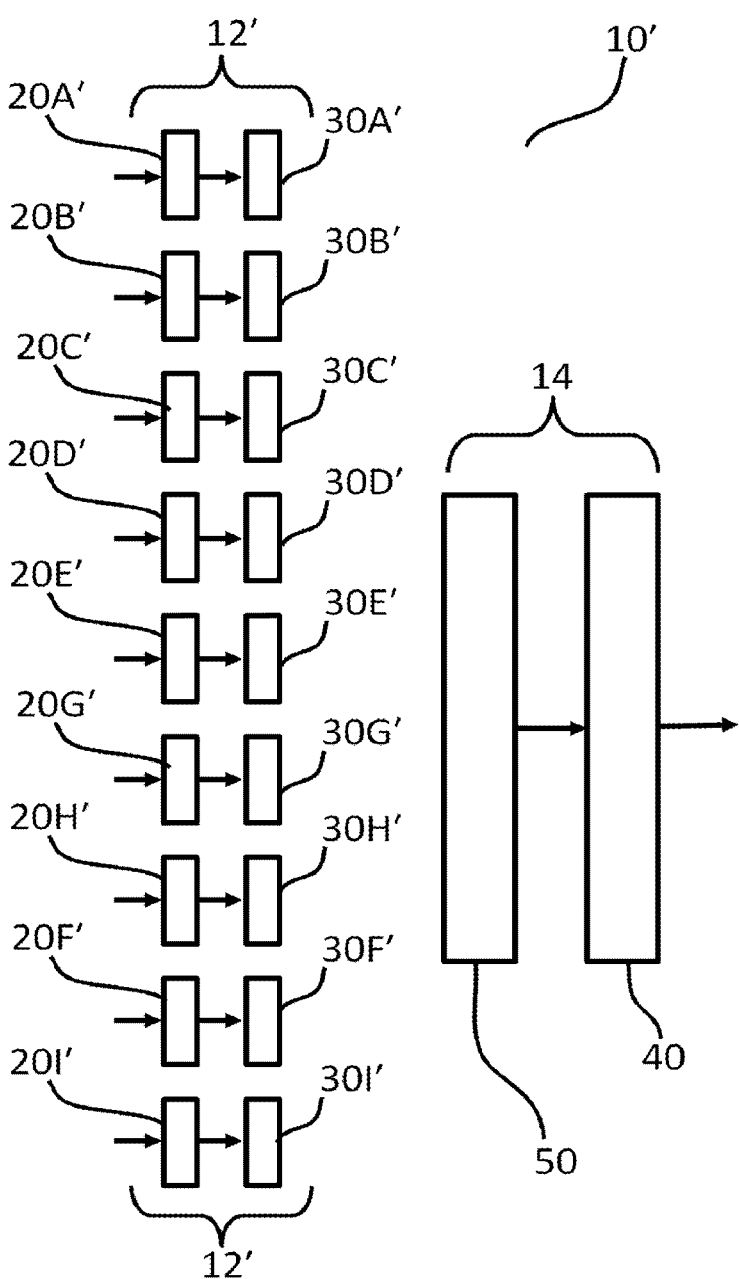
FIG. 12 is a schematic representation of a multi-transmitter near-field resonant wireless electrical power transfer system for transferring power to a single receiver subsystem.
Figure 13A:
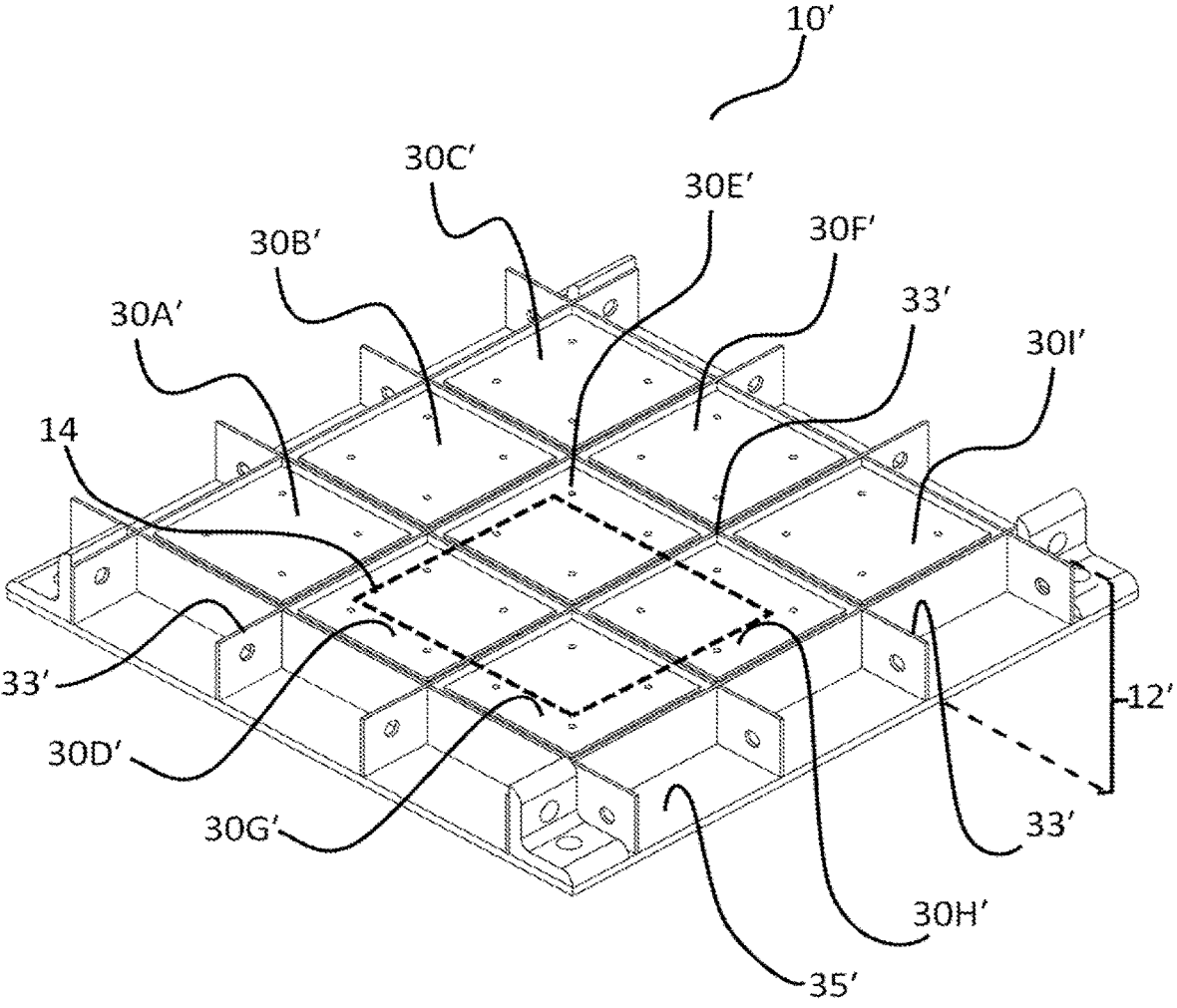
FIGS. 13A and 13B depict a multi-transmitter near-field resonant wireless electrical power transfer system for transferring power to a single receiver subsystem.
Figure 13B:
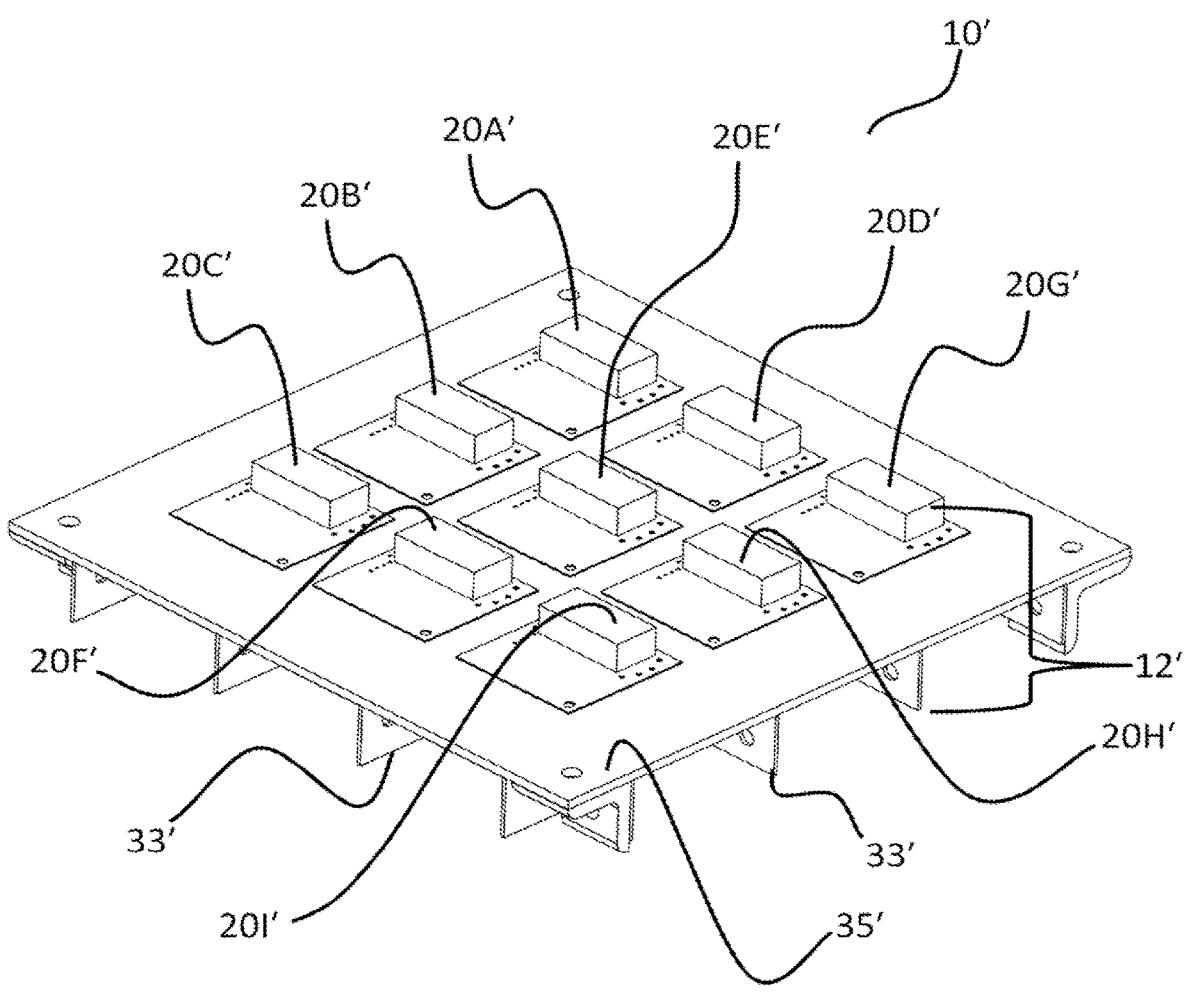

In a further embodiment, described with reference to FIGS. 12, 13A and 13B and with reference to FIGS. 1 to 10, a multi-transmitter bimodal near-field resonant wireless electrical power transfer system 10' is configured for simultaneous capacitive power transfer and inductive power transfer according to an adjustable transfer mode ratio at a variable resonant power signal oscillation frequency. The system 10' comprises a multi-transmitter subsystem 12' comprising a plurality of transmitter resonators 30A' to 30I' each driven by a corresponding dedicated transmitter module 20A' to 20I' wherein each transmitter resonator and corresponding transmission module (for example, 30E' and 20E' respectively) may conform to the descriptions given above and with reference to FIGS. 1 to 10. FIG. 12 is a schematic representation of an embodiment of system 10' in which transmitter resonators 30A' to 30I' are presented as nine resonators in a column but are not depicted in their formal spatial locations. An embodiment of the spatial layout of multi-transmitter subsystem 12' is shown in FIGS. 13A and 13B and described below. In system 10', resonant receiver subsystem 14 may be the same or substantially similar to the resonant receiver system described above and referenced by FIGS. 1-10. In the embodiment shown in FIG. 12, resonant receiver subsystem 14 may be, for example without limitation, implemented in a mobile phone or digital "tablet". Resonant receiver subsystem 14 is depicted in broken outline in FIG. 13A for the sake of clarity. In an embodiment, each working transmitter resonator 30A' to 30I' and each corresponding transmitter module 20A' to 20I' may function in the same or a substantially similar manner as the transmitter resonator 30 and transmitter module 20 described above and depicted in FIGS. 1-10. An embodiment of a spatial layout of multi-transmitter subsystem 12' is depicted in FIGS. 13A and 13B. FIG. 13B is a view of multi-transmitter subsystem 12' in an inverted orientation with respect to its orientation in FIG. 13A.

In the example embodiment of system 10' shown in FIGS. 12, 13A and 13B, multi-transmitter subsystem 12' comprises nine pairs of transmitter resonators 30A' to 30I' and corresponding transmitter modules 20A' to 20I' arranged in a square array. Transmitter modules 20A' to 20I' are obscured in FIG. 13A by a grounded baseplate 35' but may be seen in FIG. 13B. In a more general embodiment, other numbers of pairs of resonators and transmitter modules may be employed, and the resonator array need not be square or rectangular. By way of example without limitation, the resonator array may have a hexagonal arrangement. In some embodiments, the arrays are preferably close-packed within the constraints of having a grounded shield grid separating and bounding the transmitter resonators 30A' to 30P. Grounded shield grid 33' laterally confines the array of transmitter resonators 30A' to 30I'. Grounded shield grid 33' is disposed at a consistent distance 37' from the perimeter of each of the transmitter resonators 30A' to 30I' to ensure consistent electric field behavior and associated capacitance between the transmitter resonators 30A' to 30I' and the grounded shield grid 33'. The term "shield distance" is used herein to describe this distance between resonators 30A' to 30I' and grounded shield grid 33'.

In an embodiment, grounded shield grid 33' ensures that the electric fields of transmitter resonators 30A' to 30I' will be fully spatially decoupled and thereby spatially independent. The transmitter resonators 30A' to 30I' may have magnetic fields that are chosen to be mutually decoupled by virtue of spatial orientation. In other embodiments, grounded shield grid 33' may be formed of or coated with a high conductivity ferrite material in order to decouple the magnetic fields generated by transmitter resonators 30A' to 30I'.

As shown in FIGS. 13A and 13B, transmitter resonators 30A' to 30I' and their corresponding transmitter modules 20A' to 20I' may be mounted substantially in line with each other on opposing faces of grounded base plate 35' with each transmitter resonator (for example, 30E') proximate its corresponding transmitter module (20E'). In other embodiments, there may be no fixed spatial relationship between transmitter resonators and their corresponding transmitter modules. The array of transmitter resonators 30A' to 30I' shares a common transmission surface defined by the collective upper surfaces of transmitter resonators 30A' to 30I' in FIG. 13A. For reasons of aesthetics and protection, the array of transmitter resonators 30A' to 30I' may be covered with a dielectric plate, not shown in FIG. 13A. The dielectric plate separates receiver subsystem 14 and transmitter resonators 30A' to 30I'.

In FIGS. 12 and 13A, an embodiment of resonant receiver subsystem 14 is schematically shown as overlapping a subset of the plurality of transmitter resonators 30A' to 30I'. As per FIGS. 12 and 13A, the overlapped transmitter resonators are shown as being 30D', 30E', 30G' and 30H'. In FIG. 13A, resonant receiver subsystem 14 is shown as a broken line rectangle over mutually adjoining transmitter resonators 30D', 30E', 30G' and 30H'. The controllers of any of transmitter modules 20A' to 20I' may determine the presence or absence of resonant receiver subsystem 14 in proximity to or overlapping their corresponding transmitter resonators 30A' to 30I' and, based on these detections, the controllers may turn on or turn off the power signal to their corresponding transmitter resonators 30A' to 30I'.

If the power amplifiers of transmitter modules 20A' to 20I' are supplying power signals to transmitter resonators 30A' to 30I' so that transmitter resonators 30A' to 30I' are transmitting power, and the controllers of transmitter modules 20A', 20B', 20C', 20F' and 20I' determine the absence of a resonant receiver within their frequency range proximate the transmitter resonators 30A', 30B', 30C', 30F' and 30I', those controllers can turn off the power signal to transmitter resonators 30A', 30B', 30C', 30F' and 30I'.

If the power amplifiers of transmitter modules 20A' to 20I' are not supplying power signals to transmitter resonators 30A' to 30I', the controllers for transmitter resonators 30D', 30E', 30G' and 30H' can determine the presence of resonant receiver subsystem 14 overlapping and proximate resonators 30D', 30E', 30G' and 30H', and turn on the transmittable power provided by transmitter modules 20D', 20E', 20G' and 20H' to transmitter resonators 30D', 30E', 30G' and 30H'. This arrangement ensures that only transmitter resonators in proximity to the resonant receiver subsystem 14 are drawing power and transmitting power to the resonant receiver subsystem 14.

The input impedance of a particular transmitter resonator 30A' to 30I' may be employed to detect the presence or absence of resonant receiver subsystem 14 proximate the particular transmitter resonator. The transmitter resonator input impedance varies with the absence or presence of a resonant receiver subsystem 14 proximate the particular transmitter resonator. As explained above, with reference to FIG. 6, the effects of specific resonant receiver subsystems 14 are distinct as to allow not only the presence and absence of the receivers to be detected but are also characteristic such that the type of receiver may be identified by its effect on transmitter resonator input impedance. The size of the receiver resonator, in particular, has a profound effect on the input impedance of a particular transmitter resonator 30A' to 30I'.

In an embodiment of system 10', transmitter module 20E', as depicted in FIGS. 12 and 13B, is the transmitter module associated with one of the four transmitter resonators 30D', 30E', 30G' and 30H' overlapped by resonant receiver subsystem 14. The detailed structure of each of the transmitter modules 20A' to 20I' is provided in FIG. 6 and FIG. 8. The process is initiated with the power amplifier 26B of transmitter modules 20A' to 20I' providing no power signal to corresponding transmitter resonators 30A' to 30I'.

Focusing now on transmitter module 20E', its load detector 24A in this embodiment is configured to measure the input impedance of transmitter resonator 30E'. Load detector 24A provides the input impedance measurement result to controller 22. A default input impedance measurement value is stored in a register in controller 22 representing the input impedance of transmitter resonator 30E' in the absence of any resonant receiver subsystem proximate transmitter reso- nator 30E'. The disposition of resonant receiver subsystem 14 proximate transmitter resonator 30E', as shown in FIG. 12, leads to a new different input impedance measurement by load detector 24A of which the result is supplied to controller 22 by load detector 24A. The controller 22 compares the new input impedance measurement, referred to herein as the "first input transmitter resonator impedance change" or "primary transmitter resonator input impedance change", with the default impedance measurement value stored in the register. Based on this first input impedance change, controller 22 makes a determination as to whether a receiver resonator, for example, the resonator of resonant receiver subsystem 14, is present proximate transmitter resonator 30E'. In order to make the determination of absence or presence of a receiver resonator proximate trans- mitter resonator 30E' controller 22 may be preprogrammed with a minimum input impedance change that has to be exceeded before controller 22 deems a receiver resonator to be present.

If controller 22 determines that a receiver resonator, for example, the resonator of resonant receiver subsystem 14, is present proximate transmitter resonator 30E', then controller 22 instructs the power amplifier to assume an "ON" state. Power is thereby provided to transmitter resonator 30E' and power is in turn transferred to resonant receiver subsystem 14. If controller 22 determines that a receiver resonator, for example, the resonator of resonant receiver subsystem 14, is not present proximate transmitter resonator 30E', then con- troller 22 instructs the power amplifier to assume on "OFF" state. Power is thereby not provided to transmitter resonator 30E' and power is in turn not transferred to resonant receiver subsystem 14. The same process is conducted independently by every transmitter module 20A' to 20I' with respect to their corresponding transmitter resonators 30A' to 30I'. As a result, the power amplifiers of transmitter modules 30D', 30E', 30G' and 30H' overlapped by resonant receiver sub- system 14 are turned on and the power amplifiers of trans- mitter modules 30A', 30B', 30C', 30F' and 30I' not over- lapped by resonant receiver subsystem 14 are turned off.

It is to be noted that differently sized receiver resonators present drastically different impedances at point 24A to the load detector 24A of transmitter modulator 20. The imped- ance differences measured when a given receiver resonator partially overlaps a particular transmitter resonator as com- pared with when it completely overlaps that transmitter resonator do not differ as drastically as what the impedances differ with receiver resonator size. This allows controller 22 of any transmitter module 20A' to 20I' to differentiate between small and large receiver resonators proximate the corresponding transmitter resonator 30A' to 30I'.

According to an embodiment, the setting of power signal frequency and phase among those transmitter resonators (for example 30D', 30E', 30G' and 30H') overlapped by a reso- nant receiver subsystem, for example resonant receiver subsystem 14, is described herein. For maximally efficient transfer of power from the combination of transmitter reso- nators 30D', 30E', 30G' and 30H' that are receiving power, the power signals in resonators 30D', 30E', 30G' and 30H' need to have the identical frequency and moreover be mutually in phase. Given that the frequencies of the power signals in transmitter resonators 30D', 30E', 30G' and 30H' can differ within an allowed band, as described earlier above and with reference to FIGS. 1 to 10, the requirement in this present embodiment of FIGS. 12, 13A and 13B is for the frequencies of the power signals in transmitter resonators 30D', 30E', 30G' and 30H' to be adjusted to be identical and for their phases then to be locked together so that the power signals from transmitter resonators 30D', 30E', 30G' and 30H' will be fully synchronized and in phase.

In an embodiment, to ensure that the controllers 22 of overlapped transmitter resonators 30D', 30E', 30G' and 30H' all set their corresponding oscillators 26A to the same frequency, the controllers 22 of transmitter modules 20A' to 20I' are all provided with an identical table of frequencies selected within any given allowed band, for example an ISM band. Within that particular ISM band, a number of discrete frequencies are selected for inclusion in the frequency table. The number of tabulated frequencies within that ISM band is therefore finite and limited and the tabulated frequencies are interspaced widely enough that the various controllers 22 of transmitter modules 20D', 20E', 20G' and 20H' can determine a power signal frequency from the first impedance difference described above. Despite small variations in those impedances, all controllers 22 of transmitter modules 20D', 20E', 20G' and 20H' select for the power signal of their respective oscillators 26A and power amplifiers 26B the same discrete frequency from among the allowed ones in the band.

In an embodiment, to ensure that the resonators 30D', 30E', 30G' and 30H' all have not only the same power signal frequency, but also to the same phase, the following proce- dure is adopted and programmed into the software of each controller 22 of transmitter modules 20A' to 20I'. Statisti- cally, a first of the independent controllers 22 among those of transmitter modules 20D', 20E', 20G' and 20H' will turn its corresponding oscillator 26A and power amplifier 26B on first to supply power via its transmitter resonator to resonant receiver subsystem 14. A second of the other independent controllers 22 among those of transmitter modules 20D', 20E', 20G' and 20H' will measure the input impedance of its corresponding transmitter resonator and detect by means of its corresponding load detector 24A a small secondary change in that impedance due to the functioning of the first transmitter resonator. In effect, the second controller 22 is seeing a reflection of the impedance of the first transmitter resonator via the interaction of the latter with resonant receiver subsystem 14. The second controller 22 is pro- grammed to conclude that, based on the secondary imped- ance change, another controller has turned on its oscillator 26A and power amplifier 26B first. Having made this deduction, the second controller 22 then turns on its oscil- lator 26A and power amplifier 26B and varies the phase of its power signal while measuring the power transmitted by its corresponding transmitter resonator using its transmitter power sensor 24B. The second controller 22 then varies the phase of its oscillator and searches for the phase at which maximum power transfer occurs and sets the phase of the oscillator to that value. The oscillator phase determined in this fashion will ensure that the phase of the power signal transferred by the second transmitter resonator equals the phase of the power signal transferred by the first transmitter resonator to the resonant receiver subsystem 14. In an embodiment, the setting of the oscillator phase is based on substantially maximizing power transfer, rather than abso- lutely equalizing power signal phases.

In another embodiment, again based on transmitter reso- nators 30D', 30E', 30G' and 30H' being overlapped by resonant receiver subsystem 14, the detection of the prox- imity of resonant receiver subsystem 14 is based on test signal power drawn through transmitter resonators 30D', 30E', 30G' and 30H'. In this embodiment, low amplitude power signals are initially maintained by the oscillators and power amplifiers corresponding to all transmitter resonators 30A' to 30I'. The controllers 22 of all transmitter modules 20A' to 20I' then sense the power drawn by their corresponding transmitter resonators 30 using their corresponding transmitter power sensors 24B. Using their corresponding transmitter power sensors 24B, the controllers 22 of transmitter modules 20D', 20E', 20G' and 20H' sense that power is being drawn via their corresponding transmitter resonators 30D', 30E', 30G' and 30H'. Based on detection of the test signal power drawn, the controllers 22 of transmitter modules 20D', 20E', 20G' and 20H' turn on the full power of their corresponding power amplifiers 26B. The term "first test signal power draw" is used herein to describe this power drawn from the test signal via the transmitter resonators 30D', 30E', 30G' and 30H'. The test power signals of power amplifiers 26B of transmitter modules 30A', 30B', 30C', 30F' and 30I' not overlapped by resonant receiver subsystem 14 may be turned off after a suitable test period.

Equivalent to the impedance-based embodiment described above, the controllers 22 of transmitter modules 20D', 20E', 20G' and 20H' may require a threshold power draw in order to deem resonant receiver subsystem 14 present proximate their corresponding their corresponding transmitter resonators 30D', 30E', 30G' and 30H'.

In an embodiment, to ensure that the controllers 22 of overlapped transmitter resonators 30D', 30E', 30G' and 30H' all set their corresponding oscillators 26A to the same frequency, the controllers 22 of transmitter modules 20A' to 20I' are all provided with an identical table of frequencies selected within any given allowed band, for example an ISM band. Within that particular ISM band, a number of discrete frequencies are selected for inclusion in the frequency table. The number of tabulated frequencies within that ISM band is therefore finite and limited and the tabulated frequencies are interspaced widely enough that the various controllers 22 of transmitter modules 20D', 20E', 20G' and 20H' can determine a power signal frequency from the first test signal power draw described above. Despite small variations in those power draw values, all controllers 22 of transmitter modules 20D', 20E', 20G' and 20H' select for the power signal of their respective oscillators 26A and power amplifiers 26B the same discrete frequency from among the allowed ones in the band.

In an embodiment, to ensure that the resonators 30D', 30E', 30G' and 30H' all have not only the same power signal frequency, but also to the same phase, the following procedure is adopted and programmed into the software of each controller 22 of transmitter modules 20A' to 20I'. Statistically, a first of the independent controllers 22 among those of transmitter modules 20D', 20E', 20G' and 20H' will turn on its corresponding oscillator 26A and power amplifier 26B first to supply power via its transmitter resonator to resonant receiver subsystem 14. A second of the other independent controllers 22 among those of transmitter modules 20D', 20E', 20G' and 20H' will measure the power draw of its corresponding transmitter resonator and detect by means of its corresponding transmitter power sensor 24B a small secondary change in that power draw due to the functioning of the first transmitter resonator. In effect, the second controller 22 is seeing a reflection of the impedance of the first transmitter resonator via the interaction of the latter with resonant receiver subsystem 14. The second controller 22 is programmed to conclude that, based on the secondary change in power draw, another controller has turned on its oscillator 26A and power amplifier 26B first. Having made this deduction, the second controller 22 then turns on its oscillator 26A and power amplifier 26B and varies the phase of its power signal while measuring the power transmitted by its corresponding transmitter resonator using its transmitter power sensor 24B. The second controller 22 then searches for the phase at which maximum power transfer occurs and sets the oscillator to that phase. The oscillator phase set in this fashion ensures that the phase of the power signal transferred by the second transmitter resonator to resonant receiver subsystem 14 equals the phase of the power signal transmitted by the first transmitter resonator to the resonant receiver subsystem 14. In the embodiment, the setting of the oscillator phase is based on substantially maximizing power transfer, rather than absolutely equalizing power signal phases.

In an embodiment, when two different resonant receiver subsystems are proximate multi-transmitter subsystem 12' and overlap differing ones or combinations of transmitter resonators 30A' to 30I', then there is no a priori reason why the two different transmitter resonators, or two different groups of transmitter resonators overlapped by the two resonant receiver systems should be operating at the same frequency or phase, nor is there a requirement for them to do so. Grounded shield grid 33' ensures this multi-way independence by decoupling all the individual transmitter resonators 30A' to 30I' from one another. However, the transmitter resonators overlapped by one specific resonant receiver subsystem need to have their corresponding power signal amplifiers actively synchronized by their controllers as described above. This may result in the two different transmitter resonators, or two different groups of resonators, operating at two specific different locked-in frequencies in a band, with all signals in a particular group being mutually in phase.

Figure 14:
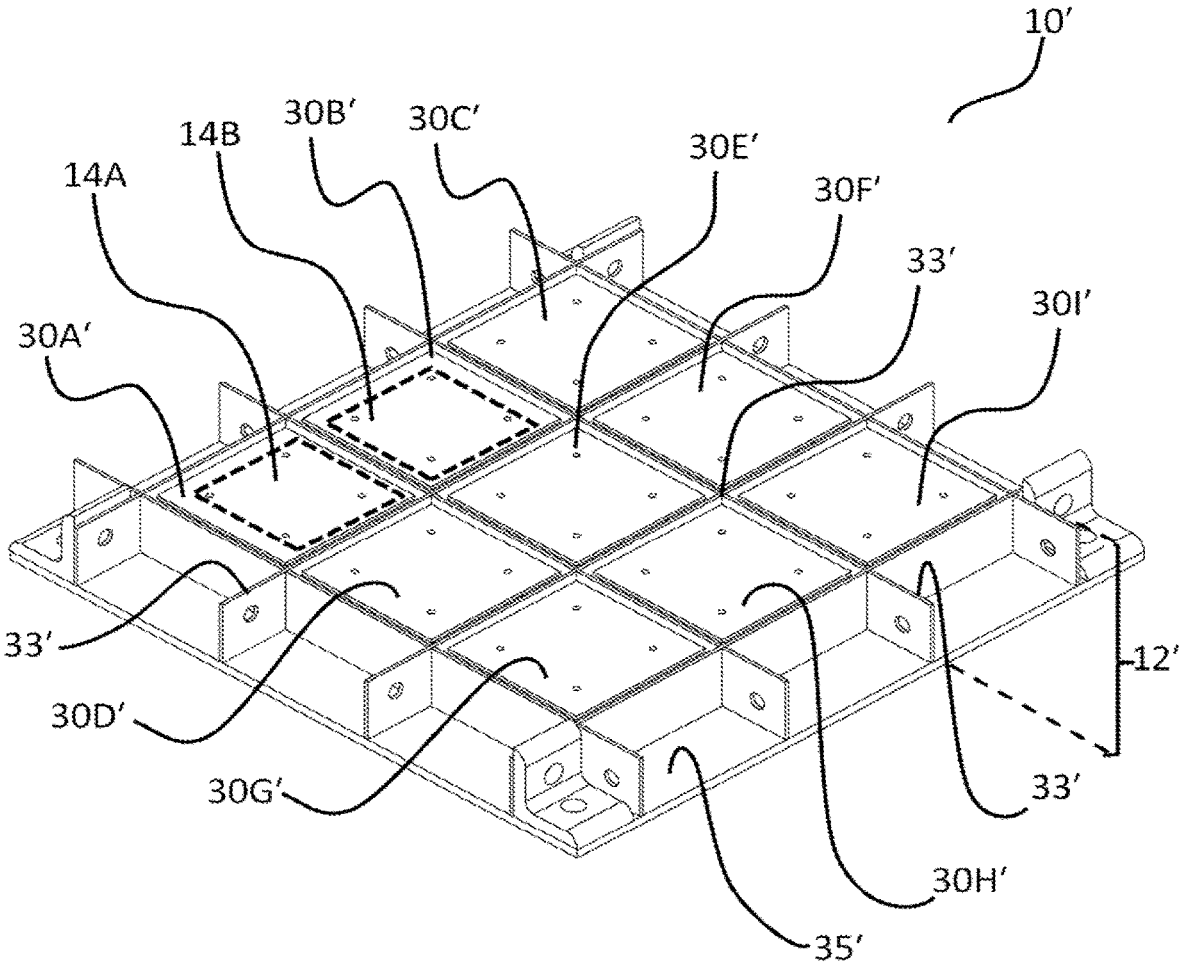
FIG. 14 depicts a multi-transmitter near-field resonant wireless electrical power transfer system for transferring power to more than one receiver subsystem.

In the foregoing, it has been described how two transmitter resonators transferring power to the same receiver resonator may be programmed to behave in order to ensure the two transmitter resonators bear power signals that are in phase to thereby ensure maximal power transfer. A different situation arises when two neighboring transmitter resonators, say 30A' and 30B' in FIG. 14, are transmitting to two substantially similar corresponding receiver subsystems 14A and 14B. Both transmitter resonators 30A' and 30B' have fringing fields of which the field lines extend from, for example, transmitter resonator 30A' to receiver subsystem 14B' and from transmitter resonator 30B' to receiver subsystem 14A. There is in general no specific physical structure in system 10' to keep the fields of, for example, transmitter resonator 30A' from interacting with the receiver resonator of receiver subsystem 14B.

In an embodiment, when transmitter resonators 30A' and 30B' are both serving the same large receiver resonator overlapping both transmitter resonators 30A' and 30B' (as in FIG. 13A), the fringing fields are not inherently a problem, because both transmitter resonators 30A' and 30B' will be running the same frequency power signal at the same phase. In the case of the situation depicted in FIG. 14, the requirement is to ensure that any fringing fields of a given transmitter resonator, for example 30A', interacting with a receiver subsystem (for example 14B intended for accepting power from a neighboring transmitter resonator 30B') do not allow power to be parasitized from transmitter resonator 30A'. One way to achieve this goal is to drive the two neighboring transmitter resonators 30A' and 30B' 180° out of phase with each other, so that the overlapping fringing fields from transmitter resonators 30A' and 30B' will in large part be mutually cancelling.

Since either of transmitter resonators 30A' and 30B' will be experiencing the other of transmitter resonators 30A' and 30B' as parasitic when their power signals are not 180° out of phase, the controller 22 of each of transmitter resonators 30A' and 30B' may increment the phase of the signal from the corresponding oscillator of each while measuring the power transmitted by the corresponding transmitter resonator 30A', 30B' using the corresponding transmitter power sensor 24B. The controllers 22 may then search for the adjusted oscillator phase that provides maximum transmitted power via the corresponding transmitter resonator 30A', 30B', and then set the phase of the oscillator to that corresponding phase.

The arrangements of frequencies and phases per resonant receiver system, whether of similar size or of different sizes, as described above ensure that both resonant receiver systems receive maximal transferred power. In a general embodiment, there may be a large number of transmitter resonators and several different resonant receiver subsystems may be receiving power, each resonant receiver subsystem receiving power from its own corresponding individual group of transmitter resonators at a frequency and phase selected by the controllers corresponding to the transmitter resonators in the group. Neighboring transmitter resonators transferring power to differing receiver subsystems may be operating 180° out of phase as a result of maximizing of the power transfer for each of the neighboring transmitter resonators. The process of maximizing the power transfer adjusts the oscillator phase. Since the impedances of the various transmitter modules are complex with slight variations in resistance, inductance and capacitance, the phase angles of the different oscillators at the points of maximal power transfer may not be quite equal (or differ by exactly 180°) when the power signals in the transmitter resonators are in fact equal (or differ by exactly 180°).

To the extent that system 10' comprises one circuit with an air gap between primary and secondary sides, any power transfer measured or maximized in a transmitter resonator, for example at point 24E in FIG. 6 based on measurement by transmitter power sensor 24B, could just as well be measured or maximized in the secondary circuit, for example at point 44C in FIG. 7 based on measurement by receiver power sensor 44A. The measurement may be provided by transmitter power sensor 24B to controller 42 of receiver module 40, which may in turn communicate the measurement to controller 22 of transmitter module 20 by one of the means already described in the foregoing.

The concept of a multi-transmitter near-field resonant wireless electrical power transfer system has been explained above with reference to system 10' configured for simultaneous capacitive power transfer and inductive power transfer according to an adjustable transfer mode ratio at a variable resonant power signal oscillation frequency. In a more general embodiment, a multi-transmitter near-field resonant wireless electrical power transfer system need not be specifically a bimodal system and may be a purely capacitive or a purely inductive power transfer system.

In a further aspect, depicted in the flow chart of FIG. 15, a wireless near-field method [1100] for transferring power at a variable resonant power signal oscillation frequency from a multi-transmitter subsystem 12' to a single resonant receiver subsystem 14 comprises: providing [1110] the multi-transmitter subsystem 12' comprising a plurality of mutually independent transmitter resonators 30A' to 30I', each of the transmitter resonators driven by a corresponding transmitter module 20A' to 20I', each transmitter module 20A' to 20I' capable of being set independently to one of a plurality of preset power signal oscillation frequencies in a preset frequency band, and all the transmitter resonators 30A' to 30I' having a common transmission surface; disposing [1120] proximate the common transmission surface the resonant receiver subsystem 14 comprising a single receiver resonator 50 overlapping two or more of the transmitter resonators (30D', 30E', 30G', and 30H in FIG. 13A); measuring [1130] input impedances of each of the transmitter resonators 30A' to 30I; and setting [1140] to one of an off state and an active state a power signal to each of the plurality of mutually independent transmitter resonators 30A' to 30I' based on the corresponding measured resonator input impedances.

The method [1100] may further comprise [1150] selecting on the basis of the measured input impedance of each of the active transmitter resonators (resonators 30D', 30E', 30G', and 30H in FIG. 13A) a power signal oscillation frequency for the corresponding transmitter resonator (30D', 30E', 30G', and 30H' in FIG. 13A) from among the plurality of preset power signal oscillation frequencies.

The method [1100] may further comprise setting [1160] the power signal of each active transmitter resonator (30D', 30E', 30G', and 30H' in FIG. 13A) to the corresponding selected frequency.

The method [1100] may further comprise adjusting [1170] a phase of the power signal applied to each corresponding transmitter resonator (resonators 30D', 30E', 30G', and 30H in FIG. 13A) to a phase at which power transfer through the transmitter resonator (30D', 30E', 30G', and 30H' in FIG. 13A) is substantially maximal.

In a further aspect, depicted in the flow chart of FIG. 16, a wireless near-field method [1200] for transferring power at a variable resonant power signal oscillation frequency from a multi-transmitter subsystem 12' to a single resonant receiver subsystem 14 comprises: providing [1210] the multi-transmitter subsystem 12' comprising a plurality of mutually independent transmitter resonators 30A' to 30I', each of the transmitter resonators driven by a corresponding transmitter module 20A' to 20I', each transmitter module 20A' to 20I' capable of being set independently to one of a plurality of preset power signal oscillation frequencies in a preset frequency band, and all the transmitter resonators 30A' to 30I' having a common transmission surface; disposing [1220] proximate the common transmission surface the resonant receiver subsystem 14 comprising a single receiver resonator 50 overlapping two or more of the transmitter resonators (30D', 30E', 30G', and 30H' in FIG. 13A); measuring [1230] power drawn by each of the transmitter resonators 30A' to 30I' from a test signal; and setting [1140] to one of an off state and an active state a power signal to each of the plurality of mutually independent transmitter resonators 30A' to 30I' based on the corresponding measured resonator test power draw.

The method [1200] may further comprise selecting [1250] on the basis of the measured test power drawn by each of the active transmitter resonators (resonators 30D', 30E', 30G', and 30H in FIG. 13A) a power signal oscillation frequency for the corresponding transmitter resonator (30D', 30E', 30G', and 30H in FIG. 13A) from among the plurality of preset power signal oscillation frequencies.

The method [1200] may further comprise setting [1260] the power signal of each active transmitter resonator (30D', 30E', 30G', and 30H in FIG. 13A) to the corresponding selected frequency.

The method [1200] may further comprise adjusting [1270] a phase of the power signal applied to each corresponding transmitter resonator (resonators 30D', 30E', 30G', and 30H in FIG. 13A) to a phase at which power transfer through the transmitter resonator (30D', 30E', 30G', and 30H in FIG. 13A) is substantially maximal.

In a further aspect, depicted in the flow chart of FIG. 17, a wireless near-field method [1300] for transferring power at a variable resonant power signal oscillation frequency from a multi-transmitter subsystem 12' to two or more receiver subsystems 14A, 14B (in FIG. 14) comprises: providing [1310] the multi-transmitter subsystem 12' comprising a plurality of mutually independent transmitter resonators 30A' to 30I' (in FIG. 14), each of the transmitter resonators driven by a corresponding transmitter module 20A' to 20I' (See FIG. 13B), each transmitter module 20A' to 20I' capable of being set independently to one of a plurality of preset power signal oscillation frequencies in a preset frequency band, and all the transmitter resonators 30A' to 30I' having a common transmission surface; disposing [1320] proximate the common transmission surface the two or more resonant receiver subsystems 14A, 14B each comprising a single receiver resonator overlapping one or more of the transmitter resonators (transmitter resonators 30A', 30B' in FIG. 14); measuring [1330] input impedances of each of the transmitter resonators 30A', 30B; and setting [1340] to one of an off state and an active state a power signal to each of the plurality of mutually independent transmitter resonators 30A' to 30I' based on the corresponding measured resonator input impedances.

The method [1300] may further comprise [1350] selecting on the basis of the measured input impedance of each of the active transmitter resonators (resonators 30A', 30B' in FIG. 14) a power signal oscillation frequency for the corresponding transmitter resonator 30A', 30B' from among the plurality of preset power signal oscillation frequencies.

The method [1300] may further comprise setting [1360] the power signal of each active transmitter resonator 30A', 30B' to the corresponding selected frequency.

The method [1300] may further comprise adjusting [1370] a phase of the power signal applied to each corresponding transmitter resonator 30A', 30B' to a phase at which power transfer through the transmitter resonator 30A', 30B' (in FIG. 14) is substantially maximal.

In a further aspect, depicted in the flow chart of FIG. 18, a wireless near-field method [1400] for transferring power at a variable resonant power signal oscillation frequency from a multi-transmitter subsystem 12' to two or more receiver subsystems 14A, 14B (in FIG. 14) comprises: providing [1410] the multi-transmitter subsystem 12' comprising a plurality of mutually independent transmitter resonators 30A' to 30I' (in FIG. 14), each of the transmitter resonators driven by a corresponding transmitter module 20A' to 20I' (See FIG. 13B), each transmitter module 20A' to 20I' capable of being set independently to one of a plurality of preset power signal oscillation frequencies in a preset frequency band, and all the transmitter resonators 30A' to 30I' having a common transmission surface; disposing [1420] proximate the common transmission surface the two or more resonant receiver subsystems 14A, 14B each comprising a single receiver resonator overlapping one or more of the transmitter resonators (transmitter resonators 30A', 30B' in FIG. 13); measuring [1430] power drawn by each of the transmitter resonators 30A' to 30I' from a test signal; and setting [1440] to one of an off state and an active state a power signal to each of the plurality of mutually independent transmitter resonators 30A' to 30I' based on the corresponding measured resonator test power draw.

The method [1400] may further comprise [1450] selecting on the basis of the measured input impedance of each of the active transmitter resonators (resonators 30A', 30B' in FIG. 14) a power signal oscillation frequency for the corresponding transmitter resonator 30A', 30B' from among the plurality of preset power signal oscillation frequencies.

The method [1400] may further comprise setting [1460] the power signal of each active transmitter resonator 30A', 30B' to the corresponding selected frequency.

The method [1400] may further comprise adjusting [1470] a phase of the power signal applied to each corresponding transmitter resonator 30A', 30B' to a phase at which power transfer through the transmitter resonator 30A', 30B' (in FIG. 14) is substantially maximal.

In a further aspect, described with reference to FIGS. 20A and 20B, FIGS. 21A and 21B, and FIGS. 22A and 22B, and based on the systems of FIG. 1 to FIG. 10 and FIG. 12 to FIG. 14, a near-field resonant wireless electrical power transfer system 10" is presented as per the schematic drawing of FIG. 19A for wirelessly transferring electrical power from a photovoltaic solar cell 420 to an electrical power load 70". An accented numbering system is used for the labels on FIG. 19A, so that the parallels with FIG. 13A and FIG. 13B are clear, and thereby also the parallels with FIG. 6 and FIG. 7 are clear. By this numbering scheme, DC power is supplied from solar cell 420 to transmitter module 20" via power conditioning unit (PCU) 430. The PCU 430, beyond converting the DC voltage and DC current to levels that may be transmitted further by power amplifier 26B", also provides suitably conditioned levels of voltage and current to drive the rest of the system components, including small signal electronic components, in transmitter module 20". The PCU 430 represents an adaptively varying load to solar cell 420 in order to adapt to the varying power provided by solar cell 420 and the varying output impedance presented by solar cell 420 to PCU 430. This allows PCU 430 to absorb power from solar cell 420 at a maximum possible rate at all times and temperatures despite the variation in that power from solar cell 420.

Oscillator 26A" may be used to modulate power amplifier 26B" at frequencies amenable to wireless power transfer as already described above. Power amplifier 26B" may be of the same design as amplifier 26B shown in FIG. 8, with the power from PCU 430 being supplied as DC voltage 127E in place of $V_{DD}$. In alternative embodiments, power amplifier 26B" may be suitably provided with circuitry to sustain an oscillation in itself, as is well-known in the field of radio systems, thereby obviating the oscillator 26A".

Figure 19A:
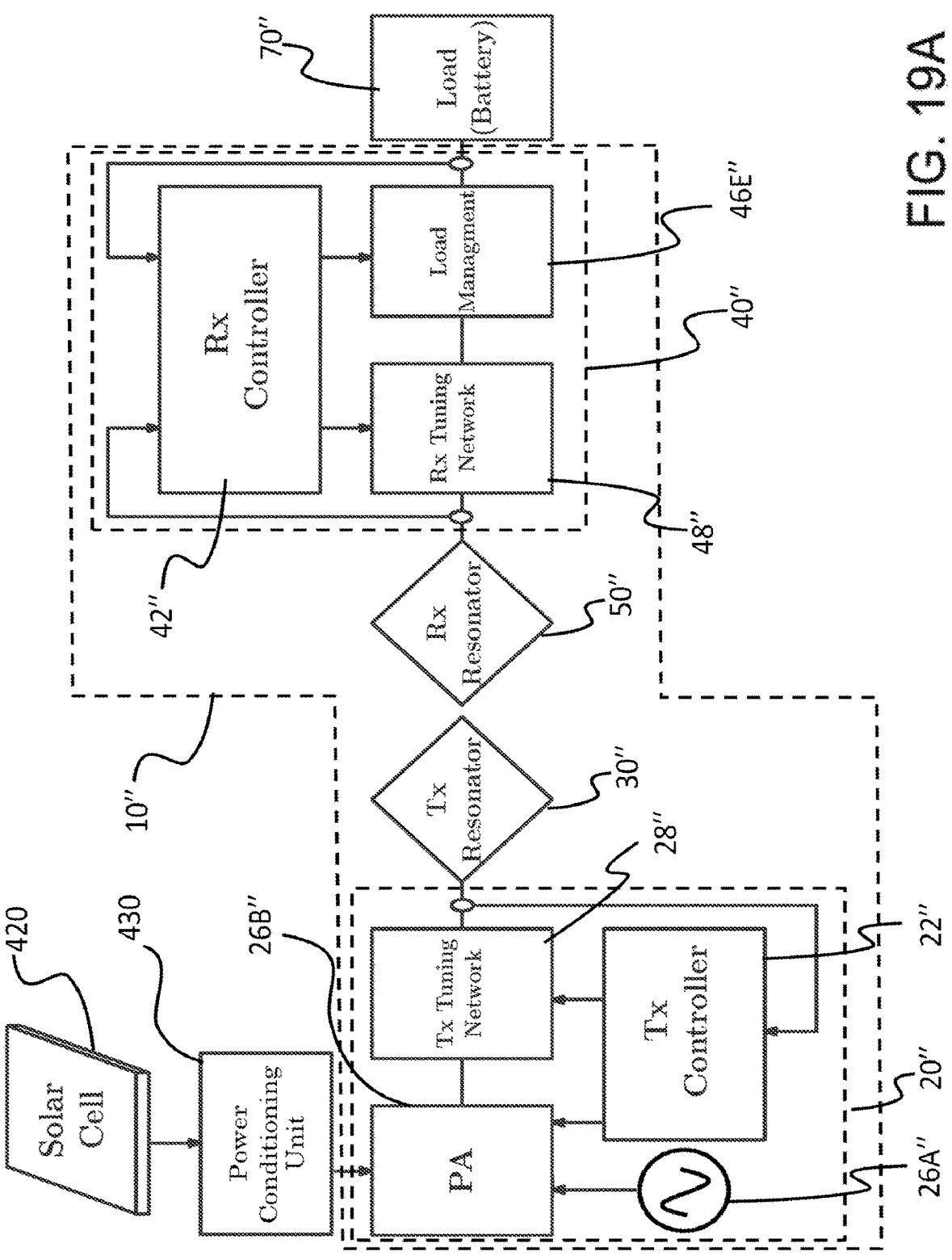
FIG. 19A shows a near-field resonant wireless electrical power transfer system for wireles sly transferring electrical power from a photovoltaic solar cell to an electrical power load.

Power may be transferred to transmission resonator 30" via transmission tuning network 28" which, in FIG. 19A, is a consolidation of signal conditioning and tuning components 26C, 26D, 26E, and 26F of FIG. 6. The transmitter resonator 30" may have a surface area that has an extent that may be at least a major fraction of the extent of the active solar radiation receiving surface of the solar cell 420. All these components of transmitter module 20" are under the control of controller 22", just as the corresponding components of transmitter module 20 in FIG. 6 are under the control of controller 22. In the interest of clarity, not all the components of transmitter module 20" are shown in FIG. 19A. The sensors and detectors 24A, 24B, 24C, and 24D of FIG. 6 may also, in equivalent form, be present in transmitter module 20" and connected to controller 22" and may fulfill the same roles as in FIG. 6.

Power may be transferred wirelessly from transmitter module 20" to receiver module 40" via transmission resonator 30" and receiver resonator 50". From receiver module 40" the power may then be transferred to DC load 70". Transmission of the power between transmission resonator 30" and receiver resonator 50" may be by means of near-field wireless transfer, as described above with reference to FIGS. 6 to 10. The near-field wireless power transfer as per FIG. 20 is not limited to being bimodal and may be purely capacitive or purely inductive.

Receiver module 40" may have the same components as receiver 40 of FIG. 7. For the sake of clarity, a reduced set of those components are shown in FIG. 19A. Sensor 44A and detector 44B of FIG. 7 are not shown in equivalent form in FIG. 19A, but may be present. Receiver tuning network 48" in FIG. 19A may be a consolidation of compensation network 46A, matching network 46B, rectifier 46D, and filter 46C. Power may be transferred from receiver tuning network 28" to load manager 46E", both of which may be under the control of receiver controller 42".

Described with reference to FIG. 19A and based on the systems of FIG. 1 to FIG. 10, a near-field resonant wireless electrical power transfer system 10" is presented for wirelessly transferring electrical power from an electrical power source, being photovoltaic solar cell 420 in this example embodiment, to an electrical power load 70". A doubly accented numbering system is used for the labels on FIG. 19A, so that the parallels with FIG. 6 and FIG. 7 may be made clear. By this numbering scheme, DC power is supplied from solar cell 420 to transmitter module 20" via power conditioning unit (PCU) 430. The PCU 430, beyond converting the DC voltage and DC current to suitable levels for conversion to radio frequency signals for further transmission by power amplifier 26B", also provides suitably conditioned levels of voltage and current to drive the rest of the system components, including small signal electronic components in, for example, transmitter module 20". The PCU 430 represents an adaptively varying load to solar cell 420 in order to adapt to the varying power provided by solar cell 420 and the varying output impedance presented by solar cell 400 to PCU 430. This allows PCU 430 to absorb power from solar cell 420 at a maximum possible rate at all times and temperatures despite the variation in that power from solar cell 420.

Oscillator 26A" may be used to modulate power amplifier 26B" at frequencies amenable to wireless power transfer as already described above. Power amplifier 26B" may be of the same design as amplifier 26B shown in FIG. 8, with the power from PCU 430 being supplied as DC voltage 127E in place of $V_{DD}$. In alternative embodiments, power amplifier 26B" may be suitably provided with circuitry to sustain an oscillation in itself, as is well-known in the field of radio systems, thereby obviating the oscillator 26A".

Power may be transferred to transmission resonator 30" via transmission tuning network 28" which, in FIG. 19A, is a consolidation of signal conditioning and tuning components 26C, 26D, 26E, and 26F of FIG. 6. The transmitter resonator 30" may have a surface area that has an extent that may be at least a major fraction of the extent of the active solar radiation receiving surface of the solar cell 420. All these components of transmitter module 20" are under the control of controller 22", just as the corresponding components of transmitter module 20 in FIG. 6 are under the control of controller 22. In the interest of clarity, not all the components of transmitter module 20" are shown in FIG. 19A. The sensors and detectors 24A, 24B, 24C, and 24D of FIG. 6 may also in equivalent form be present in transmitter module 20" and connected to controller 22" and may fulfill the same roles as already described with reference to FIG. 6.

Power may be transferred wirelessly from transmitter module 20" to receiver module 40" via transmission resonator 30" and receiver resonator 50". From receiver module 40" the power may then be transferred to DC load 70". Transmission of the power between transmission resonator 30" and receiver resonator 50" may be by means of near-field wireless transfer, as described above with reference to FIGS. 6 to 10. The near-field wireless power transfer as per FIG. 19A is not limited to being bimodal and may be purely capacitive or purely inductive.

Receiver module 40" may have the same components as receiver 40 of FIG. 7. For the sake of clarity, a reduced set of those components are shown in FIG. 19A. Sensor 44A and detector 44B of FIG. 7 are not shown in equivalent form in FIG. 19A but may be present. Receiver tuning network 48" in FIG. 19A may be a consolidation of compensation network 46A, matching network 46B, rectifier 46D, and filter 46C. Power may be transferred from receiver tuning network 28" to load manager 46E", both of which may be under the control of receiver controller 42".

Regarding rectifier 46D, shown in more detail in FIG. 7, the input impedance of this device is directly dependent on the load experienced by the output of the device.

In operation, near-field resonant wireless electrical power transfer system 10" may function in the same way as near-field resonant wireless electrical power transfer system 10 of FIG. 1, and FIGS. 6 to 10, with the difference that the applied voltage $V_{DD}$ on each power amplifier 26B" is replaced by the power signal from power conditioning unit (PCU) 430, which, in turn, receives its power from the relevant power source, being in this embodiment solar cell 420.

In another embodiment, power conditioning unit 430 may be omitted from the system shown in FIG. 19A and power transfer system 10" instead configured or operated to also serve as a power conditioning system. This may be achieved by configuring controller 22", for example without limitation in software, to adjust an input DC equivalent resistance of power amplifier 26B" based on a power level measured by power sensor 24B of FIG. 6. The term "input DC equivalent resistance" is used here to describe the ratio of DC voltage to DC current at the DC terminal of power amplifier 26B. Although controller 22" would do the adjustments based on a power measurement, it is anticipated that the maximum power point for transferred power would be attained when the input impedance of power amplifier 26B" matches the output impedance of the solar cell 420. In this embodiment, system 10" is functioning as what is known in industry as a "maximum power point tracker" and ensures that power is always transferred at a rate more suitable to the power consuming load than which would be obtained if the supply of power were unregulated. In another embodiment, controller 22" may be configured to measure the output impedance of the power source, being solar cell 420 in this embodiment, and then adjust the input impedance of power amplifier 26B" based on the measured output impedance of solar cell 420.

Over and above the adjustment of the input impedance of power amplifier 26B", controller 22" may also adjust one or more of the settings of transmitter tuning network 28" and the frequency of oscillator 26A". Furthermore, transmitter controller 22" may make the adjustments already described above based on measurements by load detector 24A shown in FIG. 6, which gives greater detail on the circuitry of transmitter modules 20 and 20". Load detector 24A senses at point 24E of FIG. 6 the effects of load 70".

Receiver controller 42" may also adjust one or more of the settings of receiver tuning network 48" and load management system 46E" in order to improve efficiency of the power transfer based on measurement by receiver power sensor 44A and load detector 44B (both shown in FIG. 7).

Figure 19B:
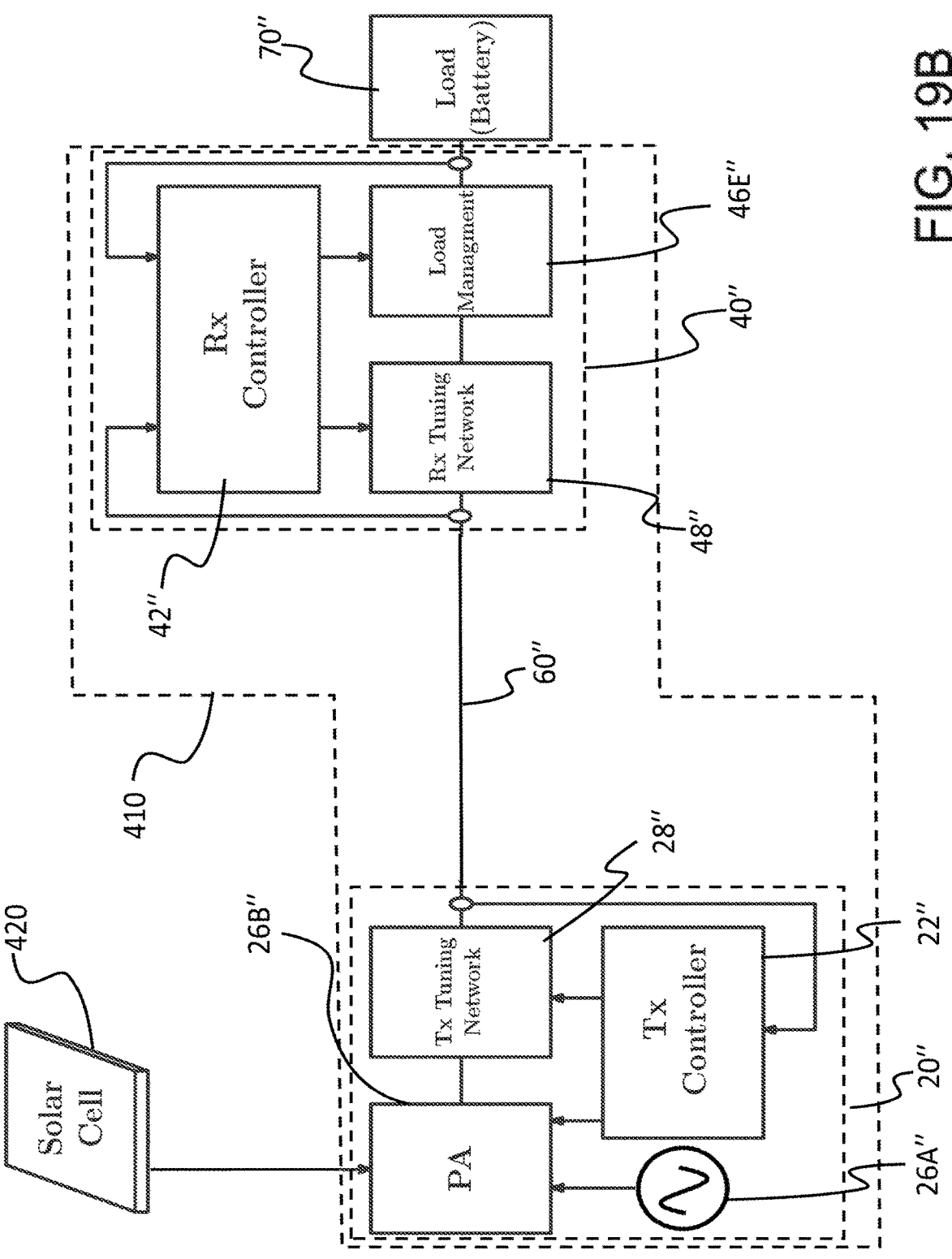
FIG. 19B shows a power transfer system for wirelessly transferring electrical power from a photovoltaic solar cell to an electrical power load.

In considering the power conditioning function of system 10", it may be appreciated that there is no a priori reason why the power transfer function of the system should be confined to near-field wireless transmission across an air gap as in FIG. 19A. Thus, in another embodiment, a power conditioning unit 410 is shown in FIG. 19B based on the elements of system 10" of FIG. 19A. Transmitter tuning network 28" is directly in electrical communication with receiver tuning network 48" via a suitable non-air-gap connection 60". This communication is via a radio frequency power signal and constitutes the power being transferred in and by the system. Electronic components of suitable reactance may be employed in well-known configurations to decouple any DC voltage and current levels in the transmitter module 20" from such levels in receiver module 40". Transmitter resonator 30" and receiver resonator 50" are absent from this embodiment and are obviated by the direct communication connection between transmitter tuning network 28" and receiver tuning network 48".

The functioning of the power transfer systems of FIG. 19A and FIG. 19B as power conditioning systems may be better appreciated by considering FIG. 19B in particular, in which the absence of transmitter resonator 30" and receiver resonator 50" simplify the power conditioning concepts, though these apply equally with these resonators present (as in FIG. 19A). The systems of FIGS. 19A and 19B have four independent control parameter that may be adjusted during operation to condition the power being transferred to the receiver module 40", and thereby to the load 70". Typical commercial power conditioning units are generally known as a "boost converters" by virtue of raising their output voltage above that of the source voltage. These devices have only two control parameters.

The first independent control parameter that may be adjusted during operation to condition the power being transferred to the receiver module 40", and thereby to the load 70", is the oscillation frequency of the power amplifier 26B", which is adjustable by controller 22A" in oscillator 26A".

The second independent control parameter that may be adjusted during operation to condition the power being transferred to the receiver module 40", and thereby to the load 70", is the output load on rectifier 46D of receiver module 40". That output load in turn directly determines the input impedance of rectifier 46D and thereby of receiver module 40". This, in turn, is the load experienced by transmitter module 20" and directly determines the input DC equivalent resistance of power amplifier 26B". Manipulation of the output load on rectifier 46D is done via load management system 46E" of receiver module 40" (See FIG. 19A) under control of receiver controller 42". This second independent control parameter is a property of the receiver module, but it innately controls the load experienced by the power source. The control point for manipulating this parameter is the load management system 46E" of receiver module 40".

The third and fourth independent control parameters that may be adjusted during operation to condition the power being transferred to the receiver module 40", and thereby to the load 70", are a property of the rectifier 46D of receiver module 40" (see FIG. 7) and a property of the power amplifier 26B" (FIG. 19A) and are similar in nature, but mutually completely independent. Both rectifier 46D and power amplifier 26B" comprise multiterminal amplification devices, relying on the modulation of the passage of a current between two terminals through the multiterminal device by a voltage signal applied to a third terminal of each device. The simplest multiterminal amplification device that may be used in each of rectifier 46D power amplifier 26B" is a transistor. This allows there to be a phase difference between voltage signal and current signal produced by or in the device. That voltage-current phase difference is adjustable via the applied voltage. Rectifier 46D may be an adjustable phase radio frequency rectifier of which the voltage-current phase difference may be adjusted via receiver controller 42". In the case of power amplifier 26B", the voltage-current phase difference may be adjusted via transmitter controller 22". Rectifier 46D may usefully comprise a differential self-synchronous radio frequency rectifier. Rectifier 46D may in particular comprise a differential Class F self-synchronous radio frequency rectifier.

The examples of FIGS. 19A and 19B are based on transferring power from a solar cell, or, by extension, from a solar cell array, in which the power delivered by the solar cell 420 can vary drastically down to zero depending on sunlight. There are many other power sources that suffer from variable output, both in terms of power and in terms of voltages generated. Among these are power generation turbines, wind turbines, and various batteries and accumulators. Wind turbines can vary drastically in their generation of power and the various batteries can have a wide range of power depletion curves. Given the efficiency of power transfer of systems either of these systems 10" and 410 may be configured to receive power from, for example without limitation, a commercial battery that has a slow open circuit voltage decay curve. Load management system 46E" may be configured to change the input DC equivalent resistance of power amplifier 26B" as already explained above and controllers 22" and 42" may be configured to render a required voltage level to the load 70" until such voltage can no longer be sustained by the power transmitted and the adjustability of the parameters of systems 10" and 410.

Figure 20A:
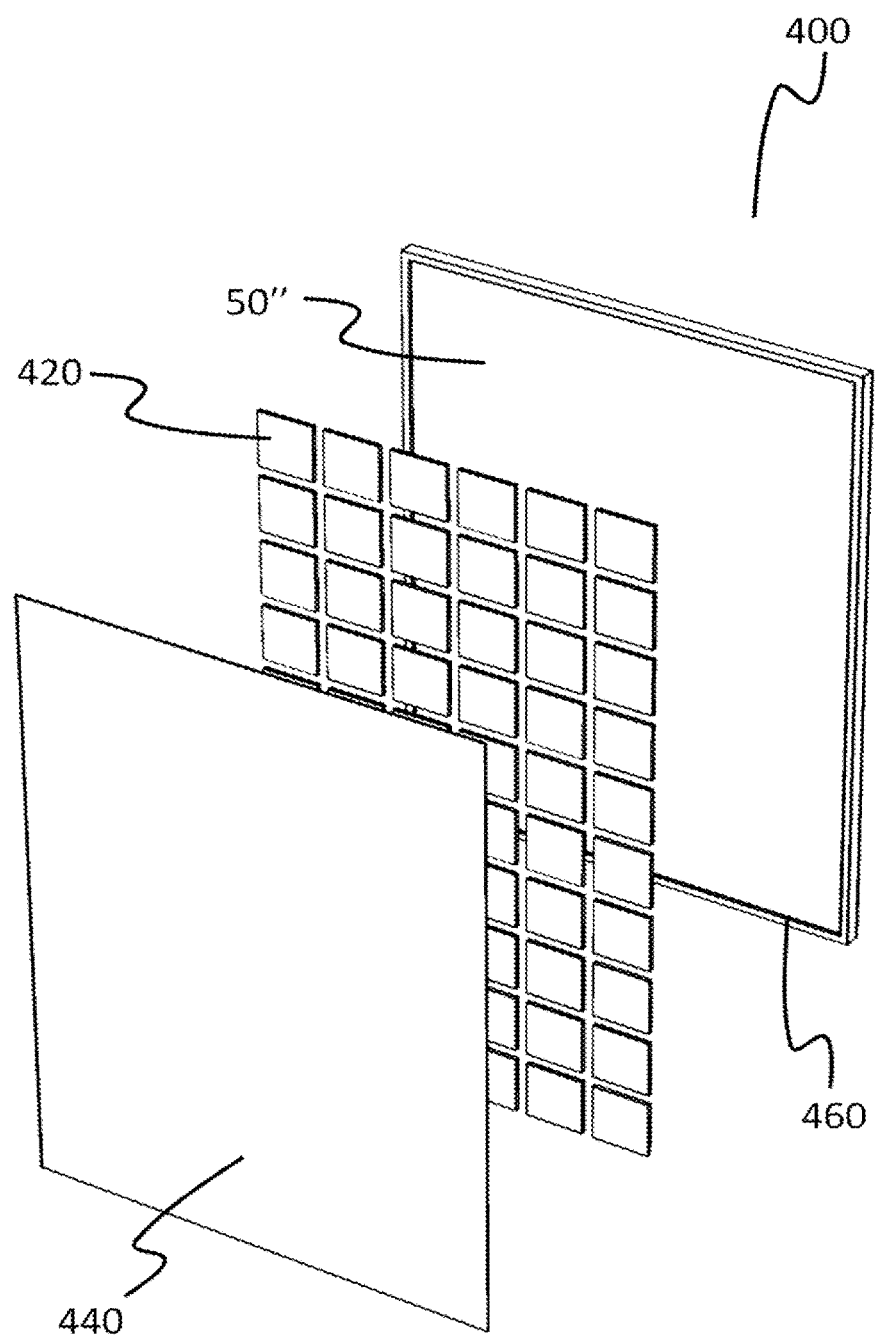
FIGS. 20A and 20B show front and rear views of solar cell array configured for using the near-field resonant wireless electrical power transfer system of FIG. 19A in a many-to-one configuration.
Figure 20B:
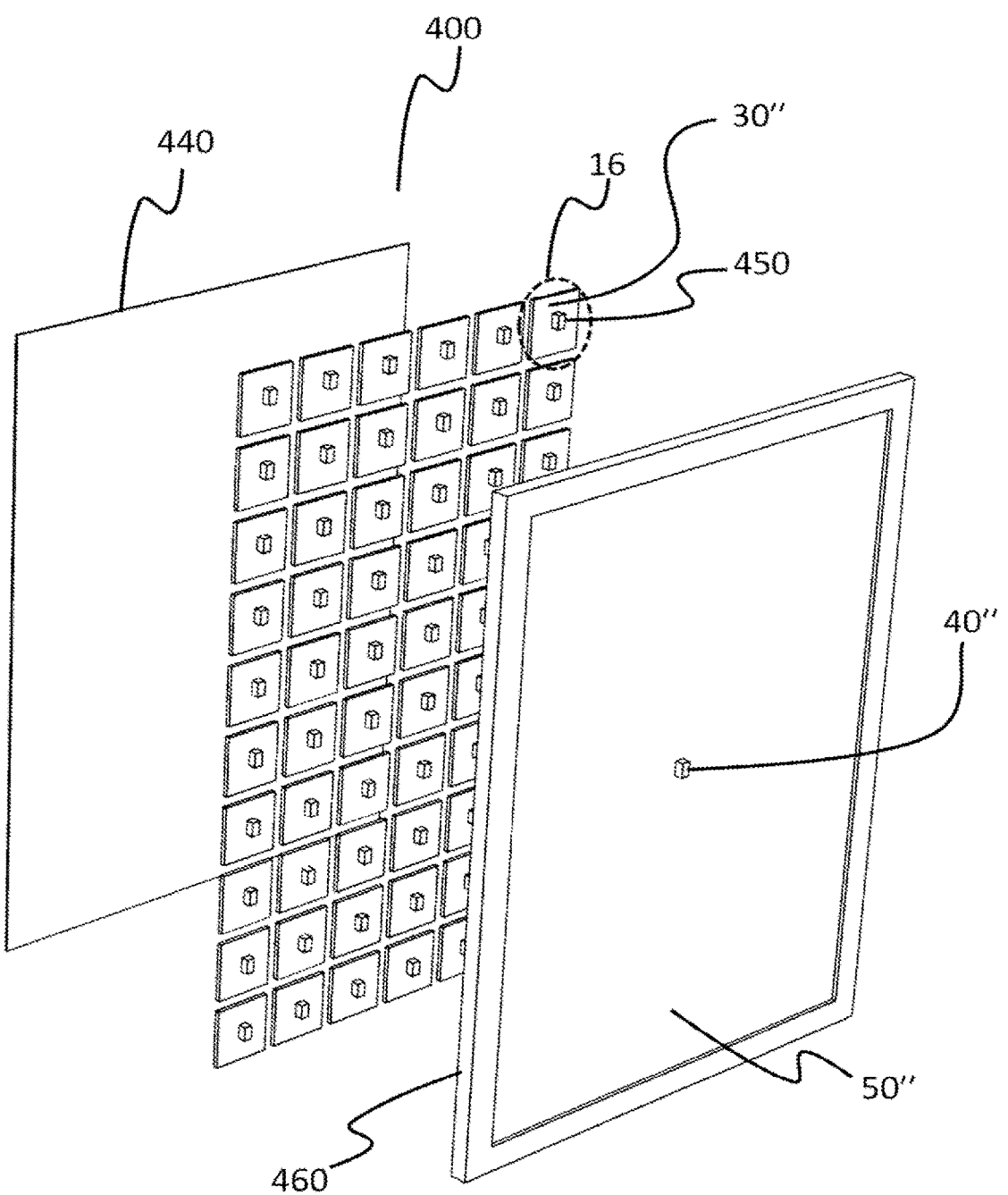

FIG. 19A and its associated descriptive text address the near-field wireless transfer of power from a single solar cell 420 to a single load 70", being typically a battery. In practical implementations of larger solar cell power systems, arrays of cells are typically employed, so that a power transfer scheme similar to that described with reference to FIG. 12, FIG. 13A and FIG. 13B may be employed, there being a plurality of transmitter subsystems and typically a single receiver subsystem. This situation is shown in FIGS. 20A and 20B, being respectively exploded front and rear views of a solar panel 400 with transparent solar cover 440 having one near-field wireless power transmission subsystem per solar cell 420, and thereby comprising, by way of example, sixty near-field wireless power transmission subsystems 16, each transmission subsystem 16 comprising a transmitter resonator 30", a transmitter module 20", and a power conditioning unit 430 as described with reference to FIG. 19A. To avoid cluttering, transmission subsystem 16 is not labeled in FIG. 19A, but is indicated and labeled in FIGS. 20B, 21B and 22B, as described further below.

In an embodiment, the coupling of each individual solar cell, of a solar panel comprised of a plurality of solar cells, to a power transfer and management system allows for cell level power management. By providing a power management at each individual cell, power collection can be optimized for each cell, resulting in improved efficiency for the entire solar panel system. In such an embodiment, the effects due to failure of individual cells or of a poor connection among the cells will be mitigated. Power collection at the individual cell level allows for maximum power harvest, even in less than ideal conditions, such as rain, shade, or when debris is covering a portion of the solar panel.

For the sake of avoiding clutter, only one near-field wireless power transmission subsystem 16 is labeled in FIG. 20B. In FIGS. 20A and 20B, the transmitter resonator 30" of each transmission subsystem 16 may be located on the back of its corresponding solar cell 420. The flat area of the solar cell, as seen from the front of the panel in FIG. 20A, represents the active solar radiation receiving and energy converting semiconductor device itself, and is correspondingly labeled 420, while the flat area of the device as seen from the back in FIG. 20B represents the transmitter resonator, and is correspondingly labeled 30". The transmitter resonator 30" may have a surface area that has an extent that may be at least a major fraction of the extent of the active solar radiation receiving surface of the solar cell 420. The transmitter module 20" and power conditioning unit 430 of each near-field wireless power transmission subsystem 16 are consolidated together in FIG. 20B and labeled 450. To avoid cluttering, the consolidated components 450 are not labeled in FIG. 19A, but are indicated as a unit and labeled in FIGS. 20B, 21B and 22B, as described further below. The single receiver resonator 50" may be fitted in the frame 460 of the solar panel 400. The single receiver module 40" may be mounted directly on the back of the receiver resonator 50".

In operation, near-field resonant wireless electrical power transfer system 10" may function in the same way as near-field resonant wireless electrical power transfer system 10' of FIG. 12, FIG. 13A and FIG. 13B, with the difference that the applied voltage V_{DD} on every one of the power amplifiers 26B" is replaced by the power signal from power conditioning unit (PCU) 430, which, in turn, receives its power from the relevant solar cell 420.

In another embodiment of the system of FIGS. 20A and 20B, frame 460 may be configured to be a suitable receiver resonator to receive power from all the transmitter resonators 30" and receiver module 40" may be located on frame 460. In this embodiment, the plate within the frame is not a resonator and may be a simple flat sheet of non conductive material.

Figure 21A:
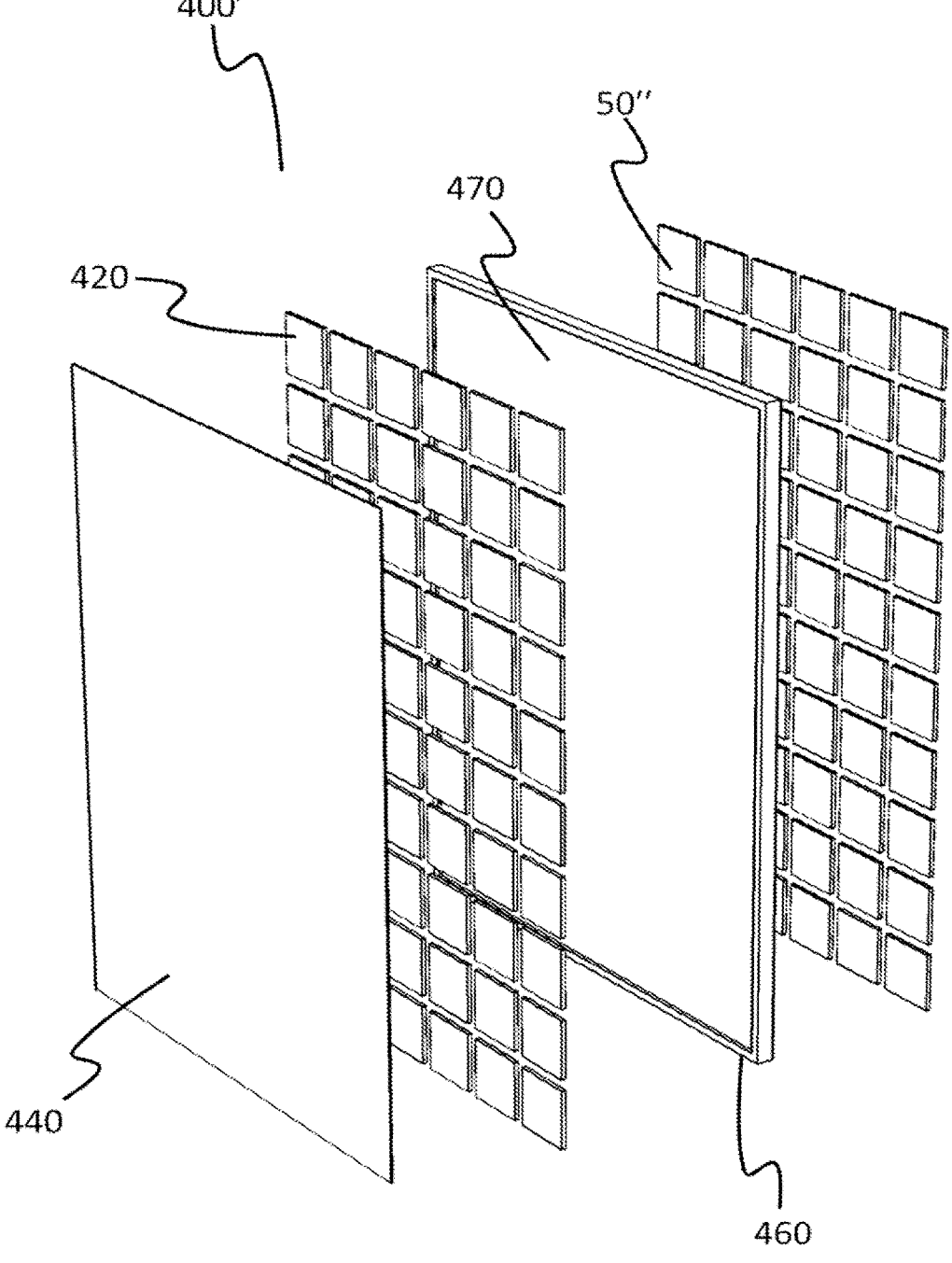
FIGS. 21A and 21B show front and rear views of solar cell array configured for using the near-field resonant wireless electrical power transfer system of FIG. 19A in a one-to-one configuration.
Figure 21B:
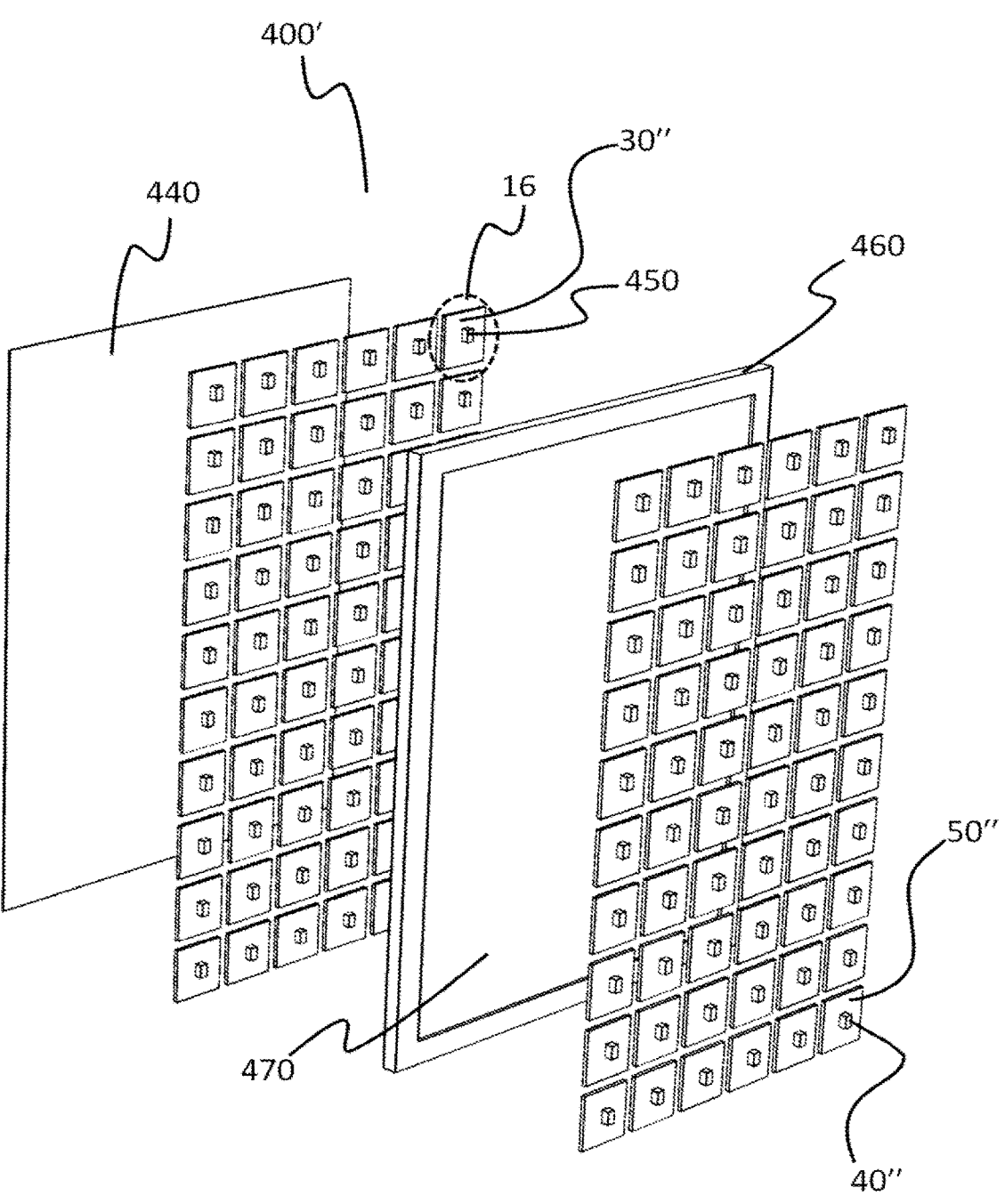

In another implementation, solar panel 400', shown in front and rear views in FIGS. 21A and 21B respectively, has each near-field wireless power transmission subsystem transfer power to one near-field wireless power receiver subsystem. While frame 460 is shown as being filled by an opaque plate 470, the plate 470 may not be part of either the near field electrical or magnetic circuit. For the sake of clarity, we employ the same components numbering on the transmit side as in FIGS. 20A and 20B. On the receive side, we employ the numbering of FIG. 19A. Again, to avoid clutter, only one receive side device is labeled.

In operation, the solar panel arrangement 400' of FIG. 21A and FIG. 21B may have the individual transmitter modules 20" linked by hardwire (not shown) so that they may be in phase, thereby allowing least power loss in transmission. In other embodiments, the transmitter modules 20" may be independent and function as explained at the hand of FIG. 14, FIG. 17 and FIG. 18.

Figure 22A:
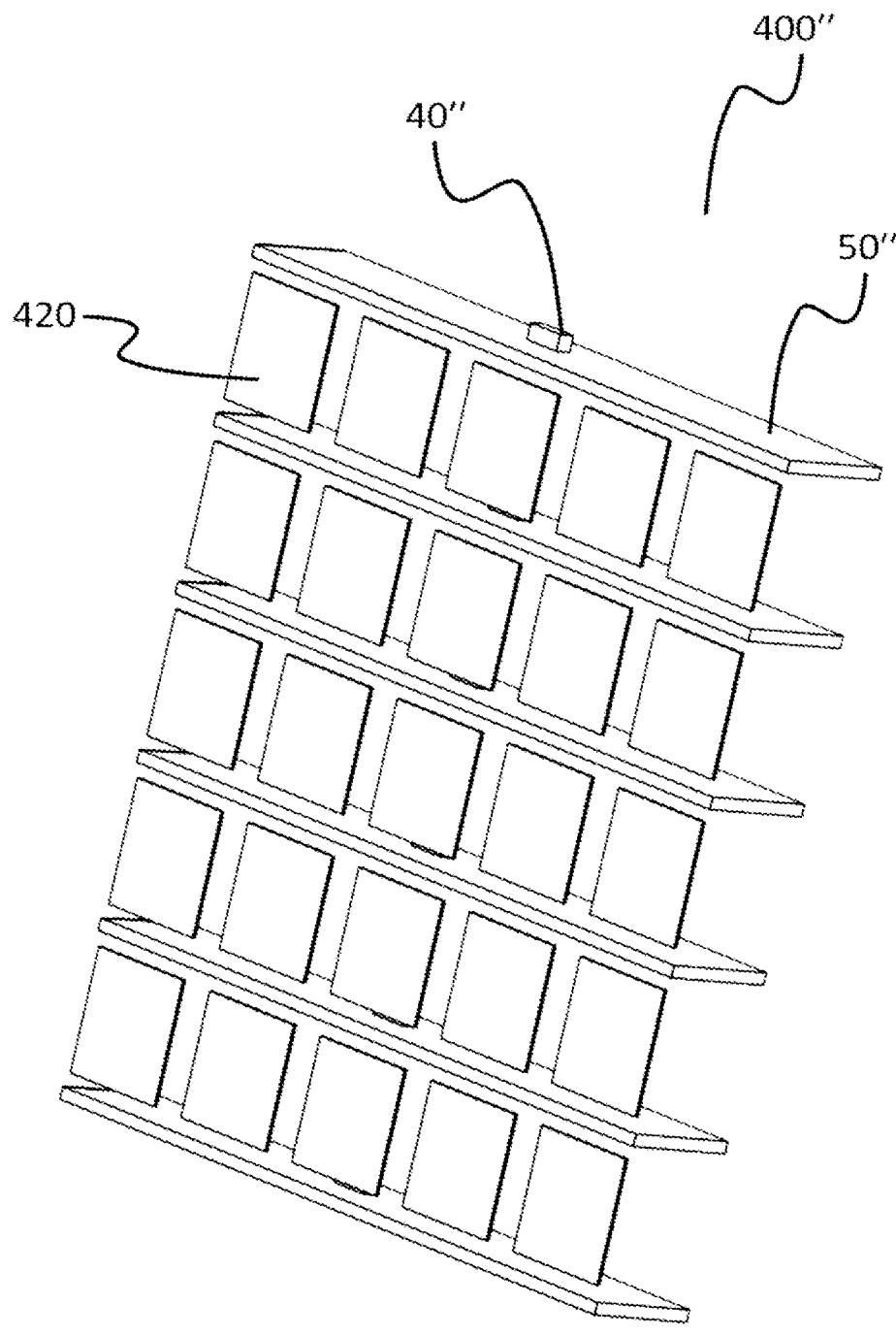
FIGS. 22A and 22B show front and rear views of solar cell array configured for using the near-field resonant wireless electrical power transfer system of FIG. 19A in a row-based configuration.
Figure 22B:
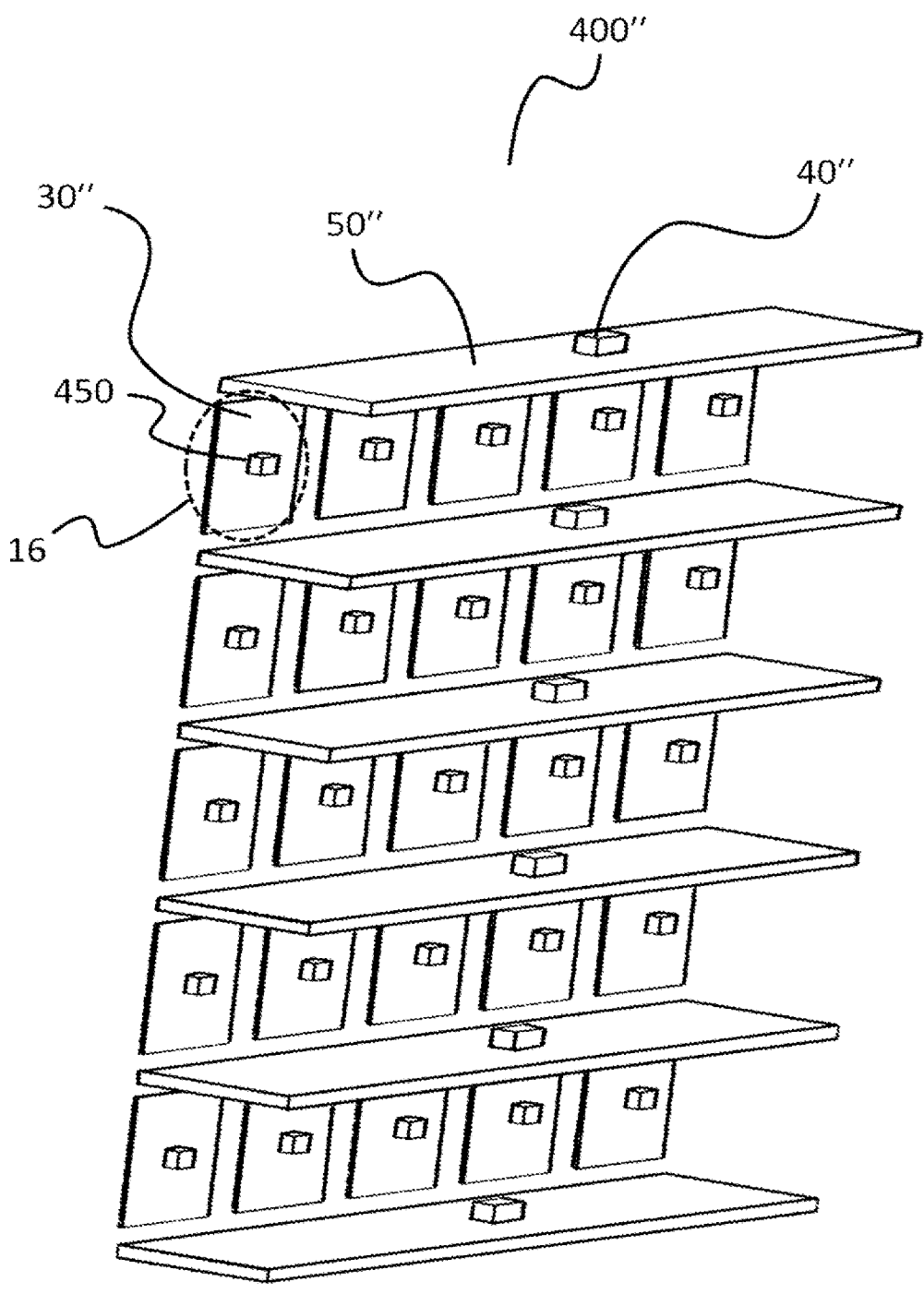

In yet a further implementation, shown as the solar panel arrangement 400" in front view and rear view in FIGS. 22A and 22B respectively, an array of, for example, twenty-five solar cells, is shown, arranged in five rows of five cells 420 each. Each solar cell 420 has at its rear a transmitter resonator 30" and a unit 450 comprising its corresponding transmitter module 20" and power conditioning unit 430. At the bottom and top of the array and between each two rows of solar cells is a receiver resonator 50", arranged in a plane substantially perpendicular to a plane of the solar cells 420, each receiver resonator 50" in wired electrical communication with its corresponding receiver module 40". As with the previous solar panel embodiments, one example of each component is labeled. As with the implementations shown in FIGS. 20A and 20B, and FIGS. 21A and 21B, solar panel arrangement 400" may in some embodiments also have a frame 460. For the sake of clarity, frame 460 is not shown in FIGS. 22A and 22B.

In operation, the transmitter resonators 30" of the solar cells 420 in a particular row of system 400" transmit power to the receiver resonators 50" both above and below them. In this embodiment there is, however, the additional mechanism of the various nearest neighbor receiver resonators 50" being resonantly coupled and sharing collected power among them. The collected power gathered by all the receiver resonators 50" of the array may therefore be tapped via any one or more of the various receiver modules 40". In particular, the power collected by all the receiver modules 40" may, by way of example, be tapped via only the bottom-most receiver module 40". Any one of the receiver modules 40" on any resonator 50" can act as a receiver module to collect the power of a row of solar cells 420 whilst also functioning as a transmitter module to transmit the collected power via its associated resonator 50" to another resonator 50" proximate it. This action may be repeated down the array to transfer the power to the bottom-most receiver module 40".

In another embodiment of the system of FIGS. 22A and 22B, a frame, similar to frame 460 of FIGS. 20A and 20B, surrounding the planar perimeter of the solar cell array of FIGS. 22A and 22B may be a receiver resonator bearing a receiver module 40" and may receive power from the various resonators 50". In this way, the total power generated by all the solar cells 420 in the array may be received by the resonator frame 460 and tapped for further electrical transmission via receiver module 40".

Power collection at the individual solar cell level may be accomplished with a wired connection. However, use of a wireless transmission system in the solar panel allows for a reduction of wiring, and therefore a reduction in manufacturing costs.

In a further aspect, described with reference to the flow chart in FIG. 23, a method [1500] is provided for transferring power from a photovoltaic cell 420 to a power load 70", the method comprising: converting [1510] in a transmission module 20" the power from the photovoltaic cell 420 into an oscillating electrical power signal having an oscillation frequency; transferring [1520] the power to a transmitter resonator 30" in wired electrical communication with the transmission module 20" and configured to resonate at the oscillation frequency; receiving [1530] power in a receiver resonator 50" configured to resonate at the oscillation frequency and disposed to receive the power from the transmitter resonator 30" via at least one of capacitive coupling and magnetic induction; receiving [1540] the power in a receiver module 40" in wired electrical communication with the receiver resonator 50"; and rendering [1550] via wired electrical communication to the power load 70" the received power in direct current form. The method may further comprise converting a voltage and a current of the power from the photovoltaic cell 420 to a voltage and a current adapted to the transmission module 20" before converting the power into an oscillating electrical power signal.

In a further embodiment of the method, described with reference to FIG. 19A and the flow chart in FIG. 24, a method [1600] is provided for transferring power from an array 400 of photovoltaic cells 420 to a power load 70", the method comprising: converting [1610] in each of a first plurality of corresponding transmission modules 20" the power from each of the photovoltaic cells 420 in the array 400 into an oscillating electrical power signal having an oscillation frequency; transferring [1620] the power in each of the transmission modules 20" to a corresponding transmitter resonator 30" from among a second plurality of transmitter resonators 30" each configured to resonate at the oscillation frequency; receiving [1630] the power in a receiver resonator 50" configured to resonate at the oscillation frequency and disposed to receive the power from the plurality of transmitter resonators 30" via at least one of capacitive coupling and magnetic induction; receiving [1640] the power in a receiver module 40" in wired electrical communication with the receiver resonator 50"; and rendering [1650] via wired electrical communication to the power load 70" the received power in direct current form. The method may further comprise converting a voltage and a current of the power from each photovoltaic cell 420 to a voltage and a current adapted to the corresponding transmission module 20" before converting the power into an oscillating electrical power signal. Receiving [1630] the power in a receiver resonator 50" may comprise receiving the power in a receiver resonator disposed around a planar perimeter of the array 400 of photovoltaic cells.

In a further embodiment of the method, described with reference to FIG. 19A and the flow chart in FIG. 25, a method [1700] is provided for transferring power from an array 400' of photovoltaic cells 420 to a power load 70", the method comprising: converting [1710] in each of a first plurality of corresponding transmission modules 20" the power from each of the photovoltaic cells 420 in the array 400' into an oscillating electrical power signal having an oscillation frequency; transferring [1720] the power from each of the transmission modules 20" to a corresponding transmitter resonator 30" from among a second plurality of transmitter resonators 30" wherein each transmitter resonator 30" is configured to resonate at the oscillation frequency; receiving [1730] the power from each transmitter resonator 30" in a corresponding receiver resonator 50" configured to resonate at the oscillation frequency, wherein each receiver resonator 50" is further configured and disposed to receive the power from the transmitter resonator 30" via at least one of capacitive coupling and magnetic induction; receiving [1740] the power from each receiver resonator 50" in a corresponding receiver module 40" in wired electrical communication with the receiver resonator 50"; and rendering [1750] via wired electrical communication to the power load 70" the received power in direct current form. The method may further comprise converting a voltage and a current of the power from each photovoltaic cell 420 to a voltage and a current adapted to the corresponding transmission module 20" before converting the power into an oscillating electrical power signal.

In a further embodiment, described with reference to FIG. 19A and the flow chart in FIG. 26, a method [1800] is provided for transferring power from an array 400" of photovoltaic cells 420 to a power load 70" (in FIG. 19A), the method comprising: converting [1810] in each of a first plurality of corresponding transmission modules 20" the power from each of the photovoltaic cells 420 in the array 400" into an oscillating electrical power signal having an oscillation frequency; transferring [1820] the power from each of the transmission modules 20" to a transmitter resonator 30" from among a second plurality of transmitter resonators 30" wherein each transmitter resonator 30" is configured to resonate at the oscillation frequency; receiving [1830] the power from each transmitter resonator 30" in any proximate receiver resonator 50" among a third plurality of receiver resonators 50" configured to resonate at the oscillation frequency, wherein each receiver resonator 50" is further configured and disposed to receive the power from the transmitter resonator 30" via at least one of capacitive coupling and magnetic induction; sharing [1840] the received power among the third plurality of receiver resonators 50"; and rendering [1850] via wired electrical communication to the power load 70" the received power in direct current form from one or more of the third plurality of receiver resonators 50" via a corresponding one or more receiver modules 40". The method may further comprise converting a voltage and a current of the power from each photovoltaic cell 420 to a voltage and a current adapted to the corresponding transmission module 20" before converting the power into an oscillating electrical power signal.

Figure 27A:
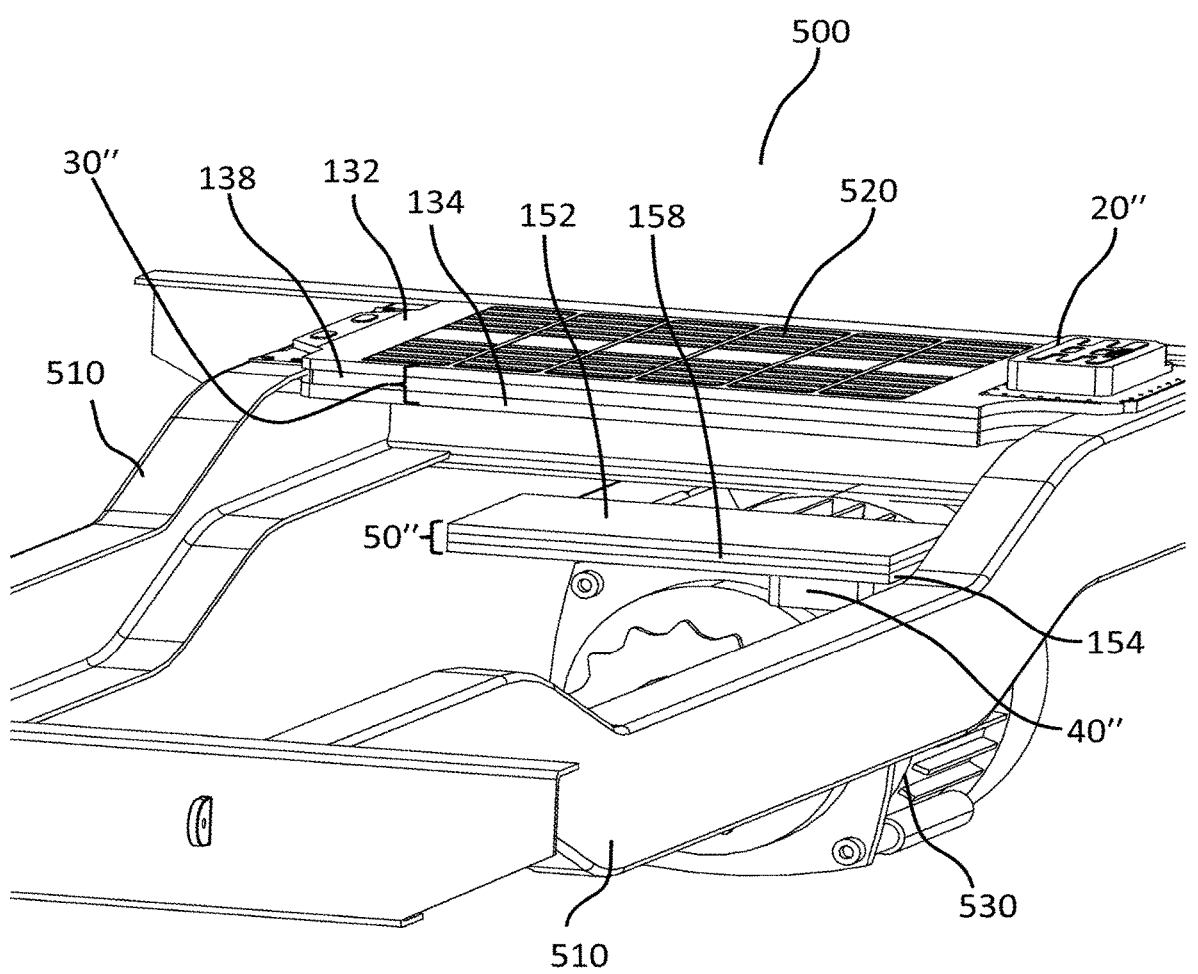
FIG. 27A shows a drawing of a portion of an electric vehicle using an embodiment of a power transfer system.

FIG. 27A shows a representative portion 500 of an extended near-field wireless electrical power distribution system in an electrically powered vehicle with electrically conducting chassis 510. In this embodiment of the general system 10" of FIG. 19A, the power source is a rechargeable battery 520 rather than solar cell 420 and load 70" is an electric motor 530 rather than a battery as in FIG. 19A. The system shown in FIG. 14A may optionally comprise a power conditioning unit 430 as in FIG. 19A. In other embodiments, transmitter module may jointly function to provide power conditioning as explained above with reference to FIG. 19B.

The system shown in FIG. 27A and described in more detail below may operate by Capacitive Power Transfer, Inductive Power Transfer, or by Bimodal Power Transfer. With reference to FIG. 4B and FIG. 19A, transmitter resonator 30" comprises dielectric element 138 sandwiched between conductive antennas 132 and 134. With reference to FIG. 4B and FIG. 19A, receiver resonator 50" comprises dielectric element 158 sandwiched between conductive antennas 152 and 154. Transmitter module 20" is shown directly mounted to antenna 132, which also serves as frame or holder for battery 520. Transmitter module 20" may be electrically connected between battery 520 and transmitter resonator 30". Receiver module 40" is shown directly mounted to electric motor 530. Receiver module 40" may be electrically connected between receiver resonator 50" and motor 530.

Figure 27B:
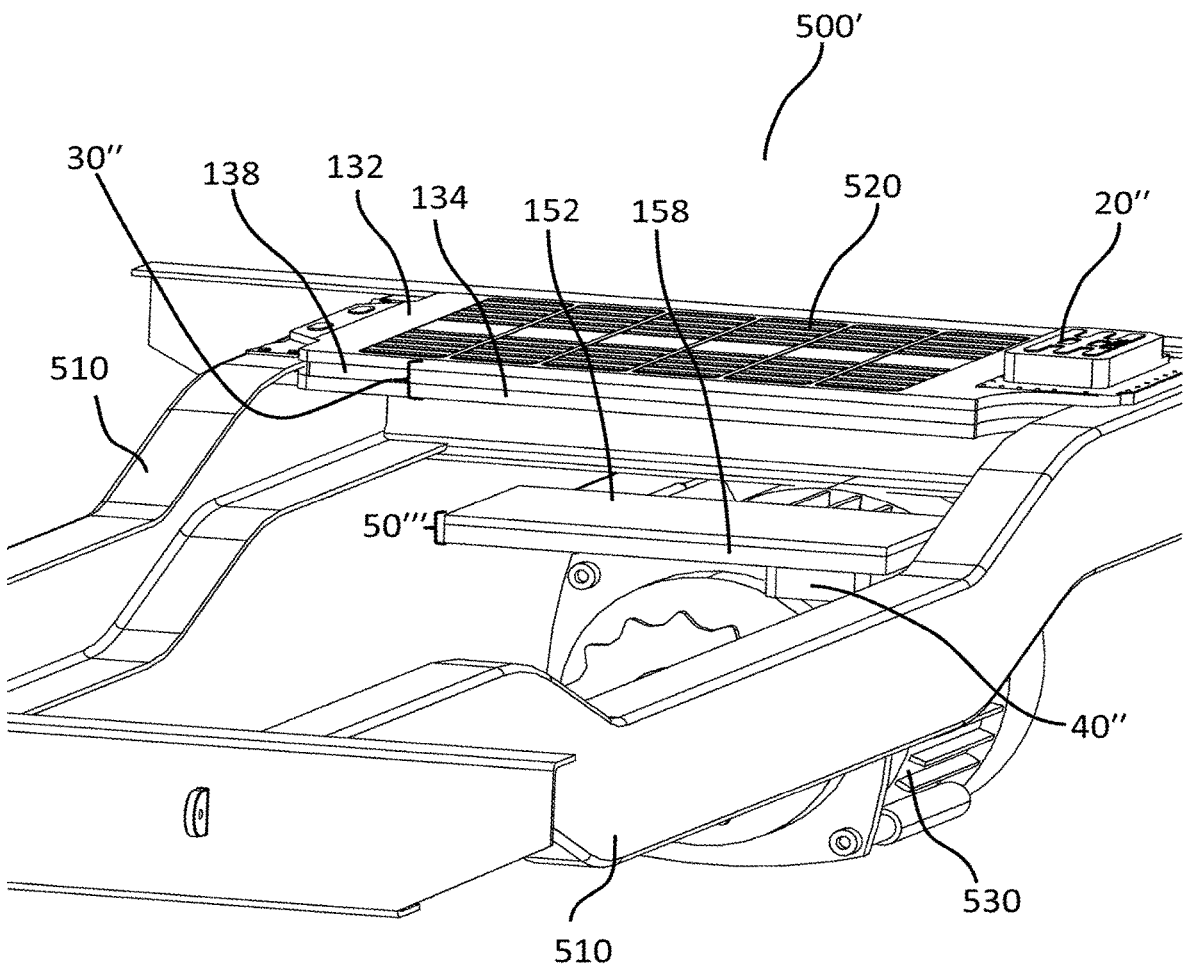
FIG. 27B shows another drawing of a portion of an electric vehicle using an embodiment of a power transfer system.

FIG. 27B shows a representative portion 500' of an extended near-field wireless electrical power distribution system in an electrically powered vehicle with electrically conducting chassis 510. In this embodiment of the general system 10" of FIG. 19A, the power source is again, as in FIG. 27A, a rechargeable battery 520 rather than solar cell 420 and load 70" is an electric motor 530 rather than a battery as in FIG. 19A. The system shown in FIG. 27B may optionally comprise a power conditioning unit 430 as in FIG. 19A. In other embodiments, transmitter module 20" and receiver module 40" may jointly function to provide power conditioning as explained above with reference to FIG. 19B.

The system shown in FIG. 27B and described in more detail below may operate by Capacitive Power Transfer, Inductive Power Transfer, or by Bimodal Power Transfer.

With reference to FIG. 4B and FIG. 19A, transmitter resonator 30" comprises dielectric element 138 sandwiched between conductive antennas 132 and 134. With reference to FIG. 4B and FIG. 19A, receiver resonator 50"' comprises dielectric element 158 and conductive antenna 152, antenna 154 of FIG. 27A being absent from resonator 50"' in this embodiment. Transmitter module 20" is shown directly mounted to antenna 132, which also serves as frame or holder for battery 520. Transmitter module 20" may be electrically connected between battery 520 and transmitter resonator 30". Receiver module 40" is shown directly mounted to electric motor 530. In this embodiment, receiver module 40" may be electrically connected between motor 530 and chassis 510. In this arrangement, there is enough coupling between chassis 510 and antenna 152 for power transfer at suitably high efficiency. Electrically conducting mechanical components of the system, that is, components that have, for example load bearing structural functions in the system, may hereby form part of the resonant structure of the electrical power transfer system.

In the embodiments shown in FIGS. 27A and 27B, the focus is specifically on the electrical power supplied to the electrical motor 530 driving one of the wheels of the vehicle, but the equivalent arrangement may be implemented for any electrical subsystem on the vehicle, using a plurality of suitably adapted receiver modules 40", all provided with power by transmitter module 20".

The arrangements of FIG. 27A and FIG. 27B for power transfer from a battery to the electrical subsystems of a vehicle obviates in large part the hugely complex automotive wire harness that creates difficulty during vehicle manufacture and is the source of considerable manufacturing costs. The embodiments in FIG. 27A and FIG. 27B, together with their extensions to the other electrical subsystems of the vehicle, may be described as "extended near-field wireless electrical power distribution systems".

Beyond the other wheels of the electric vehicle, this arrangement may extend to the headlights and other vehicle accessories including without limitation, interior lights, dashboard displays, gauges, digital electronics, navigation systems, warning systems, and the like. Nor is the application limited to electric vehicles. It may be applied to hybrid or internal combustion vehicles to distribute electrical power as and where required. It may similarly be applied to other vehicles employing any electrical systems requiring electrical power. Examples without limitation include motorized and non-motorized bicycles, aircraft, boats, and other vehicles employing on-board electrical power sources. The battery or power source need not be limited to being on-board the vehicle. The principles explained with respect to FIGS. 1 to 11, 19A-19B, and 27A-27B apply also to stationary and vehicular systems requiring electrical power to be supplied from a geostationary source, for example without limitation a fixed rail for supplying power to a moving vehicle.

Figure 28A:
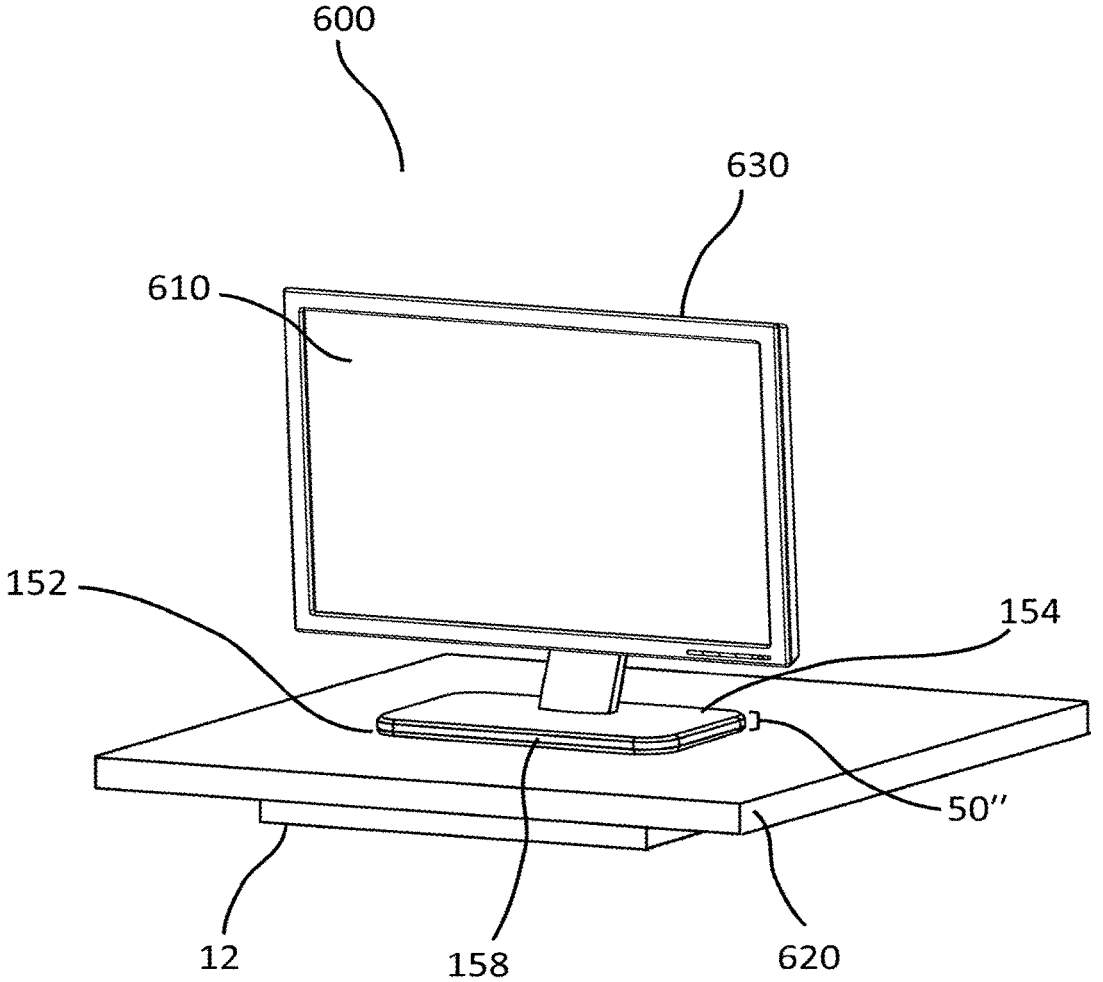
FIG. 28A shows a drawing of computer monitor using an embodiment of a power transfer system.

FIG. 28A shows another embodiment of the general system 10" of FIG. 19A in a power supply system 600 for supplying power to a computer monitor 610, positioned on a tabletop 620 of a desk, with electrical power from a suitable source via a primary side 12 as per FIG. 1 and, in more detail, FIG. 6. In system 600, transmitter module 20" and transmission resonator 30" of FIG. 19A are both incorporated in primary side 12. In the arrangement of system 600, receiver resonator 50" as per FIG. 19A forms the base of the monitor 610. Receiver module 40" of FIG. 19A may be incorporated in the base of the monitor 610. Alternatively, receiver module 40" of FIG. 19A may be incorporated inside the monitor 610 itself. With reference to FIG. 4B, antenna 152 forms the bottom of the base of the monitor 610 and is separated from antenna 154 by dielectric 158.

The housing and structural frame 630 of monitor 610 may be at least in part electrically conductive and serve as one contiguous conductor to electrically supply power signal from antenna 154 via receiver module 40" (see FIG. 19A) to the circuitry of the monitor 610 representing load resonator 70" of FIG. 19A. The other electrical connector from antenna 152 to the circuitry of the monitor 610 runs from antenna 152 and up the pedestal of monitor 610. In other embodiments, the housing and structural frame 630 of monitor 610 may be non-conductive polymer and a separate conductor runs from antenna 154 to the circuitry of the monitor 610 representing load resonator 70" of FIG. 19A.

Figure 28B:
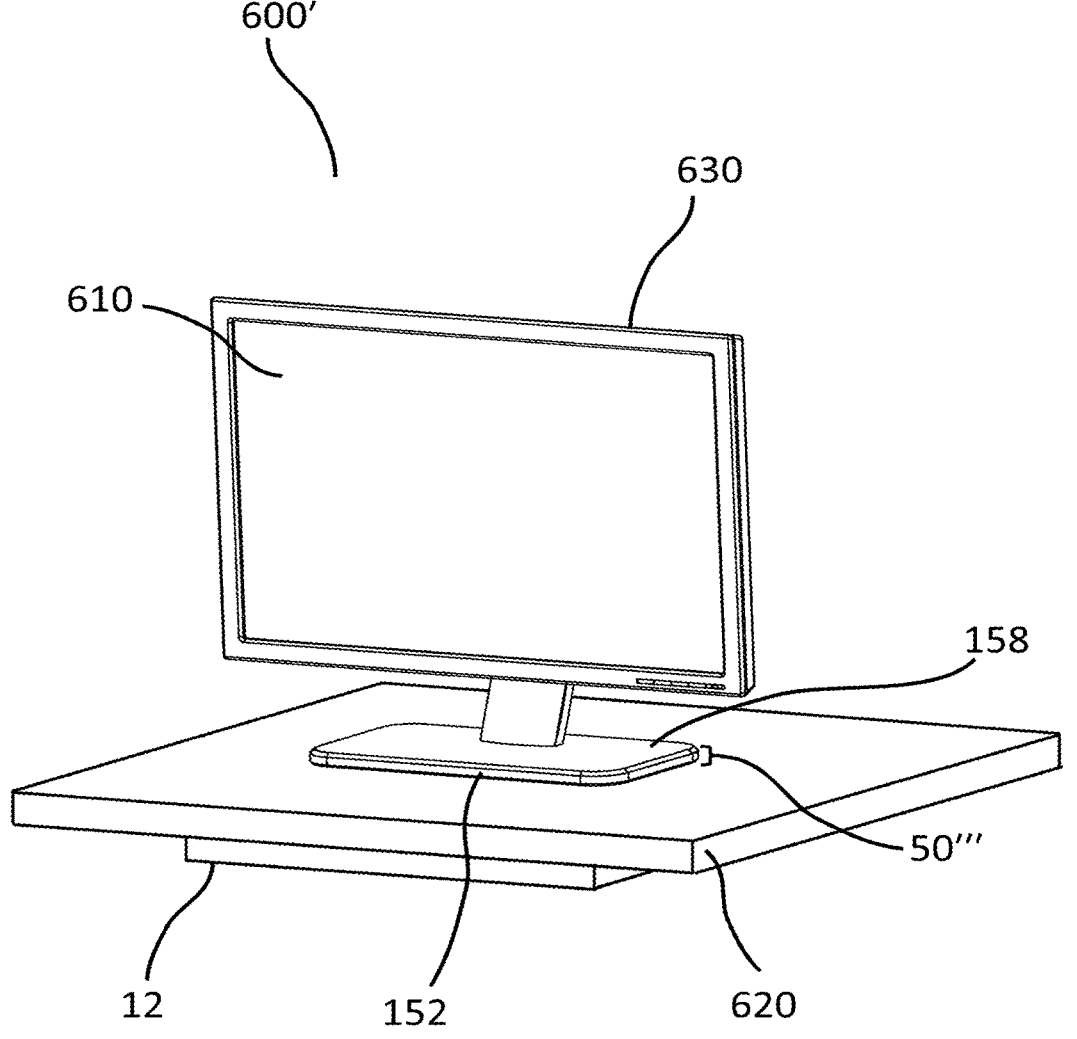
FIG. 28B shows a computer monitor using another embodiment a power transfer system.

As shown in another embodiment of a power supply system 600' for supplying power to computer monitor 610 in FIG. 28B, the base of monitor 610 may comprise only antenna 152 and dielectric 158. In this embodiment, a metallic conductive portion of monitor housing or frame 630 serves as antenna instead of antenna 154, and housing or frame 630 has enough coupling with antenna 152 underneath dielectric 158 to provide adequately efficient power transfer. Receiver module 40" of FIG. 19A may be incorporated in the base of the monitor 610. Alternatively, receiver module 40" of FIG. 19A may be incorporated inside the monitor 610 itself. The housing and structural frame 630 of monitor 610 may serve as one contiguous electrical conductor to supply a power signal via receiver module 40" to the circuitry of the monitor 610 representing load resonator 70" of FIG. 19A.

System 600 may optionally comprise a power conditioning unit 430 as in FIG. 19A. In some embodiments, transmitter module 20" and receiver module 40" may jointly function to provide power conditioning as explained with reference to FIG. 19A, though using near-field wireless power transfer. The near-field wireless power transfer system of FIG. 28A removes the need for cumbersome power cables to supply power to monitor 610 and employs the mechanical structural elements of the system as integral electrical/electronic components in the power transfer arrangement.

As described with reference to the flow chart in FIG. 29 and the systems of FIG. 19A and FIG. 19B, a method [2000] is provided for transferring power from a direct current power source 420 to a power load 70", the method comprising: providing [2010] a power transfer system 10", 410 in wired electrical communication with the power source 420, the power transfer system 10",410 comprising an oscillator 26A" capable of oscillating at an oscillation frequency; a power amplifier 26B" and transmitter tuning network 28", both under control of a transmitter controller 22"; and a receiver tuning network 48" and a load management system 46E" both under control of a receiver controller 42", wherein the load management system 46E" is in wired electrical communication with the power load 70"; converting [2020] in the power amplifier 26B" the power from the power source 420 into an oscillating electrical power signal having the oscillation frequency; transferring [2030] under control of the transmitter controller 22" the power signal from the power amplifier 26B" to the load management system 46E" via the transmitter tuning network 28" and the receiver tuning network 48"; adjusting [2040] at least one of the oscillation frequency, an input DC equivalent resistance of the power amplifier 26B", the transmitter tuning network 28", the receiver tuning network 48", and the load management system 46E" to change a rate of power transfer; and rendering [2050] in direct current form via wired electrical communication to the power load 70" the power received by the load management system 46E".

The transferring [2030] the power signal via the transmitter tuning network 28" and the receiver tuning network 48" may comprise transferring the power by wired communication or by wireless communication. Transferring the power by wireless communication may comprise transferring the power by near-field wireless communication. Transferring the power by near-field wireless communication may comprise transferring the power by at least one of capacitive and inductive coupling. The transferring power from a direct current power source 420 may comprise transferring power from at least one solar cell 420. The transferring power from a direct current power source may comprise transferring power from at least one battery. The transferring power from a direct current power source may comprise transferring power from a power source with a varying voltage.

In another embodiment described with reference to the flow chart in FIG. 30 and considering the systems of FIG. 19A and FIG. 19B in more depth, a method [2100] is provided for transferring power from a direct current power source 420 to a power load 70", the method comprising: providing [2110] a power transfer system 10",410 in wired electrical communication with the power source 420, the power transfer system 10",410 comprising a radio frequency power amplifier 26B" in radio frequency communication with an adjustable phase radio frequency rectifier 46D (see FIG. 7) in wired electrical contact with power load 70"; converting [2120] the power from the direct current source 420 into a radio frequency oscillating power signal in the amplifier 26B"; converting [2130] the radio frequency oscillating power signal to direct current power signal in the rectifier 46D; and adjusting [2140] an efficiency of the power transfer by adjusting a current-voltage phase characteristic of the rectifier 46D. Providing the adjustable phase radio frequency rectifier may comprise providing a differential self-synchronous radio frequency rectifier 46D.

The method [2100] may further comprise adjusting the efficiency of the power transfer by adjusting a direct current equivalent input resistance of the amplifier 26B". Providing [2110] the power transfer system 10",410 may comprise providing a load management system 46E" in wired communication between the rectifier 46D and the load 70". The adjusting the direct current equivalent input resistance of the amplifier 26B" may comprise adjusting an input impedance of the rectifier 46D by adjusting the load management system 46E". The adjusting the load management system 46E" may comprise automatically adjusting the load management system 46E".

The method [2100] may further comprise adjusting the efficiency of the power transfer by adjusting a current-voltage phase characteristic of the power amplifier 26B". The providing [2110] the power transfer system 10",410 may comprise providing a transmitter controller 22" in communication with the power amplifier 26B" for controlling the power amplifier 26B". Adjusting the current-voltage phase characteristic of the power amplifier 26B" may be performed by the transmitter controller 22". Adjusting the current-voltage phase characteristic of the power amplifier 26B" may be performed automatically by the transmitter controller 22".

The method [2100] may further comprise adjusting the efficiency of the power transfer by changing an oscillation frequency of the power amplifier 26B".

The providing [2110] the power transfer system 10",410 may comprise providing a receiver controller 42" in communication with the rectifier 46D for controlling the rectifier 46D. Adjusting the current-voltage phase characteristic of the rectifier 46D may be performed by the receiver controller 42". Adjusting the current-voltage phase characteristic of the rectifier 46D may performed automatically by the receiver controller 42".

Providing [2110] the power transfer system 10",410 may comprise providing the power amplifier 26B" in directly wired radio frequency communication with the adjustable phase radio frequency rectifier 46D (via connection 60" of FIG. 19B). Providing [2110] the power transfer system 10",410 may comprise providing the power amplifier 26B" in wireless near-field radio frequency communication with the adjustable phase radio frequency rectifier 46D.

Providing [2110] the power transfer system 10",410 may comprise providing a transmitter resonator 30" in wired radio frequency communication with the power amplifier 26B' and a receiver resonator 50" in wired radio frequency communication with the radio frequency rectifier 46D. The method [2100] may further comprise operating the transmitter resonator 30" and receiver resonator 50" in wireless near-field radio frequency communication with each other. Providing [2110] the power transfer system 10",410 may comprise providing the power amplifier 26B" in at least one of capacitive near-field wireless and inductive near-field wireless radio frequency communication with the rectifier 46D. Providing [2110] the power transfer system 10",410 may comprise providing the power amplifier 26B" in bimodal wireless near-field communication with the rectifier 46D.

The method [2100] may further comprise: providing a power conditioning unit 430 electrically disposed between the power source 420 and the power transfer system 10"; and adjusting the power conditioning unit 430 to adjust at least one of a current and a voltage from the power source 420 to improve the efficiency of the power transfer.

Based on a more in-depth consideration of the systems of FIG. 19A and FIG. 19B and with reference to FIG. 7, a generalized electrical power transfer system 10",410 for supplying power from a direct current source 420 to a power load 70", comprises: a radio frequency power amplifier 26B" in wired electrical communication with the power source 420 and configured to convert direct current voltage from the source 420 into an alternating voltage signal having an oscillation frequency; an adjustable phase radio frequency rectifier in wired electrical contact with the power load 70" and in radio frequency communication with the power amplifier the rectifier configured to receive power transferred from the power amplifier 26B"; and a receiver controller 42" in communication with the rectifier 46D, the receiver controller configured for adjusting an efficiency of power transfer from the power amplifier 26B" to the rectifier 46D by adjusting a current-voltage phase characteristic of the rectifier 46D. The receiver controller 42" may be configured for automatically adjusting the current-voltage phase characteristic of the rectifier 46D. The rectifier may be a differential self-synchronous radio frequency rectifier.

Power transfer system 10", 410 may further comprise a load management system 46E" in wired communication with the load 70" and power signal-wise disposed between the load 70" and the rectifier 46D, the load management system 46E" configured for increasing an efficiency of the power transfer by adjusting an input impedance of the rectifier 46D. The load management system 46E" may be configured for automatically adjusting the input impedance of the rectifier 46D.

Power transfer system 10", 410 may further comprise a transmitter controller 22" in communication with the amplifier 26B", transmitter controller 22" configured for increasing an efficiency of the power transfer by adjusting a current-voltage phase characteristic of the amplifier 26B". Transmitter controller 22" may be configured to automatically adjust the current-voltage phase characteristic of the amplifier 26B" to increase the efficiency of the power transfer.

Power transfer system 10",410 may further comprise an oscillator 26A" in communication with the amplifier 26B" and the transmitter controller 22". Transmitter controller 22" may be configured for adjusting the oscillation frequency via the oscillator 26A".

Power amplifier 26B" may be in directly wired radio frequency communication with the adjustable phase radio frequency rectifier 46D (via connection 60" of FIG. 19B). Power amplifier 26B" may be in wireless near-field radio frequency communication with the adjustable phase radio frequency rectifier 46D. Power transfer system 10",410 may comprise a transmitter resonator 30" in wired radio frequency communication with the power amplifier 26B" and a receiver resonator 50" in wired radio frequency communication with the rectifier 46D. Transmitter resonator 30" and receiver resonator 50" may be in wireless near-field radio frequency communication with each other. Power amplifier 26B" may be in at least one of capacitive near-field wireless and inductive near-field wireless radio frequency communication with the rectifier 46D. Power amplifier 26B" may be in bimodal near-field wireless radio frequency communication with the rectifier 46D.

Power transfer system may further comprise a power conditioning unit 430 electrically disposed between the power source 420 and the power amplifier 26B", power conditioning unit 430 configured for adjusting at least one of a current and a voltage from the power source 420 to improve the efficiency of power transfer.

In another embodiment, described with reference to FIG. 19A, FIG. 19B, FIGS. 27A and 27B, and FIGS. 28A and 28B, an electrically powered system comprises: a mechanical load bearing structure 510,630 having a first portion that is electrically conductive; an electrical power load; and an electrical power transfer system 10",410 comprising at least one radio frequency resonator 30",50" configured for near-field wireless power transfer, wherein the resonator comprises at least in part the electrically conductive first portion. The electrically powered system may further comprise a rechargeable battery 520 and the electrical power load may comprise an electric motor 530. The electrically powered system may be an electric vehicle 500,500' and the mechanical load bearing structure may comprise a chassis 510 of the vehicle. The electrically powered system may be a display monitor 610 and the mechanical load bearing structure may be at least one of a frame 630 and a base of the monitor.

The electrically powered system may further comprise a power source. The electrical power transfer system may comprise: a radio frequency power amplifier 26B" in wired electrical communication with the power source and configured to convert direct current voltage from the source into an alternating voltage signal having an oscillation frequency; an adjustable phase radio frequency rectifier 46D in wired electrical contact with the power load 70" and in radio frequency communication with the power amplifier 26B"; the rectifier 46D configured to receive power transferred from the amplifier 26B"; and a receiver controller 42" in communication with the rectifier 46D, the receiver controller 42" configured for adjusting an efficiency of power transfer from the amplifier 26B" to the rectifier 46D by adjusting a current-voltage phase characteristic of the rectifier 46D.

In another embodiment, as depicted in FIGS. 19A and 19B, FIGS. 27A and 27B, and FIGS. 28A and 28B, an apparatus comprises: a mechanical load bearing structure 510,630 having a first portion that is electrically conductive; an electrical power source; an electrical power load 70", 530,610; and an electrical power transfer system 10",410 comprising: a radio frequency power amplifier 26B" in wired electrical communication with the power source and configured to convert direct current voltage from the source into an alternating voltage signal having an oscillation frequency; an adjustable phase radio frequency rectifier 46D in wired electrical contact with the power load 70" and in radio frequency communication with the power amplifier 26B"; the rectifier 46D configured to receive power transferred from the amplifier 26B"; and a receiver controller 42" in communication with the rectifier 46D, the receiver controller 42" configured for adjusting an efficiency of power transfer from the amplifier 26B" to the rectifier 46D by adjusting a current-voltage phase characteristic of the rectifier 46D; wherein the electrically conductive first portion is disposed to carry a radio frequency signal at least one of from the amplifier 26B" and to the rectifier 46D.

The apparatus may further comprise load management system 46E" in wired communication with load 70" and power signal-wise disposed between load 70" and rectifier 46D, load management system 46E" configured for increasing an efficiency of the power transfer by adjusting an input impedance of rectifier 46D. The apparatus may further comprise transmitter controller 22' in communication with amplifier 26B", transmitter controller 22' configured for increasing an efficiency of power transfer by adjusting a current-voltage phase characteristic of amplifier 26B". The apparatus may further comprise oscillator 26A" in communication with amplifier 26B" and transmitter controller 22', wherein transmitter controller 22' is configured for adjusting the oscillation frequency via oscillator 26A".

Power amplifier 26B" may be in directly wired radio frequency communication with rectifier 46D via the electrically conductive first portion. Power amplifier 26B" may be in wireless near-field radio frequency communication with rectifier 46D. Power transfer system 10", 410 may comprise transmitter resonator 30" in wired radio frequency communication with power amplifier 26B" and receiver resonator 50" in wired radio frequency communication with rectifier 46D and one of transmitter resonator 30" and receiver resonator 50" may comprise the electrically conductive first portion. Transmitter resonator 30" and receiver resonator 50" may be in wireless near-field radio frequency communication with each other. Power amplifier 26B" may be in at least one of capacitive near-field wireless and inductive near-field wireless radio frequency communication with the rectifier 46D. Power amplifier 26B" may be in bimodal near-field wireless radio frequency communication with rectifier 46D. The direct current source may comprise rechargeable battery 520 and the load may comprise electric motor 530.

BEST MODE FOR CARRYING OUT THE INVENTION

1. In one currently preferred embodiment, the invention provides a bimodal near-field resonant wireless electrical power transfer system configured for simultaneous capacitive power transfer and inductive power transfer according to an adjustable transfer mode ratio of the capacitive power transfer to the inductive power transfer at a variable resonant power signal oscillation frequency, the system comprising: a transmitter subsystem comprising a transmitter antenna subsystem and a power signal tuner module, the power signal tuner module configured to adjust the transfer mode ratio by adjusting a power signal provided by the power signal tuner module to the transmitter antenna subsystem; and a receiver subsystem comprising a receiver antenna subsystem configured for to receive electrical power from the transmitter antenna at the transfer mode ratio. While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

Interpretation of Terms

Unless the context clearly requires otherwise, throughout the description and the claims:

"comprise", "comprising", and the like are to be construed in an inclusive sense, as opposed to an exclusive or exhaustive sense; that is to say, in the sense of "including, but not limited to";

"connected", "coupled", or any variant thereof, means any connection or coupling, either direct or indirect, between two or more elements; the coupling or connection between the elements can be physical, logical, or a combination thereof; elements which are integrally formed may be considered to be connected or coupled;

"wired", "via a wired connection", or any variant thereof, means any physical connection via conductive medium, intermediate circuity, or other means allowing for flow of an electric current between, though, or across components of a system;

"electric communication", "electrical communication", or any variant thereof, means any connection, coupling, interface, or other means for communication, hardwired, wireless, or a combination thereof, suitable to transfer of an electric signal between through or across components of a system;

"herein", "above", "below", and words of similar import, when used to describe this specification, shall refer to this specification as a whole, and not to any particular portions of this specification;

"or", in reference to a list of two or more items, covers all of the following interpretations of the word: any of the items in the list, all of the items in the list, and any combination of the items in the list;

the singular forms "a", "an", and "the" also include the meaning of any appropriate plural forms.

Words that indicate directions such as "vertical", "transverse", "horizontal", "upward", "downward", "forward", "backward", "inward", "outward", "vertical", "transverse", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Embodiments of the present invention include various operations, which are described herein. These operations may be performed by hardware components, software, firmware, or a combination thereof.

Certain embodiments may be implemented as a computer program product that may include instructions stored on a machine-readable medium. These instructions may be used to program a general-purpose or special-purpose processor to perform the described operations. A machine-readable medium includes any mechanism for storing information in a form (for example, software or a processing application) readable by a machine (for example, a computer). The machine-readable medium may include, but is not limited to, magnetic storage medium (e for example, floppy diskette); optical storage medium (for example, CD-ROM); magneto-optical storage medium; read-only memory (ROM); random-access memory (RAM); erasable programmable memory (for example, EPROM and EEPROM); flash memory; or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Computer processing components used in implementation of various embodiments of the invention include one or more general-purpose processing devices such as a microprocessor or central processing unit, a controller, graphical processing unit (GPU), cell computer, or the like. Alternatively, such digital processing components may include one or more special-purpose processing devices such as a digital signal processor (DSP), an application specific integrated circuit (ASIC), a field programmable gate array (FPGA), or the like. In particular embodiments, for example, the digital processing device may be a network processor having multiple processors including a core unit and multiple microengines. Additionally, the digital processing device may include any combination of general-purpose processing device(s) and special-purpose processing device(s).

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Where a component (for example, a software module, processor, assembly, device, circuit, etc.) is referred to above, unless otherwise indicated, reference to that component (including a reference to a "means") should be interpreted as including as equivalents of that component any component which performs the function of the described component (i.e. that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

The invention claimed is:

1. A system for transferring power from a photovoltaic cell to a power load, the system comprising:

a. a transmission module in wired electrical communication with a corresponding photovoltaic cell, the transmission module configured to convert the power from the corresponding photovoltaic cell into an oscillating electrical power signal having an oscillation frequency freely varying within a predetermined range; and b. a transmitter resonator in wired electrical communication with the transmission module, and in near-field communication with a receiver resonator;

c. wherein the receiver resonator is configured to resonate at an oscillation frequency freely varying within a predetermined range, and the transmitter resonator and receiver resonator are configured to sustain near-field communication over the predetermined range; and d. wherein when the transmitter resonator and the receiver resonator are in near-field wireless communication they are configured to resonate at the oscillation frequency, the transmission module is configured to adjust a transfer ratio of capacitive power transfer to inductive power transfer from the transmitter resonator to the receiver resonator for simultaneous power transfer at the oscillation frequency by adjusting a phase angle of the power signal, wherein the receiver resonator is in electrical communication with a receiver module configured to convert power received from the receiver resonator into a direct current voltage and transmit the direct current voltage to the power load.

2. The system according to claim 1, wherein the transmission module comprises one of an oscillator and a power amplifier configured to modulate the power received from the photovoltaic cell at the variable oscillation frequency.

3. The system according to claim 2, wherein the transmission module comprises an oscillator configured to provide the variable oscillation frequency to the power amplifier.

4. The system according to claim 1, wherein the transmission module further comprises a controller and one or more sensors.

5. The system according to claim 4, wherein the transmission module comprises a transmission tuning network configured to change under control of the controller at least the phase angle of the power signal provided by the transmission module to the transmitter resonator based on information from at least one of the one or more sensors.

6. The system according to claim 1, wherein the receiver resonator is disposed for receiving power from the transmitter resonator proximate to the receiver resonator.

7. The system according to claim 1, wherein the transmitter resonator is disposed on a surface of at least one of the one or more photovoltaic cells opposing an active solar radiation receiving surface of the at least one of the one or more photovoltaic cells.

8. The system according to claim 1, wherein the predetermined range is between 1 MHz and 1 GHz.

9. A method for transferring power from one or more photovoltaic cells to a power load, the method comprising:

a. providing one or more transmission modules, each transmission module being in electrical communication with a corresponding one of the one or more photovoltaic cells;

b. providing one or more transmitter resonators configured to resonate at an oscillation frequency freely varying within a predetermined range, each transmitter resonator being in electrical communication with a corresponding one of the one or more transmission modules;

c. providing one or more receiver resonators configured to resonate at the oscillation frequency, each receiver resonator in electrical communication with a corresponding receiver module;

d. converting in each transmission module power from the corresponding one of the one or more photovoltaic cells into an oscillating electrical power signal having the oscillation frequency;

e. transferring power from the one or more transmitter resonators to at least one of the one or more receiver resonators according to an adjustable transfer mode ratio of capacitive power transfer to inductive power transfer for simultaneous power transfer at the oscillation frequency by adjusting a phase angle of the power signal;

f. converting the power received from the one or more receiver resonators into a direct current voltage; and g. supplying the direct current voltage to the power load, wherein each resonator is configured to sustain near-field communication over the predetermined range.

10. The method of claim 9, wherein:

providing the one or more transmission modules comprises providing one or more transmission modules each comprising a power amplifier; and modulating in each power amplifier the power received from the corresponding photovoltaic at the oscillation frequency.

11. The method according to claim 10, wherein:

providing the one or more transmission modules comprises providing one or more transmission modules each comprising an oscillator; and the method further comprises the step of providing from the oscillator to the power amplifier the oscillation frequency.

12. The method according to claim 10, wherein providing the one or more transmission modules comprises providing one or more transmission modules each having a controller and one or more sensors.

13. The method according to claim 12, wherein providing the one or more transmission modules comprises providing one or more transmission modules each having a transmission tuning network, and the method comprises adjusting via the controller based on information from at least one of the one or more sensors the phase angle of the power signal provided by the transmission module to the one or more transmitter resonators.

14. The method of claim 10, wherein providing the one or more receiver resonator comprises providing at least one of the one or more receiver resonators disposed proximate to the one or more of the transmitter resonators and the method further comprises the step of receiving in the at least one receiver resonator power from one or more transmitter resonators proximate to the at least one receiver resonator.

15. The method according to claim 10, comprising allowing the oscillation frequency to vary within a predetermined frequency band contained between 1 MHz and 1 GHz.

16. The system of claim 1, wherein a capacitance in the transmitter resonator is in E-field communication with a capacitance in the corresponding receiver resonator and an inductance in the transmitter resonator is in H-field communication with an inductance in the corresponding receiver resonator.

17. The system of claim 1, wherein the system is configured to have a quality factor to sustain the resonance of the transmitter and receiver resonators over the predetermined range.

18. The method of claim 10, wherein a capacitance in each transmitter resonator is in E-field communication with a capacitance in each of the corresponding one or more receiver resonators and an inductance in each transmitter resonator is in H-field communication with an inductance in each of the corresponding one or more receiver resonators.

19. The method of claim 9, wherein the transmitter and receiver resonators are configured to have a quality factor to sustain the resonance of the transmitter and receiver resonators over the predetermined range.

\* \* \* \* \*